(12) United States Patent
Cui et al.

(10) Patent No.: US 9,832,744 B2
(45) Date of Patent: Nov. 28, 2017

(54) TIMING VALUE ADJUSTMENT METHOD AND APPARATUS

(71) Applicant: Huawei Technologies Co., Ltd., Shenzhen (CN)

(72) Inventors: Jie Cui, Shenzhen (CN); Anjian Li, Beijing (CN); Xiaodong Yang, Beijing (CN); Bo Li, Beijing (CN); Tong Wu, Shenzhen (CN); Hong Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 240 days.

(21) Appl. No.: 14/954,629

(22) Filed: Nov. 30, 2015

(65) Prior Publication Data
US 2016/0088577 A1  Mar. 24, 2016

Related U.S. Application Data

(63) Continuation of application No. PCT/CN2013/081244, filed on Aug. 9, 2013.

(51) Int. Cl.
*H04W 52/54* (2009.01)
*H04W 56/00* (2009.01)
*H04W 72/04* (2009.01)

(52) U.S. Cl.
CPC ....... *H04W 52/54* (2013.01); *H04W 56/0045* (2013.01); *H04W 72/0446* (2013.01)

(58) Field of Classification Search
CPC .................................................... H04W 53/24
See application file for complete search history.

(56) References Cited

U.S. PATENT DOCUMENTS

2009/0202031 A1  8/2009  Karjalainen et al.
2009/0274126 A1  11/2009 Satou
(Continued)

FOREIGN PATENT DOCUMENTS

CN   102215503 A   10/2011
CN   102340797 A   2/2012
(Continued)

OTHER PUBLICATIONS

"Issues on UL Simultaneous Transmission for Multiple TA," 3GPP TSG RAN WG1 Meeting #67, San Francisco, California, R1-114070, $3^{rd}$ Generation Partnership Project, Valbonne, France (Nov. 14-18, 2011).
"On maximum allowed UL timing difference," 3GPP TSG RAN WG1 #73, Fukuoka, Japan, R1-132473, $3^{rd}$ Generation Partnership Project, Valbonne, France (May 20-24, 2013).
(Continued)

*Primary Examiner* — Zhiren Qin
(74) *Attorney, Agent, or Firm* — Leydig, Voit & Mayer, Ltd.

(57) ABSTRACT

Embodiments of the present invention disclose a timing value adjustment method and apparatus, which relate to the communications field and reduce a probability that power of a terminal exceeds a limit. A specific solution is that: an absolute timing difference of a timing advance group TAG pair is obtained according to an absolute value of a difference between transmit timing values or receive timing values of the two TAGs in the TAG pair, where the TAG pair is formed by any two TAGs in a TAG set; and it is determined that the absolute timing difference of the TAG pair meets a predetermined condition, and first signaling is sent to a network device, where the first signaling includes identifiers of the two TAGs in the TAG pair. The present invention is used in a timing value adjustment process.

12 Claims, 12 Drawing Sheets

(56) References Cited

U.S. PATENT DOCUMENTS

| | | | |
|---|---|---|---|
| 2012/0257570 A1 | 10/2012 | Jang et al. | |
| 2012/0257601 A1* | 10/2012 | Kim | H04L 5/001 370/336 |
| 2013/0064165 A1* | 3/2013 | Chen | H04W 56/0045 370/312 |
| 2013/0114505 A1* | 5/2013 | Haim | H04W 52/146 370/328 |
| 2013/0195084 A1 | 8/2013 | Chen et al. | |

FOREIGN PATENT DOCUMENTS

| | | |
|---|---|---|
| CN | 102595590 A | 7/2012 |
| CN | 102932302 A | 2/2013 |
| EP | 2536228 A1 | 12/2012 |
| RU | 2437216 C1 | 12/2011 |
| WO | WO 2008093416 A1 | 8/2008 |

OTHER PUBLICATIONS

"$3^{rd}$ Generation Partnership Project; Technical Specification Group Radio Access Network; Evolved Universal Terrestrial Radio Access (E-UTRA); Requirements for support of radio resource management (Release 12)," 3GPP TS 36.133, V12.0.0, pp. 1-746, $3^{rd}$ Generation Partnership Project, Valbonne, France (Jul. 2013).

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300, V11.6.0, pp. 1-209, $3^{rd}$ Generation Partnership Project, Valbonne, France (Jun. 2013).

Ahn, "[Draft] LS on Maximum TA difference between TAGs," 3GPP TSG RAN WG1 Meeting #73, Fukuoka, Japan, R1-132688, $3^{rd}$ Generation Partnership Project, Valbonne, France (May 20-24, 2013).

\* cited by examiner

TIMING VALUE ADJUSTMENT METHOD AND APPARATUS

CROSS-REFERENCE TO RELATED APPLICATIONS

This application is a continuation of International Patent Application No. PCT/CN2013/081244, filed on Aug. 9, 2013, which is hereby incorporated by reference in its entirety.

TECHNICAL FIELD

The present invention relates to the communications field, and in particular, to a timing value adjustment method and apparatus.

BACKGROUND

In a multicarrier or carrier aggregation technology, a terminal may send data in a same subframe to a base station by using multiple carriers, where the multiple carriers may have different frequencies. It is well known that delays in a process of sending data to a base station over carriers of different frequencies are different, and to ensure that data carried over multiple carriers in a same subframe can arrive at the base station at the same time, when the terminal uses multiple carriers to send the data, the terminal needs to use, according to different frequencies of the carriers, different transmit timing values to send the data to the base station. In a traditional solution, it may be learned that the terminal has a limitation on a maximum value of uplink transmit power. In other words, when the terminal uses multiple carriers to send data to the base station, the terminal allocates the uplink transmit power by subframe. That is, in a same subframe, if the terminal uses the multiple carriers to send the data to the base station, a sum of transmit power of the multiple carriers is not allowed to exceed the maximum value of the uplink transmit power of the terminal. In the foregoing case, different transmit timing values are used when data is sent over carriers of different frequencies; therefore, the carriers of different frequencies have an overlapped area in different subframes, and a sum of transmit power of these carriers in the overlapped area may exceed the maximum value of the uplink transmit power of the terminal. In this way, transmit power of the terminal may exceed a limit, thereby affecting transmission of data.

When a time span of the overlapped area is relatively short, a case in which the sum of the transmit power of the carriers in the overlapped area exceeds the maximum value of the uplink transmit power of the terminal may be resolved in the prior by means of power allocation or a rollback operation. However, when the time span of the overlapped area is relatively long, a problem that the sum of the transmit power of the carriers in the overlapped area exceeds the maximum value of the uplink transmit power of the terminal cannot be resolved in the prior art by means of power allocation or a rollback operation. In this case, a probability that power of the terminal exceeds a limit is very high. Therefore, how to reduce the probability that the power of the terminal exceeds a limit has become an important issue researched by a person skilled in the art.

SUMMARY

Embodiments of the present invention provide a timing value adjustment method, which reduces a probability that power of a terminal exceeds a limit.

To achieve the foregoing objective, the following technical solutions are used in the embodiments of the present invention.

According to a first aspect of the present invention, a timing value adjustment method is provided, where the method includes:

obtaining an absolute timing difference of a timing advance group TAG pair according to an absolute value of a difference between transmit timing values or receive timing values of the two TAGs in the TAG pair, where the TAG pair is formed by any two TAGs in a TAG set; and determining that the absolute timing difference of the TAG pair meets a predetermined condition, and sending first signaling to a network device; where the first signaling includes identifiers of the two TAGs in the TAG pair.

With reference to the first aspect, in a possible implementation manner, the first signaling further includes at least one of the following parameters:

the absolute timing difference of the TAG pair, a difference between the absolute timing difference of the TAG pair and a maximum timing difference reference value, and an alarm indication, where the alarm indication is used to indicate that the absolute timing difference of the TAG pair meets the predetermined condition.

With reference to the first aspect and the foregoing possible implementation manner, in another possible implementation manner, that the predetermined condition is met includes any one of the following: the difference between the maximum timing difference reference value and the absolute timing difference of the TAG pair is less than or equal to a first threshold, the absolute timing difference of the TAG pair is greater than or equal to a second threshold, and the absolute timing difference of the TAG pair is greater than or equal to the maximum timing difference reference value.

With reference to the first aspect and the foregoing possible implementation manners, in another possible implementation manner, the obtaining an absolute timing difference of a timing advance group TAG pair according to an absolute value of a difference between transmit timing values or receive timing values of the two TAGs in the TAG pair includes:

periodically obtaining the absolute timing difference of the TAG pair according to the absolute value of the difference between the transmit timing values or the receive timing values of the two TAGs in the TAG pair.

With reference to the first aspect and the foregoing possible implementation manner, in another possible implementation manner, after the sending first signaling to a network device, the method further includes:

determining that the absolute timing difference of the TAG pair does not meet the predetermined condition; and sending second signaling to the network device; where the second signaling includes the identifiers of the two TAGs in the TAG pair.

With reference to the first aspect and the foregoing possible implementation manner, in another possible implementation manner, the second signaling further includes at least one of the following parameters:

the absolute timing difference of the TAG pair, the difference between the absolute timing difference of the TAG pair and the maximum timing difference reference value, and an alarm clearance indication, where the alarm clearance indication is used to indicate that the absolute timing difference of the TAG pair does not meet the predetermined condition.

With reference to the first aspect and the foregoing possible implementation manners, in another possible implementation manner, that the predetermined condition is not met includes any one of the following: the difference between the maximum timing difference reference value and the absolute timing difference of the TAG pair is greater than the first threshold, the absolute timing difference of the TAG pair is less than the second threshold, and the absolute timing difference of the TAG pair is less than the maximum timing difference reference value.

With reference to the first aspect and the foregoing possible implementation manners, in another possible implementation manner, before the determining that the absolute timing difference of the TAG pair meets a predetermined condition, and sending first signaling to a network device, the method further includes:

receiving the maximum timing difference reference value sent by the network device; and/or receive the maximum timing difference reference value and the first threshold that are sent by the network device; and/or receiving the second threshold sent by the network device.

With reference to the first aspect and the foregoing possible implementation manners, in another possible implementation manner, the first threshold is a threshold of the difference between the maximum timing difference reference value and the absolute timing difference of the TAG pair.

With reference to the first aspect and the foregoing possible implementation manners, in another possible implementation manner, the second threshold is a threshold that is at least one minimum time unit less than the maximum timing difference reference value.

According to a second aspect of the present invention, a timing value adjustment method is provided, where the method includes:

acquiring a timing value adjustment command for a first timing advance group TAG, where the timing value adjustment command for the first TAG includes an identifier of the first TAG and adjustment information corresponding to the identifier of the first TAG;

predicting a transmit timing value of the first TAG according to the timing value adjustment command for the first TAG, to obtain a predicted transmit timing value of the first TAG;

calculating an absolute value of a difference between the predicted transmit timing value of the first TAG and a transmit timing value of each TAG, except the first TAG, in a TAG set, to obtain a predicted absolute timing difference, where the TAG set includes at least one TAG in addition to the first TAG; and processing the timing value adjustment command for the first TAG according to a preset policy and the at least one predicted absolute timing difference.

With reference to the second aspect, in a possible implementation manner, the acquiring a timing value adjustment command for a first timing advance group TAG includes:

receiving the timing value adjustment command for the first TAG that is sent by a network device.

With reference to the second aspect and the foregoing possible implementation manner, in another possible implementation manner, the processing the timing value adjustment command for the first TAG according to a preset policy and the at least one predicted absolute timing difference includes:

when it is determined that the at least one predicted absolute timing difference is greater than a maximum timing difference reference value, not executing the timing value adjustment command for the first TAG; or in a case in which after a transmit timing value of the first TAG is adjusted, an absolute value of a difference between a transmit timing value of the first TAG after the adjustment and the transmit timing value of each TAG, except the first TAG, in the TAG set is less than or equal to the maximum timing difference reference value, adjusting the transmit timing value of the first TAG; or when it is determined that the at least one predicted absolute timing difference is less than or equal to the maximum timing difference reference value, adjusting the transmit timing value of the first TAG according to the timing value adjustment command for the first TAG.

With reference to the second aspect and the foregoing possible implementation manners, in another possible implementation manner, before the processing the timing value adjustment command for the first TAG according to a preset policy and the at least one predicted absolute timing difference, the method further includes:

calculating an absolute value of a difference between a current transmit timing value of the first TAG and the transmit timing value of each TAG, except the first TAG, in the TAG set, to obtain an absolute timing difference; where the processing the timing value adjustment command for the first TAG according to a preset policy and the at least one predicted absolute timing difference includes:

when it is determined that the at least one absolute timing difference is greater than the maximum timing difference reference value, and it is determined that a predicted absolute timing difference corresponding to the absolute timing difference is greater than the absolute timing difference, not executing the timing value adjustment command for the first TAG.

With reference to the second aspect and the foregoing possible implementation manners, in another possible implementation manner, the method further includes:

acquiring a timing value adjustment command for a second TAG, where the timing value adjustment command for the second TAG includes an identifier of the second TAG and adjustment information corresponding to the identifier of the second TAG;

predicting a transmit timing value of the second TAG according to the timing value adjustment command for the second TAG, to obtain a predicted transmit timing value of the second TAG;

calculating an absolute value of a difference between the predicted transmit timing value of the second TAG and a transmit timing value of each TAG, except the second TAG, in the TAG set, to obtain a predicted absolute timing difference, where the TAG set includes at least one TAG in addition to the second TAG; and processing the timing value adjustment command for the second TAG according to the preset policy and the at least one predicted absolute timing difference.

With reference to the second aspect and the foregoing possible implementation manners, in another possible implementation manner, the first TAG is a primary TAG.

With reference to the second aspect and the foregoing possible implementation manners, in another possible implementation manner, the method further includes:

sending indication information to the network device, where the indication information is used to respond to the timing value adjustment command.

According to a third aspect of the present invention, a timing value adjustment method is provided, where the method includes:

enabling an autonomous transmit timing value adjustment mechanism of a terminal for at least one timing advance group TAG;

acquiring, according to the autonomous transmit timing value adjustment mechanism for the at least one TAG, a predicted absolute timing difference of each TAG pair that includes a first TAG, where the predicted absolute timing difference of the TAG pair is, in a case in which it is assumed that an autonomous adjustment operation is performed on a transmit timing value of the first TAG according to an autonomous transmit timing value adjustment mechanism for the first TAG, a difference between transmit timing values of the two TAGs included in the TAG pair; and responding to the autonomous transmit timing value adjustment mechanism for the first TAG according to a preset policy and the predicted absolute timing difference of each TAG pair that includes the first TAG.

With reference to the third aspect, in a possible implementation manner, the responding to the autonomous transmit timing value adjustment mechanism for the first TAG according to a preset policy and the predicted absolute timing difference of each TAG pair that includes the first TAG includes:

when it is determined that a predicted absolute timing difference of at least one TAG pair that includes the first TAG is greater than a maximum timing difference reference value, not performing the autonomous adjustment operation on the transmit timing value of the first TAG; or in a case in which after the autonomous adjustment operation is performed on the transmit timing value of the first TAG, a difference between transmit timing values of the two TAGs included in each TAG pair that includes the first TAG is less than or equal to the maximum timing difference reference value, performing the autonomous adjustment operation on the transmit timing value of the first TAG; or when it is determined that the predicted absolute timing difference of each TAG pair that includes the first TAG is less than or equal to the maximum timing difference reference value, performing the autonomous adjustment operation on the transmit timing value of the first TAG according to the autonomous transmit timing value adjustment mechanism for the first TAG.

With reference to the third aspect and the foregoing possible implementation manner, in another possible implementation manner, before the responding to the autonomous transmit timing value adjustment mechanism for the first TAG according to a preset policy and the predicted absolute timing difference of each TAG pair that includes the first TAG, the method further includes:

acquiring an absolute timing difference of each TAG pair that includes the first TAG, where the absolute timing difference of the TAG pair is, in a case in which the autonomous adjustment operation is not performed on the transmit timing value of the first TAG according to the autonomous transmit timing value adjustment mechanism for the first TAG, a difference between transmit timing values of the two TAGs included in the TAG pair; where the responding to the autonomous transmit timing value adjustment mechanism for the first TAG according to a preset policy and the predicted absolute timing difference of each TAG pair that includes the first TAG includes:

when it is determined that an absolute timing difference of the at least one TAG pair that includes the first TAG is greater than the maximum timing difference reference value, and it is determined that the predicted absolute timing difference of the TAG pair is greater than the absolute timing difference of the TAG pair, not performing the autonomous adjustment operation on the transmit timing value of the first TAG.

With reference to the third aspect and the foregoing possible implementation manners, in another possible implementation manner, the method further includes:

acquiring, according to the autonomous transmit timing value adjustment mechanism for the at least one TAG, a predicted absolute timing difference of each TAG pair that includes a second TAG; where the predicted absolute timing difference of the TAG pair is, in a case in which it is assumed that the autonomous adjustment operation is performed on a transmit timing value of the second TAG according to an autonomous transmit timing value adjustment mechanism for the second TAG, a difference between transmit timing values of the two TAGs included in the TAG pair; and responding to the autonomous transmit timing value adjustment mechanism for the second TAG according to the preset policy and the predicted absolute timing difference of each TAG pair that includes the second TAG.

With reference to the third aspect and the foregoing possible implementation manners, in another possible implementation manner, when the autonomous transmit timing value adjustment mechanism for the at least one TAG includes an autonomous transmit timing value adjustment mechanism for a primary TAG, the first TAG is the primary TAG; or when the autonomous transmit timing value adjustment mechanism for the at least one TAG does not include an autonomous transmit timing value adjustment mechanism for a primary TAG, the first TAG is any one of the at least one TAG.

According to a fourth aspect of the present invention, a timing value adjustment apparatus is provided, where the apparatus includes:

an acquiring unit, configured to obtain an absolute timing difference of a timing advance group TAG pair according to an absolute value of a difference between transmit timing values or receive timing values of the two TAGs in the TAG pair, where the TAG pair is formed by any two TAGs in a TAG set; and a determining and sending unit, configured to: determine that the absolute timing difference of the TAG pair that is obtained by the acquiring unit meets a predetermined condition, and send first signaling to a network device; where the first signaling includes identifiers of the two TAGs in the TAG pair.

With reference to the fourth aspect, in a possible implementation manner, the first signaling further includes at least one of the following parameters:

the absolute timing difference of the TAG pair, a difference between the absolute timing difference of the TAG pair and a maximum timing difference reference value, and an alarm indication, where the alarm indication is used to indicate that the absolute timing difference of the TAG pair meets the predetermined condition.

With reference to the fourth aspect and the foregoing possible implementation manner, in another possible implementation manner, that the predetermined condition is met includes any one of the following: the difference between the maximum timing difference reference value and the absolute timing difference of the TAG pair is less than or equal to a first threshold, the absolute timing difference of the TAG pair is greater than or equal to a second threshold, and the absolute timing difference of the TAG pair is greater than or equal to the maximum timing difference reference value.

With reference to the fourth aspect and the foregoing possible implementation manners, in another possible implementation manner, the acquiring unit is specifically configured to:

periodically obtain the absolute timing difference of the TAG pair according to the absolute value of the difference between the transmit timing values or the receive timing values of the two TAGs in the TAG pair.

With reference to the fourth aspect and the foregoing possible implementation manner, in another possible implementation manner, the apparatus further includes:

a determining unit, configured to: after the determining and sending unit sends the first signaling to the network device, determine that the absolute timing difference of the TAG pair does not meet the predetermined condition; and a sending unit, configured to send second signaling to the network device; where the second signaling includes the identifiers of the two TAGs in the TAG pair.

With reference to the fourth aspect and the foregoing possible implementation manner, in another possible implementation manner, the second signaling further includes at least one of the following parameters:

the absolute timing difference of the TAG pair, the difference between the absolute timing difference of the TAG pair and the maximum timing difference reference value, and an alarm clearance indication, where the alarm clearance indication is used to indicate that the absolute timing difference of the TAG pair does not meet the predetermined condition.

With reference to the fourth aspect and the foregoing possible implementation manners, in another possible implementation manner, that the predetermined condition is not met includes any one of the following: the difference between the maximum timing difference reference value and the absolute timing difference of the TAG pair is greater than the first threshold, the absolute timing difference of the TAG pair is less than the second threshold, and the absolute timing difference of the TAG pair is less than the maximum timing difference reference value.

With reference to the fourth aspect and the foregoing possible implementation manners, in another possible implementation manner, the apparatus further includes:

a receiving unit, configured to: before the determining and sending unit determines that the absolute timing difference of the TAG pair meets the predetermined condition and sends the first signaling to the network device, receive the maximum timing difference reference value sent by the network device; and/or receive the maximum timing difference reference value and the first threshold that are sent by the network device; and/or receive the second threshold sent by the network device.

With reference to the fourth aspect and the foregoing possible implementation manners, in another possible implementation manner, the first threshold is a threshold of the difference between the maximum timing difference reference value and the absolute timing difference of the TAG pair.

With reference to the fourth aspect and the foregoing possible implementation manners, in another possible implementation manner, the second threshold is a threshold that is at least one minimum time unit less than the maximum timing difference reference value.

According to a fifth aspect of the present invention, a timing value adjustment apparatus is provided, where the apparatus includes:

a first acquiring unit, configured to acquire a timing value adjustment command for a first timing advance group TAG, where the timing value adjustment command for the first TAG includes an identifier of the first TAG and adjustment information corresponding to the identifier of the first TAG;

a second acquiring unit, configured to predict a transmit timing value of the first TAG according to the timing value adjustment command for the first TAG that is obtained by the first acquiring unit, to obtain a predicted transmit timing value of the first TAG;

a first calculating unit, configured to calculate an absolute value of a difference between the predicted transmit timing value of the first TAG that is obtained by the second acquiring unit and a transmit timing value of each TAG, except the first TAG, in a TAG set, to obtain a predicted absolute timing difference, where the TAG set includes at least one TAG in addition to the first TAG; and a first processing unit, configured to process the timing value adjustment command for the first TAG according to a preset policy and the at least one predicted absolute timing difference obtained by the first calculating unit.

With reference to the fifth aspect, in a possible implementation manner, the first acquiring unit is specifically configured to:

receive the timing value adjustment command for the first TAG that is sent by a network device.

With reference to the fifth aspect and the foregoing possible implementation manner, in another possible implementation manner, the first processing unit is specifically configured to:

when it is determined that the at least one predicted absolute timing difference is greater than a maximum timing difference reference value, not execute the timing value adjustment command for the first TAG; or in a case in which after a transmit timing value of the first TAG is adjusted, an absolute value of a difference between a transmit timing value of after the adjustment the first TAG and the transmit timing value of each TAG, except the first TAG, in the TAG set is less than or equal to the maximum timing difference reference value, adjust the transmit timing value of the first TAG; or when it is determined that the at least one predicted absolute timing difference is less than or equal to the maximum timing difference reference value, adjust the transmit timing value of the first TAG according to the timing value adjustment command for the first TAG.

With reference to the fifth aspect and the foregoing possible implementation manners, in another possible implementation manner, the apparatus further includes:

a third acquiring unit, configured to: before the first processing unit processes the timing value adjustment command for the first TAG according to the preset policy and the at least one predicted absolute timing difference, calculate an absolute value of a difference between a current transmit timing value of the first TAG and the transmit timing value of each TAG, except the first TAG, in the TAG set, to obtain an absolute timing difference; where the first processing unit is specifically configured to: when it is determined that the at least one absolute timing difference is greater than the maximum timing difference reference value, and it is determined that a predicted absolute timing difference corresponding to the absolute timing difference is greater than the absolute timing difference, not execute the timing value adjustment command for the first TAG.

With reference to the fifth aspect and the foregoing possible implementation manners, in another possible implementation manner, the apparatus further includes:

a fourth acquiring unit, configured to acquire a timing value adjustment command for a second TAG, where the timing value adjustment command for the second TAG includes an identifier of the second TAG and adjustment information corresponding to the identifier of the second TAG;

a fifth acquiring unit, configured to predict a transmit timing value of the second TAG according to the timing value adjustment command for the second TAG that is obtained by the fourth acquiring unit, to obtain a predicted transmit timing value of the second TAG;

a second calculating unit, configured to calculate an absolute value of a difference between the predicted transmit timing value of the second TAG that is obtained by the fifth acquiring unit and a transmit timing value of each TAG, except the second TAG, in the TAG set, to obtain a predicted absolute timing difference, where the TAG set includes at least one TAG in addition to the second TAG; and a second processing unit, configured to process the timing value adjustment command for the second TAG according to the preset policy and the at least one predicted absolute timing difference obtained by the second calculating unit.

With reference to the fifth aspect and the foregoing possible implementation manners, in another possible implementation manner, the first TAG is a primary TAG.

With reference to the fifth aspect and the foregoing possible implementation manners, in another possible implementation manner, the apparatus further includes:

a sending unit, configured to send indication information to the network device, where the indication information is used to respond to the timing value adjustment command.

According to a sixth aspect of the present invention, a timing value adjustment apparatus is provided, where the apparatus includes:

an enabling unit, configured to enable an autonomous transmit timing value adjustment mechanism of a terminal for at least one timing advance group TAG;

a first acquiring unit, configured to acquire, according to the autonomous transmit timing value adjustment mechanism for the at least one TAG that is enabled by the enabling unit, a predicted absolute timing difference of each TAG pair that includes a first TAG; where the predicted absolute timing difference of the TAG pair is, in a case in which it is assumed that an autonomous adjustment operation is performed on a transmit timing value of the first TAG according to an autonomous transmit timing value adjustment mechanism for the first TAG, a difference between transmit timing values of the two TAGs included in the TAG pair; and a first processing unit, configured to respond to the autonomous transmit timing value adjustment mechanism for the first TAG according to a preset policy, and the predicted absolute timing difference of each TAG pair that includes the first TAG that is obtained by the first acquiring unit.

With reference to the sixth aspect, in a possible implementation manner, the first processing unit is specifically configured to:

when it is determined that a predicted absolute timing difference of at least one TAG pair that includes the first TAG is greater than a maximum timing difference reference value, not perform the autonomous adjustment operation on the transmit timing value of the first TAG; or in a case in which after the autonomous adjustment operation is performed on the transmit timing value of the first TAG, a difference between transmit timing values of the two TAGs included in each TAG pair that includes the first TAG is less than or equal to the maximum timing difference reference value, perform the autonomous adjustment operation on the transmit timing value of the first TAG; or when it is determined that the predicted absolute timing difference of each TAG pair that includes the first TAG is less than or equal to the maximum timing difference reference value, perform the autonomous adjustment operation on the transmit timing value of the first TAG according to the autonomous transmit timing value adjustment mechanism for the first TAG.

With reference to the sixth aspect and the foregoing possible implementation manner, in another possible implementation manner, the apparatus further includes:

a second acquiring unit, configured to: before the first processing unit responds to the autonomous transmit timing value adjustment mechanism for the first TAG according to the preset policy and the predicted absolute timing difference of each TAG pair that includes the first TAG, acquire an absolute timing difference of each TAG pair that includes the first TAG, where the absolute timing difference of the TAG pair is, in a case in which the autonomous adjustment operation is not performed on the transmit timing value of the first TAG according to the autonomous transmit timing value adjustment mechanism for the first TAG, a difference between transmit timing values of the two TAGs included in the TAG pair; where the first processing unit is specifically configured to: when it is determined that an absolute timing difference of the at least one TAG pair that includes the first TAG is greater than the maximum timing difference reference value, and it is determined that the predicted absolute timing difference of the TAG pair is greater than the absolute timing difference of the TAG pair, not perform the autonomous adjustment operation on the transmit timing value of the first TAG.

With reference to the sixth aspect and the foregoing possible implementation manners, in another possible implementation manner, the apparatus further includes:

a third acquiring unit, configured to acquire, according to the autonomous transmit timing value adjustment mechanism for the at least one TAG that is enabled by the enabling unit, a predicted absolute timing difference of each TAG pair that includes a second TAG; where the predicted absolute timing difference of the TAG pair is, in a case in which it is assumed that the autonomous adjustment operation is performed on a transmit timing value of the second TAG according to an autonomous transmit timing value adjustment mechanism for the second TAG, a difference between transmit timing values of the two TAGs included in the TAG pair; and a second processing unit, configured to respond to the autonomous transmit timing value adjustment mechanism for the second TAG according to the preset policy, and the predicted absolute timing difference of each TAG pair that includes the second TAG that is obtained by the third acquiring unit.

With reference to the sixth aspect and the foregoing possible implementation manners, in another possible implementation manner, when the autonomous transmit timing value adjustment mechanism for the at least one TAG includes an autonomous transmit timing value adjustment mechanism for a primary TAG, the first TAG is the primary TAG; or when the autonomous transmit timing value adjustment mechanism for the at least one TAG does not include an autonomous transmit timing value adjustment mechanism for a primary TAG, the first TAG is any one of the at least one TAG.

According to a seventh aspect of the present invention, a timing value adjustment apparatus is provided, where the apparatus includes: at least one processor, a memory, a communications interface, and a bus, where the at least one processor, the memory, and the communications interface are connected by using the bus and implement mutual communication by using the bus; and the processor is configured to execute executable program code stored in the memory, and is specifically configured to execute the following operations:

the processor is configured to: obtain an absolute timing difference of a timing advance group TAG pair according to an absolute value of a difference between transmit timing values or receive timing values of the two TAGs in the TAG pair, where the TAG pair is formed by any two TAGs in a TAG set; and determine that the absolute timing difference of the TAG pair meets a predetermined condition, and send first signaling to a network device, where the first signaling includes identifiers of the two TAGs in the TAG pair.

With reference to the seventh aspect, in a possible implementation manner, the first signaling further includes at least one of the following parameters:

the absolute timing difference of the TAG pair, a difference between the absolute timing difference of the TAG pair and a maximum timing difference reference value, and an alarm indication, where the alarm indication is used to indicate that the absolute timing difference of the TAG pair meets the predetermined condition.

With reference to the seventh aspect and the foregoing possible implementation manner, in another possible implementation manner, that the predetermined condition is met includes any one of the following: the difference between the maximum timing difference reference value and the absolute timing difference of the TAG pair is less than or equal to a first threshold, the absolute timing difference of the TAG pair is greater than or equal to a second threshold, and the absolute timing difference of the TAG pair is greater than or equal to the maximum timing difference reference value.

With reference to the seventh aspect and the foregoing possible implementation manners, in another possible implementation manner, the processor is further configured to:

periodically obtain the absolute timing difference of the TAG pair according to the absolute value of the difference between the transmit timing values or the receive timing values of the two TAGs in the TAG pair.

With reference to the seventh aspect and the foregoing possible implementation manners, in another possible implementation manner, the processor is further configured to:

after the sending first signaling to a network device, determine that the absolute timing difference of the TAG pair does not meet the predetermined condition; and send second signaling to the network device; where the second signaling includes the identifiers of the two TAGs in the TAG pair.

With reference to the seventh aspect and the foregoing possible implementation manner, in another possible implementation manner, the second signaling further includes at least one of the following parameters:

the absolute timing difference of the TAG pair, the difference between the absolute timing difference of the TAG pair and the maximum timing difference reference value, and an alarm clearance indication, where the alarm clearance indication is used to indicate that the absolute timing difference of the TAG pair does not meet the predetermined condition.

With reference to the seventh aspect and the foregoing possible implementation manners, in another possible implementation manner, that the predetermined condition is not met includes any one of the following: the difference between the maximum timing difference reference value and the absolute timing difference of the TAG pair is greater than the first threshold, the absolute timing difference of the TAG pair is less than the second threshold, and the absolute timing difference of the TAG pair is less than the maximum timing difference reference value.

With reference to the seventh aspect and the foregoing possible implementation manner, in another possible implementation manner, the processor is further configured to:

before the determining that the absolute timing difference of the TAG pair meets a predetermined condition, and sending first signaling to a network device, receive the maximum timing difference reference value sent by the network device; and/or receive the maximum timing difference reference value and the first threshold that are sent by the network device; and/or receive the second threshold sent by the network device.

With reference to the seventh aspect and the foregoing possible implementation manner, in another possible implementation manner, the first threshold is a threshold of the difference between the maximum timing difference reference value and the absolute timing difference of the TAG pair.

With reference to the seventh aspect and the foregoing possible implementation manners, in another possible implementation manner, the second threshold is a threshold that is at least one minimum time unit less than the maximum timing difference reference value.

According to an eighth aspect of the present invention, a timing value adjustment apparatus is provided, where the apparatus includes: at least one processor, a memory, a communications interface, and a bus, where the at least one processor, the memory, and the communications interface are connected by using the bus and implement mutual communication by using the bus; and the processor is configured to execute executable program code stored in the memory, and is specifically configured to execute the following operations:

the processor is configured to: acquire a timing value adjustment command for a first timing advance group TAG, where the timing value adjustment command for the first TAG includes an identifier of the first TAG and adjustment information corresponding to the identifier of the first TAG; predict a transmit timing value of the first TAG according to the timing value adjustment command for the first TAG, to obtain a predicted transmit timing value of the first TAG; calculate an absolute value of a difference between the predicted transmit timing value of the first TAG and a transmit timing value of each TAG, except the first TAG, in a TAG set, to obtain a predicted absolute timing difference, where the TAG set includes at least one TAG in addition to the first TAG; and process the timing value adjustment command for the first TAG according to a preset policy and the at least one predicted absolute timing difference.

With reference to the eighth aspect, in a possible implementation manner, the processor is further configured to:

receive the timing value adjustment command for the first TAG that is sent by a network device.

With reference to the eighth aspect and the foregoing possible implementation manner, in another possible implementation manner, the processor is further configured to:

when it is determined that the at least one predicted absolute timing difference is greater than a maximum timing difference reference value, not execute the timing value adjustment command for the first TAG; or in a case in which after a transmit timing value of the first TAG is adjusted, an absolute value of a difference between a transmit timing value of the first TAG after the adjustment and the transmit timing value of each TAG, except the first TAG, in the TAG set is less than or equal to the maximum timing difference reference value, adjust the transmit timing value of the first TAG; or when it is determined that the at least one predicted absolute timing difference is less than or equal to the maximum timing difference reference value, adjust the transmit timing value of the first TAG according to the timing value adjustment command for the first TAG.

With reference to the eighth aspect and the foregoing possible implementation manner, in another possible implementation manner, the processor is further configured to:

before the processing the timing value adjustment command for the first TAG according to a preset policy and the at least one predicted absolute timing difference, calculate an absolute value of a difference between a current transmit timing value of the first TAG and the transmit timing value of each TAG, except the first TAG, in the TAG set, to obtain an absolute timing difference; and when it is determined that the at least one absolute timing difference is greater than the maximum timing difference reference value, and it is determined that a predicted absolute timing difference corresponding to the absolute timing difference is greater than the absolute timing difference, not execute the timing value adjustment command for the first TAG.

With reference to the eighth aspect and the foregoing possible implementation manners, in another possible implementation manner, the processor is further configured to:

acquire a timing value adjustment command for a second TAG, where the timing value adjustment command for the second TAG includes an identifier of the second TAG and adjustment information corresponding to the identifier of the second TAG;

predict a transmit timing value of the second TAG according to the timing value adjustment command for the second TAG, to obtain a predicted transmit timing value of the second TAG;

calculate an absolute value of a difference between the predicted transmit timing value of the second TAG and a transmit timing value of each TAG, except the second TAG, in the TAG set, to obtain a predicted absolute timing difference, where the TAG set includes at least one TAG in addition to the second TAG; and process the timing value adjustment command for the second TAG according to the preset policy and the at least one predicted absolute timing difference.

With reference to the eighth aspect and the foregoing possible implementation manners, in another possible implementation manner, the first TAG is a primary TAG.

With reference to the eighth aspect and the foregoing possible implementation manners, in another possible implementation manner, the processor is further configured to:

send indication information to the network device, where the indication information is used to respond to the timing value adjustment command.

According to a ninth aspect of the present invention, a timing value adjustment apparatus is provided, where the apparatus includes: at least one processor, a memory, a communications interface, and a bus, where the at least one processor, the memory, and the communications interface are connected by using the bus and implement mutual communication by using the bus; and the processor is configured to execute executable program code stored in the memory, and is specifically configured to execute the following operations:

the processor is configured to: enable an autonomous transmit timing value adjustment mechanism of a terminal for at least one timing advance group TAG; acquire, according to the autonomous transmit timing value adjustment mechanism for the at least one TAG, a predicted absolute timing difference of each TAG pair that includes a first TAG, where the predicted absolute timing difference of the TAG pair is, in a case in which it is assumed that an autonomous adjustment operation is performed on a transmit timing value of the first TAG according to an autonomous transmit timing value adjustment mechanism for the first TAG, a difference between transmit timing values of the two TAGs included in the TAG pair; and respond to the autonomous transmit timing value adjustment mechanism for the first TAG according to a preset policy and the predicted absolute timing difference of each TAG pair that includes the first TAG.

With reference to the ninth aspect, in a possible implementation manner, the processor is further configured to:

when it is determined that a predicted absolute timing difference of at least one TAG pair that includes the first TAG is greater than a maximum timing difference reference value, not perform the autonomous adjustment operation on the transmit timing value of the first TAG; or in a case in which after the autonomous adjustment operation is performed on the transmit timing value of the first TAG, a difference between transmit timing values of the two TAGs included in each TAG pair that includes the first TAG is less than or equal to the maximum timing difference reference value, perform the autonomous adjustment operation on the transmit timing value of the first TAG; or when it is determined that the predicted absolute timing difference of each TAG pair that includes the first TAG is less than or equal to the maximum timing difference reference value, perform the autonomous adjustment operation on the transmit timing value of the first TAG according to the autonomous transmit timing value adjustment mechanism for the first TAG.

With reference to the ninth aspect and the foregoing possible implementation manner, in another possible implementation manner, the processor is further configured to:

before the responding to the autonomous transmit timing value adjustment mechanism for the first TAG according to a preset policy and the predicted absolute timing difference of each TAG pair that includes the first TAG, acquire an absolute timing difference of each TAG pair that includes the first TAG, where the absolute timing difference of the TAG pair is, in a case in which the autonomous adjustment operation is not performed on the transmit timing value of the first TAG according to the autonomous transmit timing value adjustment mechanism for the first TAG, a difference between transmit timing values of the two TAGs included in the TAG pair; and when it is determined that an absolute timing difference of the at least one TAG pair that includes the first TAG is greater than the maximum timing difference reference value, and it is determined that the predicted absolute timing difference of the TAG pair is greater than the absolute timing difference of the TAG pair, not perform the autonomous adjustment operation on the transmit timing value of the first TAG.

With reference to the ninth aspect and the foregoing possible implementation manners, in another possible implementation manner, the processor is further configured to:

acquire, according to the autonomous transmit timing value adjustment mechanism for the at least one TAG, a predicted absolute timing difference of each TAG pair that includes a second TAG; where the predicted absolute timing difference of the TAG pair is, in a case in which it is assumed that the autonomous adjustment operation is performed on a transmit timing value of the second TAG according to an autonomous transmit timing value adjustment mechanism for the second TAG, a difference between transmit timing values of the two TAGs included in the TAG pair; and respond to the autonomous transmit timing value adjustment mechanism for the second TAG according to the preset policy and the predicted absolute timing difference of each TAG pair that includes the second TAG.

With reference to the ninth aspect and the foregoing possible implementation manners, in another possible implementation manner, when the autonomous transmit timing value adjustment mechanism for the at least one TAG includes an autonomous transmit timing value adjustment mechanism for a primary TAG, the first TAG is the primary TAG; or when the autonomous transmit timing value adjustment mechanism for the at least one TAG does not include an autonomous transmit timing value adjustment mechanism for a primary TAG, the first TAG is any one of the at least one TAG.

According to the timing value adjustment method and apparatus that are provided in the embodiments of the present invention, a terminal obtains an absolute timing difference of a TAG pair according to an absolute value of a difference between transmit timing values or receive timing values of the two TAGs in the TAG pair, determines whether the absolute timing difference of the TAG pair meets a predetermined condition, and sends first signaling to a network device when the absolute timing difference of the TAG pair meets the predetermined condition. The terminal sends, to the network device when it is determined that the absolute timing difference of the TAG pair meets the predetermined condition, that is, the absolute timing difference of the TAG pair is close to, or equal to, or greater than a maximum timing difference reference value, first signaling of an alarm indication used to notify that the absolute timing difference of the TAG pair is already close to, or equal to, or greater than the maximum timing difference reference value, so that according to the received first signaling, the network device does not send timing value adjustment signaling that enables the absolute timing difference of the TAG pair to be closer to or further greater than the maximum timing difference reference value, thereby reducing a probability that power of the terminal exceeds a limit.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
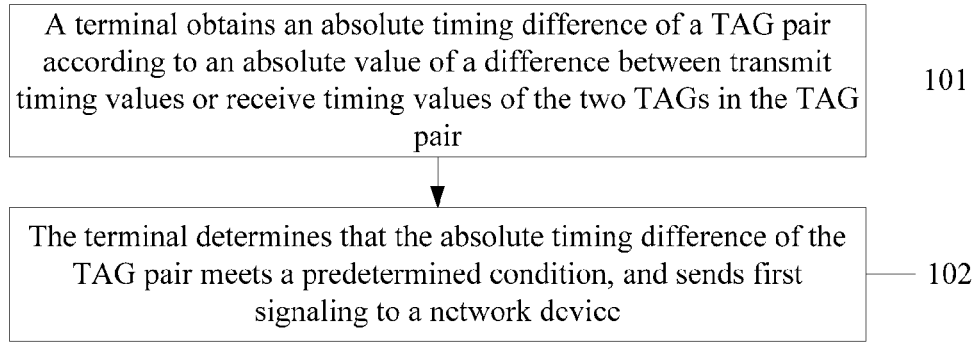
FIG. 1 is a flowchart of a timing value adjustment method according to Embodiment 1 of the present invention.

Embodiment 1 of the present invention provides a timing value adjustment method. As shown in FIG. 1, the method may be applied to a terminal. The terminal sends uplink data in a same subframe by using at least two carriers, and the terminal includes at least two timing advance groups (TAG) in the subframe. Carriers that have a same transmit timing and are in at least two carriers included in the terminal belong to a same TAG. The method may include the following steps:

101. The terminal obtains an absolute timing difference of a TAG pair according to an absolute value of a difference between transmit timing values or receive timing values of the two TAGs in the TAG pair.

The TAG pair is formed by any two TAGs in a TAG set.

It should be noted that: when the terminal includes two TAGs, the two TAGs forms one TAG pair. In this case, the terminal may directly obtain an absolute timing difference of the TAG pair according to an absolute value of a difference between transmit timing values or receive timing values of the two TAGs. When the terminal includes more than two TAGs, the terminal includes at least two TAG pairs. In this case, the terminal may obtain an absolute timing difference of each TAG pair in the at least two TAG pairs according to an absolute value of a difference between transmit timing values or receive timing values of the two TAGs included in each TAG pair in the at least two TAG pairs.

102. The terminal determines that the absolute timing difference of the TAG pair meets a predetermined condition, and sends first signaling to a network device.

After acquiring the absolute timing difference of the TAG pair, the terminal may determine whether the absolute timing difference of the TAG pair meets the predetermined condition, and send the first signaling to the network device when determining that the absolute timing difference of the TAG pair meets the predetermined condition. That the predetermined condition is met may include any one of the following: a difference between a maximum timing difference reference value and the absolute timing difference of the TAG pair is less than or equal to a first threshold, the absolute timing difference of the TAG pair is greater than or equal to a second threshold, and the absolute timing difference of the TAG pair is greater than or equal to the maximum timing difference reference value.

The maximum timing difference reference value may be pre-configured in the terminal, or the terminal may be notified of the maximum timing difference reference value in advance by the network device; the first threshold may be pre-configured in the terminal, or the terminal may be notified of the first threshold in advance by the network device; the second threshold may be pre-configured in the terminal, or the terminal may be notified of the second threshold in advance by the network device.

It should be noted that if the terminal includes two TAGs, that is, the terminal includes only one TAG pair, after obtaining an absolute timing difference of the TAG pair, the terminal may directly determine whether the absolute timing difference of the TAG pair meets the predetermined condition, and send the first signaling to the network device when the absolute timing difference of the TAG pair meets the predetermined condition. If the terminal includes more than two TAGs, that is, the terminal includes at least two TAG pairs, the terminal needs to determine, for all TAG pairs in the included at least two TAG pairs, whether absolute timing differences of all the TAG pairs in the at least two TAG pairs meet the predetermined condition, and send the first signaling to the network device when it is determined that an absolute timing difference of at least one TAG pair in the at least two TAG pairs meets the predetermined condition. Certainly, if the terminal includes more than two TAGs, that is, the terminal includes at least two TAG pairs, for each TAG pair in the included at least two TAG pairs, the terminal may also determine, after acquiring an absolute timing difference of the TAG pair, whether the absolute timing difference of the TAG pair meets the predetermined condition, and send the first signaling to the network device when it is determined that the absolute timing difference of the TAG pair meets the predetermined condition. That is, when the terminal includes at least two TAG pairs, the terminal needs to perform step 101 for each TAG pair to obtain the absolute timing difference of the TAG pair, determine whether the absolute timing difference of the TAG pair meets the predetermined condition, and send the first signaling to the network device when it is determined that the absolute timing difference of the TAG pair meets the predetermined condition.

After it is determined that the absolute timing difference of the TAG pair meets the predetermined condition, the terminal may send the first signaling to the network device, where the first signaling is mainly used to notify the network device that the absolute timing difference of the TAG pair is already close to, or equal to, or greater than the maximum timing difference reference value, so that the network device performs a corresponding response operation according to the received first signaling. The first signaling may include identifiers of the two TAGs in the TAG pair.

Further, optionally, the first signaling may further include at least one of the following parameters: the absolute timing difference of the TAG pair, the difference between the absolute timing difference of the TAG pair and the maximum timing difference reference value, and an alarm indication, where the alarm indication is used to indicate that the absolute timing difference of the TAG pair meets the predetermined condition.

It should be noted that if the terminal includes two TAGs, that is, the terminal includes only one TAG pair, and after it is determined that an absolute timing difference of the TAG pair meets the predetermined condition, the terminal may directly send the first signaling to the network device, and the first signaling is mainly used to notify the network device that the absolute timing difference of the TAG pair is already close to, or equal to, or greater than the maximum timing difference reference value. If the terminal includes more than two TAGs, that is, the terminal includes at least two TAG pairs, and when it is determined that an absolute timing difference of at least one TAG pair in the at least two TAG pairs meets the predetermined condition, the terminal may send first signaling to the network device. In this case, the first signaling may be used to notify the network device that an absolute timing difference of one TAG pair or absolute timing differences of several TAG pairs are already close to, or equal to, or greater than the maximum timing difference reference value, where the several TAG pairs refer to some or all TAG pairs in the at least one TAG pair that meets the predetermined condition. That is, when there is at least one TAG pair in the at least two TAG pairs included in the terminal that meets the predetermined condition, the terminal may send a piece of first signaling to the network device. In this case, the first signaling is used to indicate that an absolute timing difference of a TAG pair in the at least one TAG pair that meets the predetermined condition is already close to, or equal to, or greater than the maximum timing difference reference value. In addition, for each TAG pair in another TAG pair in the at least one TAG pair that meets the predetermined condition, the terminal may send a piece of first signaling to the network device, so that the network device is notified of this status in which all TAG pairs in the at least one TAG pair that meets the predetermined condition already meet the predetermined condition. For several TAG pairs in the at least one TAG pair that meets the predetermined condition, the terminal may also send a piece of first signaling to the network device. In this case, the first signaling is used to indicate that absolute timing differences of the several TAG pairs in the at least one TAG pair that meets the predetermined condition are all already close to, or equal to, or greater than the maximum timing difference reference value.

It should be noted that the network device in this embodiment of the present invention may be a network side device, such as a base station, that can provide a service for the terminal in this embodiment, which is not specifically limited herein in this embodiment of the present invention.

According to the timing value adjustment method provided in this embodiment of the present invention, a terminal obtains an absolute timing difference of a TAG pair according to an absolute value of a difference between transmit timing values or receive timing values of the two TAGs in the TAG pair, determines whether the absolute timing difference of the TAG pair meets a predetermined condition, and sends first signaling to a network device when the absolute timing difference of the TAG pair meets the predetermined condition. The terminal sends, to the network device when it is determined that the absolute timing difference of the TAG pair meets the predetermined condition, that is, the absolute timing difference of the TAG pair is close to, or equal to, or greater than a maximum timing difference reference value, first signaling of an alarm indication used to notify that the absolute timing difference of the TAG pair is already close to, or equal to, or greater than the maximum timing difference reference value, so that according to the first signaling, the network device may no longer send timing value adjustment signaling that enables the absolute timing difference of the TAG pair to be closer to or further greater than the maximum timing difference reference value, thereby reducing a probability that power of the terminal exceeds a limit.

Embodiment 2

Figure 2:
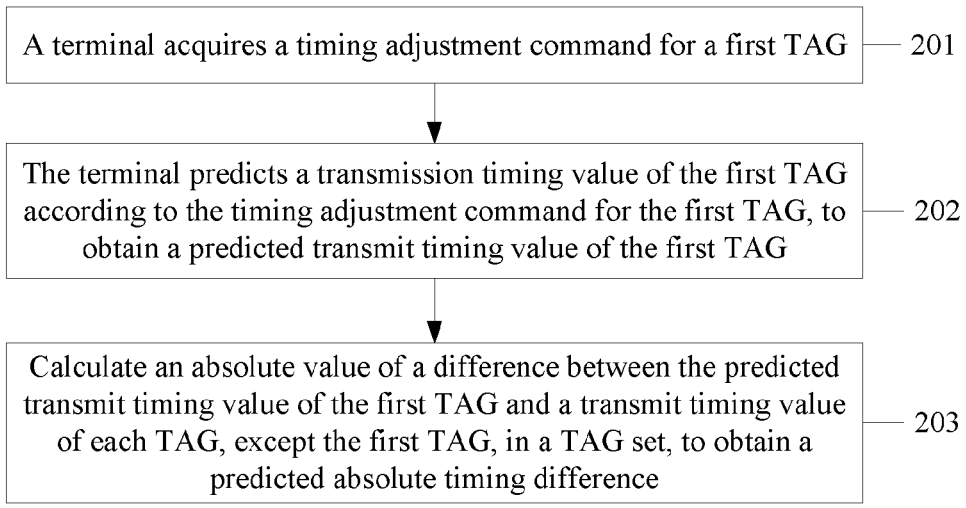
FIG. 2 is a flowchart of a timing value adjustment method according to Embodiment 2 of the present invention.

Embodiment 2 of the present invention provides a timing value adjustment method. As shown in FIG. 2, the method may be applied to a terminal. The terminal sends uplink data in a same subframe by using at least two carriers, and the terminal includes at least two TAGs in the subframe, where the at least two TAGs form a TAG set in this embodiment of the present invention, and carriers that have a same transmit timing and are in at least two carriers included in the terminal belong to a same TAG. The method may include the following steps:

201. The terminal acquires a timing value adjustment command for a first TAG.

The timing value adjustment command for the first TAG includes an identifier of the first TAG and adjustment information corresponding to the identifier of the first TAG.

It should be noted that, that the terminal acquires a timing value adjustment command for a first TAG may be specifically that: the terminal receives the timing value adjustment command for the first TAG that is sent by a network device. This embodiment of the present invention imposes no limitation herein on a specific manner of acquiring the timing value adjustment command.

202. The terminal predicts a transmit timing value of the first TAG according to the timing value adjustment command for the first TAG, to obtain a predicted transmit timing value of the first TAG.

203. Calculate an absolute value of a difference between the predicted transmit timing value of the first TAG and a transmit timing value of each TAG, except the first TAG, in the TAG set, to obtain a predicted absolute timing difference.

The TAG set includes at least one TAG in addition to the first TAG.

Specifically, in step 202 and step 203, after acquiring the timing value adjustment command for the first TAG, the terminal may predict the transmit timing value of the first TAG according to the timing value adjustment command for the first TAG, to obtain the predicted transmit timing value of the first TAG, and then calculate, according to the obtained predicted transmit timing value of the first TAG, the absolute value of the difference between the predicted transmit timing value of the first TAG and the transmit timing value of each TAG, except the first TAG, in the TAG set, to obtain the predicted absolute timing difference.

204. The terminal processes the timing value adjustment command for the first TAG according to a preset policy and the at least one predicted absolute timing difference.

After acquiring the at least one predicted absolute timing difference, the terminal may process the timing value adjustment command for the first TAG according to the preset policy and the at least one predicted absolute timing difference.

Specifically, the processing of the timing value adjustment command may be any one of the following:

when it is determined that the at least one predicted absolute timing difference is greater than a maximum timing difference reference value, the timing value adjustment command for the first TAG is not executed; or in a case in which after a transmit timing value of the first TAG is adjusted, an absolute value of a difference between a transmit timing value of the first TAG after the adjustment and the transmit timing value of each TAG, except the first TAG, in the TAG set is less than or equal to the maximum timing difference reference value, the transmit timing value of the first TAG is adjusted; or when it is determined that the at least one predicted absolute timing difference is less than or equal to the maximum timing difference reference value, the transmit timing value of the first TAG is adjusted according to the timing value adjustment command for the first TAG; or when it is determined that the at least one predicted absolute timing difference is greater than the maximum timing difference reference value, the timing value adjustment command for the first TAG may also be ignored, that is, the timing value adjustment command for the first TAG is not executed; or when it is determined that the at least one absolute timing difference is greater than the maximum timing difference reference value, and it is determined that a predicted absolute timing difference corresponding to the absolute timing difference is greater than the absolute timing difference, the timing value adjustment command for the first TAG may also be ignored, that is, the timing value adjustment command for the first TAG is not executed, where the absolute timing difference is an absolute timing difference obtained by calculating an absolute value of a difference between a current transmit timing value of the TAG and the transmit timing value of each TAG, except the first TAG, in the TAG set.

It should be noted that the network device in this embodiment of the present invention may be a network side device, such as a base station, that can provide a service for the terminal in this embodiment, which is not specifically limited herein in this embodiment of the present invention.

According to the timing value adjustment method provided in this embodiment of the present invention, a timing value adjustment command for a first TAG is acquired, a transmit timing value of the first TAG is predicted according to the timing value adjustment command for the first TAG, to obtain a predicted transmit timing value of the first TAG, an absolute value of a difference between the predicted transmit timing value of the first TAG and a transmit timing value of each TAG, except the first TAG, in a TAG set is calculated, to obtain a predicted absolute timing difference, and then the timing value adjustment command for the first TAG is processed according to a preset policy and the at least one predicted absolute timing difference. The timing value adjustment command for the first TAG is processed by using the preset policy and the at least one predicted absolute timing difference, which resolves a problem that power of a terminal exceeds a limit, where the problem is caused by directly adjusting the transmit timing value of the first TAG according to the timing value adjustment command for the first TAG when at least one predicted absolute timing difference is greater than a maximum timing difference reference value.

Embodiment 3

Figure 3:
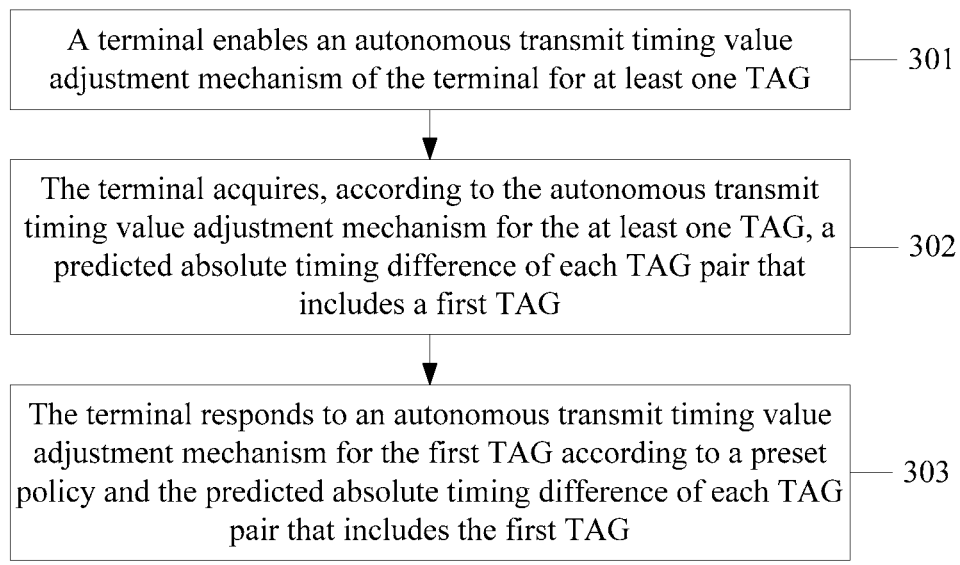
FIG. 3 is a flowchart of a timing value adjustment method according to Embodiment 3 of the present invention.

Embodiment 3 of the present invention provides a timing value adjustment method. As shown in FIG. 3, the method may be applied to a terminal. The terminal sends uplink data in a same subframe by using at least two carriers, and the terminal includes at least two TAGs in the subframe, where carriers that have a same transmit timing and are in at least two carriers included in the terminal belong to a same TAG. The method may include the following steps:

301. The terminal enables an autonomous transmit timing value adjustment mechanism of the terminal for at least one TAG.

The terminal may enable the autonomous transmit timing value adjustment mechanism of the terminal for the at least one TAG by using an autonomous timing value adjustment mechanism.

302. The terminal acquires, according to the autonomous transmit timing value adjustment mechanism for the at least one TAG, a predicted absolute timing difference of each TAG pair that includes a first TAG.

The predicted absolute timing difference of the TAG pair is, in a case in which it is assumed that an autonomous adjustment operation is performed on a transmit timing value of the first TAG according to an autonomous transmit timing value adjustment mechanism for the first TAG, a difference between transmit timing values of the two TAGs included in the TAG pair.

303. The terminal responds to the autonomous transmit timing value adjustment mechanism for the first TAG according to a preset policy and the predicted absolute timing difference of each TAG pair that includes the first TAG.

It should be noted that, for specific descriptions of step 301 to step 303 in Embodiment 3 of the present invention, refer to specific descriptions of corresponding content of step 201 to step 202 in Embodiment 2 of the present invention, and details are not described again in this embodiment of the present invention.

According to the timing value adjustment method provided in this embodiment of the present invention, a timing value adjustment mechanism for at least one TAG is enabled, a predicted absolute timing difference of each TAG pair that includes a first TAG is acquired according to the autonomous transmit timing value adjustment mechanism for the at least one TAG, and then an autonomous transmit timing value adjustment mechanism for the first TAG is responded to according to a preset policy and the predicted absolute timing difference of each TAG pair that includes the first TAG. The autonomous transmit timing value adjustment mechanism for the first TAG is responded to by using the preset policy and the predicted absolute timing difference of each TAG pair that includes the first TAG, which resolves a problem that power of a terminal exceeds a limit, where the problem is caused if an adjustment is directly performed according to a timing value adjustment command when a predicted absolute timing difference of at least one TAG pair that includes the first TAG is greater than or equal to a maximum timing difference reference value.

Embodiment 4

Figure 4:
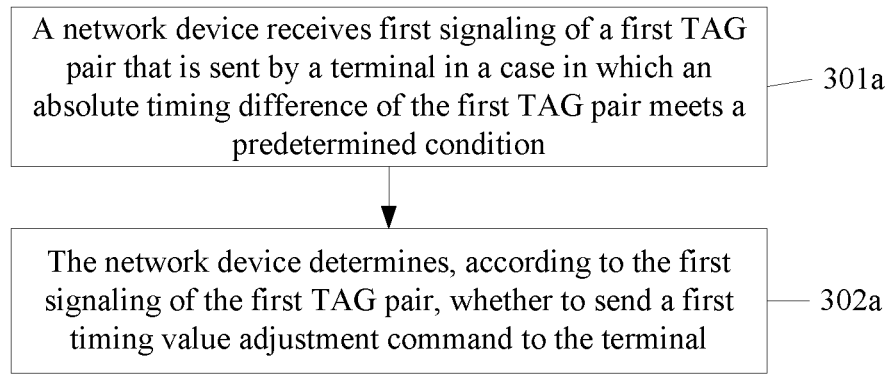
FIG. 4 is a flowchart of a timing value adjustment method according to Embodiment 4 of the present invention.

Embodiment 4 of the present invention provides a timing value adjustment method. As shown in FIG. 4, the method may include the following steps:

301a. A network device receives first signaling of a first TAG pair that is sent by a terminal in a case in which an absolute timing difference of the first TAG pair meets a predetermined condition.

The first signaling of the first TAG pair includes identifiers of the two TAGs in the first TAG pair.

302a. The network device determines, according to the first signaling of the first TAG pair, whether to send a first timing value adjustment command to the terminal.

The first timing value adjustment command is a timing value adjustment command for either TAG included in the first TAG pair.

According to the timing value adjustment method provided in this embodiment of the present invention, a network device receives first signaling of a first TAG pair that is sent by a terminal in a case in which an absolute timing difference of the first TAG pair meets a predetermined condition, and determines, according to the first signaling of the first TAG pair, whether to send a first timing value adjustment command to the terminal. In this way, the network device may be prevented from sending, to the terminal, timing value adjustment signaling that enables, after the terminal performs an adjustment according to the first timing value adjustment command, the absolute timing difference of the TAG pair to be closer to or further greater than a maximum timing difference reference value, thereby reducing a probability that power of the terminal exceeds a limit.

Embodiment 5

Figure 5:
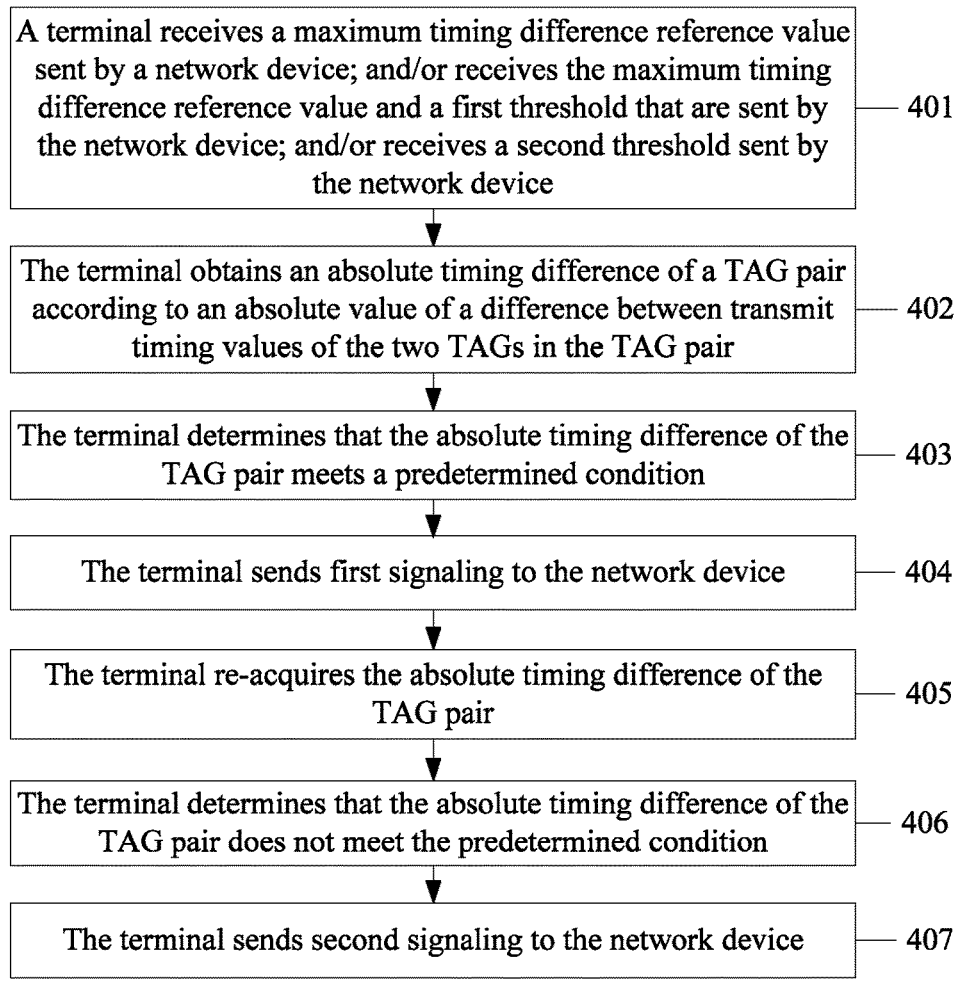
FIG. 5 is a flowchart of a timing value adjustment method according to Embodiment 5 of the present invention.

Embodiment 5 of the present invention provides a timing value adjustment method. As shown in FIG. 5, the method may be applied to a terminal. The terminal sends uplink data in a same subframe by using at least two carriers, and the terminal includes at least two TAGs in the subframe, where the at least two TAGs form a TAG set in this embodiment of the present invention, and carriers that have a same transmit timing and are in at least two carriers included in the terminal belong to a same TAG. The method may include the following steps:

It should be noted that, in this embodiment of the present invention, to facilitate understanding by a person skilled in the art, this embodiment of the present invention is described by using an example in which an absolute timing difference is an absolute value of a difference between transmit timing values of the two TAGs included in a TAG pair. For a specific implementation process in which an absolute timing difference is an absolute value of a difference between receive timing values of the two TAGs included in a TAG pair, refer to the specific implementation process in which the absolute timing difference is the absolute value of the difference between the transmit timing values of the two TAGs included in the TAG pair, and details are not described herein again in this embodiment of the present invention.

401. The terminal receives a maximum timing difference reference value sent by a network device; and/or receives the maximum timing difference reference value and a first threshold that are sent by the network device; and/or receives a second threshold sent by the network device.

The first threshold and the second threshold may be used to determine the absolute value of the difference between the transmit timing values of the two TAGs included in the TAG pair, that is, whether an absolute timing difference of the TAG pair is close to the maximum timing difference reference value. Specifically, actual values of the first threshold and the second threshold may be determined according to a requirement in an actual application scenario, which is not specifically limited herein in this embodiment of the present invention. The first threshold is a threshold of a difference between the maximum timing difference reference value and the absolute timing difference of the TAG pair. The second threshold is a threshold that is at least one minimum time unit less than the maximum timing difference reference value.

Optionally, the network device may include the maximum timing difference reference value, and/or the maximum timing difference reference value and the first threshold, and/or the second threshold in Media Access Control (MAC) layer signaling and send the signaling to the terminal. In this case, the terminal may receive the maximum timing difference reference value, and/or the maximum timing difference reference value and the first threshold, and/or the second threshold that are sent by the network device and carried in the MAC layer signaling. Alternatively, the network device may also include the maximum timing difference reference value, and/or the maximum timing difference reference value and the first threshold, and/or the second threshold in a radio resource control (RRC) message and send the RRC message to the terminal. In this case, the terminal may receive the maximum timing difference reference value, and/or the maximum timing difference reference value and the first threshold, and/or the second threshold that are sent by the network device and carried in the RRC message.

It should be noted that the maximum timing difference reference value, the first threshold, and the second threshold may also be pre-configured in the terminal, that is, step 401 may be an optional step.

402. The terminal obtains an absolute timing difference of a TAG pair according to an absolute value of a difference between transmit timing values of the two TAGs in the TAG pair.

The TAG pair is formed by any two TAGs in the TAG set.

Specifically, to determine an actual difference between transmit timing values of the two TAGs in a TAG pair included in the terminal, the terminal may obtain the absolute timing difference of the TAG pair according to the absolute value of the difference between the transmit timing values of the two TAGs in the TAG pair.

It should be noted that, in this embodiment, there is no limitation on a sequence for performing step 401 and step 402, and generally, the steps may be performed at the same time. That is, when the terminal needs to obtain the maximum timing difference reference value, and/or the maximum timing difference reference value and the first threshold, and/or the second threshold from the network device side, it is only required to obtain the maximum timing difference reference value, and/or the maximum timing difference reference value and the first threshold, and/or the second threshold before step 403 is performed.

403. The terminal determines that the absolute timing difference of the TAG pair meets a predetermined condition.

After obtaining the absolute timing difference of the TAG pair, the terminal may determine whether the absolute timing difference of the TAG pair meets the predetermined condition, and perform the following step 404 when determining that the absolute timing difference of the TAG pair meets the predetermined condition. The predetermined condition that is met may include any one of the following: a difference between the maximum timing difference reference value and the absolute timing difference of the TAG pair is less than or equal to the first threshold, the absolute timing difference of the TAG pair is greater than or equal to the second threshold, and the absolute timing difference of the TAG pair is greater than or equal to the maximum timing difference reference value.

Specifically, the determining, by the terminal, whether the absolute timing difference of the TAG pair meets the predetermined condition is mainly used to determine whether the absolute timing difference of the TAG pair is close to, or equal to, or greater than the maximum timing difference reference value. The determining whether the absolute timing difference of the TAG pair is close to the maximum timing difference reference value may be determining whether the difference between the maximum timing difference reference value and the absolute timing difference of the TAG pair is less than or equal to the first threshold. When it is determined that the difference between the maximum timing difference reference value and the absolute timing difference of the TAG pair is less than or equal to the first threshold, it may be considered that the absolute timing difference of the TAG pair is already close to the maximum timing difference reference value. Specifically, the difference between the maximum timing difference reference value and the absolute timing difference of the TAG pair in this embodiment of the present invention refers to a difference obtained by subtracting the absolute timing difference of the TAG pair from the maximum timing difference reference value. For example, the maximum timing difference reference value is 30 µs, the first threshold is 0.1 µs, and the absolute timing difference of the TAG pair that is obtained in step 402 is 29.95 µs; then, it may be obtained that the difference between the maximum timing difference reference value and the absolute timing difference of the TAG pair is 0.05 µs, which is less than the first threshold 0.1 µs. In other words, in this case, it may indicate that the absolute timing difference of the TAG pair is already close to the maximum timing difference reference value, that is, the absolute timing difference of the TAG pair meets the predetermined condition. The determining whether the absolute timing difference of the TAG pair is close to the maximum timing difference reference value may also be determining whether the absolute timing difference of the TAG pair is greater than or equal to the second threshold. When it is determined that the absolute timing difference of the TAG pair is greater than or equal to the second threshold, it may be considered that the absolute timing difference of the TAG pair is already close to the maximum timing difference reference value, where the second threshold may be a value infinitely close to the maximum timing difference reference value. For example, the maximum timing difference reference value is 30 µs, and the second threshold is 29.9 µs; when the absolute timing difference of the TAG pair that is obtained in step 402 is 29.95 µs, it may be obtained that the absolute timing difference of the TAG pair, that is, 29.95 µs, is greater than the second threshold 29.9 µs. In other words, in this case, it may indicate that the absolute timing difference of the TAG pair is already close to the maximum timing difference reference value, that is, the absolute timing difference of the TAG pair meets the predetermined condition. The determining whether the absolute timing difference of the TAG pair is greater than or equal to the maximum timing difference reference value may be directly determining whether the absolute timing difference of the TAG pair is equal to the maximum timing difference reference value. For example, the maximum timing difference reference value is 30 µs, the absolute timing difference of the TAG pair that is obtained in step 402 is also 30 µs; in this case, it may be determined that the absolute timing difference of the TAG pair is equal to the maximum timing difference reference value, that is, the absolute timing difference reference value of the TAG pair meets the predetermined condition. Alternatively, the determining whether the absolute timing difference of the TAG pair is greater than or equal to the maximum timing difference reference value may be directly determining whether the absolute timing difference of the TAG pair is greater than the maximum timing difference reference value. For example, the maximum timing difference reference value is 30 µs, the absolute timing difference of the TAG pair that is obtained in step 402 is 30.5 µs; in this case, it may be determined that the absolute timing difference of the TAG pair is greater than the maximum timing difference reference value, that is, the absolute timing difference reference value of the TAG pair meets the predetermined condition.

It should be noted that, to help a person skilled in the art understand this embodiment of the present invention, in this embodiment of the present invention, the implementation process of this embodiment of the present invention is described by using an example in which the maximum timing difference reference value is 30 µs. A specific value of the maximum timing difference reference value may be acquired according to a requirement in a specific application scenario, and this embodiment of the present invention imposes no limitation herein on a specific value of the maximum timing difference reference value.

404. The terminal sends first signaling to the network device.

After the terminal determines that the absolute timing difference of the TAG pair meets the predetermined condition, the terminal may send the first signaling to the network device, where the first signaling is used to notify the network device that the absolute timing difference of the TAG pair is already close to, or equal to, or greater than the maximum timing difference reference value.

Specifically, in an application scenario of this embodiment of the present invention, when the terminal includes two TAGs, that is, the terminal includes only one TAG pair, the terminal may directly perform step 402 to step 403, determine whether an absolute timing difference of the TAG pair meets the predetermined condition, and perform step 404 when it is determined that the absolute timing difference of the TAG pair meets the predetermined condition. In this case, the first signaling sent by the terminal to the network device in step 404 is used to indicate that the absolute timing difference of the TAG pair meets the predetermined condition, that is, the absolute timing difference of the TAG pair is already close to, or equal to, or greater than the maximum timing difference reference value.

In another application scenario of this embodiment of the present invention, if the terminal includes more than two TAGs, that is, the terminal includes at least two TAG pairs, the terminal may perform step 402 to step 404 for each TAG pair in the included at least two TAG pairs. That is, for each TAG pair in the at least two TAG pairs, the terminal may first obtain an absolute timing difference of the TAG pair, and send first signaling to the network device when it is determined in step 403 that the absolute timing difference of the TAG pair meets the predetermined condition. In this case, the first signaling is used to indicate that the absolute timing difference of the TAG pair meets the predetermined condition, that is, the absolute timing difference of the TAG pair is already close to, or equal to, or greater than the maximum timing difference reference value. The terminal may also first repeatedly perform step 402 for the included at least two TAG pairs to obtain an absolute timing difference of each TAG pair in the at least two TAG pairs, and then repeatedly perform step 403 to determine whether the absolute timing difference of each TAG pair in the at least two TAG pairs meets the predetermined condition. In this case, if at least one TAG pair that meets the predetermined condition is obtained, the terminal may send first signaling to the network device. In this case, the first signaling may be used to notify the network device that an absolute timing difference of a TAG pair in the at least one TAG pair that meets the predetermined condition meets the predetermined condition, that is, an absolute timing difference of a TAG pair in the at least one TAG pair that meets the predetermined condition is already close to, or equal to, or greater than the maximum timing difference reference value. Then, for each TAG pair in other TAG pairs in the at least one TAG pair that meets the predetermined condition, the terminal may send the first signaling to the network device, so that the network device is notified of this status in which all TAG pairs in the at least one TAG pair that meets the predetermined condition already meet the predetermined condition. Certainly, for one or several TAG pairs in the at least one TAG pair that meets the predetermined condition, the terminal may also send a piece of first signaling to the network device. In this case, the first signaling is used to indicate that an absolute timing difference of the one TAG pair or absolute timing differences of the several TAG pairs in the at least one TAG pair that meets the predetermined condition are already close to, or equal to, or greater than the maximum timing difference reference value.

Further, optionally, to enable the network device to learn in real time whether the absolute timing difference of the at least one TAG pair included in the terminal is already close to, or equal to, or greater than the maximum timing difference reference value, the terminal may periodically perform step 402 to step 404. Certainly, it may be understood that, in this embodiment of the present invention, after step 402 is periodically performed, that is, the absolute timing difference of the TAG pair is periodically obtained according to the absolute value of the difference between transmit timing values of the two TAGs in the TAG pair, step 403 and step 404 are performed only after the absolute timing difference of the TAG pair that is obtained in step 402 meets the predetermined condition, that is, step 403 and step 404 are performed only when the absolute timing difference of the TAG pair that is obtained in step 402 is already close to, or equal to, or greater than the maximum timing difference reference value.

The first signaling described in this embodiment of the present invention may include identifiers of the two TAGs in a TAG pair. Optionally, the first signaling may further include at least one of the following parameters: the absolute timing difference of the TAG pair, a difference between the absolute timing difference of the TAG pair and the maximum timing difference reference value, and an alarm indication, where the alarm indication is used to indicate that the absolute timing difference of the TAG pair meets the predetermined condition. It may be understood that the identifiers of the two TAGs in the TAG pair that are included in the first signaling refer to identifiers of the two TAGs in a TAG pair that meets the predetermined condition. The absolute timing difference of the TAG pair that is included in the first signaling refers to an absolute value of a difference between transmit timing values of the two TAGs in the TAG pair that meets the predetermined condition. The difference between the absolute timing difference of the TAG pair and the maximum timing difference reference value that is included in the first signaling refers to a difference between an absolute timing difference of the TAG pair that meets the predetermined condition and the maximum timing difference reference value. The alarm indication included in the first signaling refers to an alarm indication for the TAG that meets the predetermined condition.

Preferably, the difference between the absolute timing difference of the TAG pair and the maximum timing difference reference value that is included in the first signaling in this embodiment of the present invention may be optimally an absolute difference between the absolute timing difference of the TAG pair and the maximum timing difference reference value. However, this embodiment of the present invention imposes no limitation herein on a specific case of the difference between the absolute timing difference of the TAG pair and the maximum timing difference reference value, and a person skilled in the art may perform selection as required.

Further, optionally, the first signaling may be carried in Media Access Control MAC layer signaling and sent to the network device, or the first signaling may be carried in an RRC message and sent to the network device.

Figure 6:
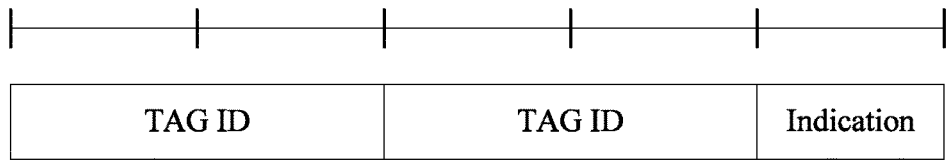
FIG. 6 is a schematic structural diagram of a type of signaling according to Embodiment 5 of the present invention.

Exemplarily, in this embodiment of the present invention, to facilitate understanding by a person skilled in the art, that the first signaling is carried in the MAC layer signaling and sent to the network device is used as an example for specific description. Specifically, an example of a format of the first signaling is as follows:

For example, a format of the first signaling is shown in FIG. 6. It may be understood that, in this case, the first signaling includes five bits. For each TAG pair in the at least one TAG pair that meets the predetermined condition, the first signaling may be sent to the network device by using the signaling format shown in FIG. 6, where the first signaling is used to notify the network device that an absolute timing difference of the TAG pair meets the predetermined condition, that is, the absolute timing difference of the TAG pair is already close to, or equal to, or greater than the maximum timing difference reference value. It may be specifically that: a TAG ID field of the first and second bits may represent an identifier of a TAG whose transmit timing is earlier in the two TAGs included in the TAG pair; a TAG ID field of the third and fourth bits may represent an identifier of a TAG whose transmit timing is later in the two TAGs included in the TAG pair; and an indication field of the fifth bit may represent an alarm indication indicating that an absolute value of a difference between transmit timing values of the two TAGs included in the TAG pair is close to, or equal to, or greater than the maximum timing difference reference value, that is, the indication field may represent an alarm indication indicating that an absolute timing difference of the TAG pair is close to, or equal to, or greater than the maximum timing difference reference value (meets the predetermined condition). For example, '1' may be used to indicate that the absolute timing difference of the TAG pair is close to, or equal to, or greater than the maximum timing difference reference value. Certainly, if the fifth bit is '0', the absolute timing difference of the TAG pair is far from or less than the maximum timing difference reference value, that is, the predetermined condition is not met. In this case, when receiving first signaling sent by the terminal, the network device may parse the first signaling to learn whether the absolute timing difference reference value of the TAG pair meets the predetermined condition. For whether the absolute timing difference of the TAG pair meets the predetermined condition, refer to the description in step 403.

Figure 7:
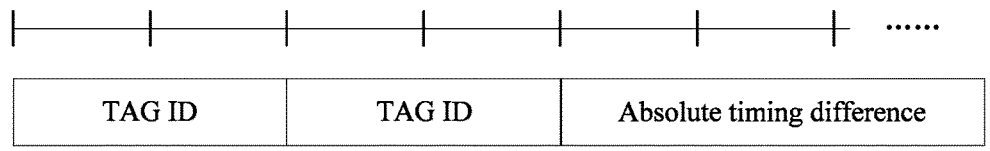
FIG. 7 is a schematic structural diagram of another type of signaling according to Embodiment 5 of the present invention.

For another example, another format of the first signaling is shown in FIG. 7. It may be understood that, for each TAG pair in the at least one TAG pair that meets the predetermined condition, the first signaling may be sent to the network device by using the signaling format shown in FIG. 7, where the first signaling is used to notify the network device that an absolute timing difference of the TAG pair meets the predetermined condition, that is, the absolute timing difference of the TAG pair is already close to, or equal to, or greater than the maximum timing difference reference value. It may be specifically that: a TAG ID field of the first and second bits may represent an identifier of a TAG whose transmit timing is earlier in the two TAGs included in the TAG pair; a TAG ID field of the third and fourth bits may represent an identifier of a TAG whose transmit timing is later in the two TAGs included in the TAG pair; and bits starting from the fifth bit may be used to represent an absolute timing difference between transmit timing values of the two TAGs included in the TAG pair, where a difference between the transmit timing values of the two TAGs included in the TAG pair may preferably refer to an absolute difference. That is, the absolute timing difference of the TAG pair may be obtained by subtracting a transmit timing value of the TAG whose transmit timing is earlier in the two TAGs included in the TAG pair from a transmit timing value of the TAG whose transmit timing is later in the two TAGs included in the TAG pair. Certainly, the absolute timing difference of the TAG pair may also be obtained by subtracting the transmit timing value of the TAG whose transmit timing is later in the two TAGs included in the TAG pair from the transmit timing value of the TAG whose transmit timing is earlier in the two TAGs included in the TAG pair, and obtaining an absolute value. It may be understood that the absolute timing difference of the TAG pair represents an absolute value of a difference between transmit timing values of the two TAGs included in the TAG pair that are in a same subframe.

It should be noted that in an actual application scenario, a quantity of bits used to represent the absolute timing difference of the TAG pair may be determined according to a requirement in an actual application scenario, and is not limited herein in this embodiment of the present invention.

Figure 8:
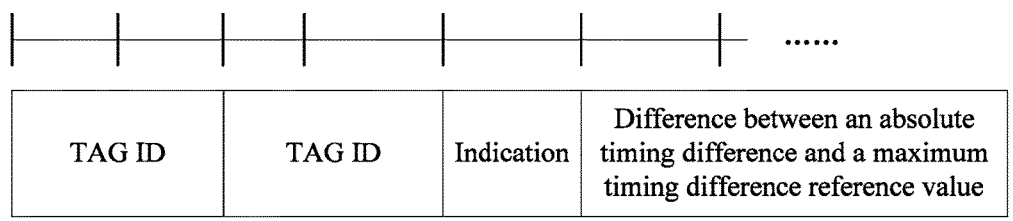
FIG. 8 is a schematic structural diagram of another type of signaling according to Embodiment 5 of the present invention.

For another example, another format of the first signaling is shown in FIG. 8. It may be understood that, for each TAG pair in the at least one TAG pair that meets the predetermined condition, the first signaling may be sent to the network device by using the signaling format shown in FIG. 8, where the first signaling is used to notify the network device that an absolute timing difference of the TAG pair meets the predetermined condition, that is, the absolute timing difference of the TAG pair is already close to, or equal to, or greater than the maximum timing difference reference value. It may be specifically that: a TAG ID field of the first and second bits may represent an identifier of a TAG whose transmit timing is earlier in the two TAGs included in the TAG pair; a TAG ID field of the third and fourth bits may represent an identifier of a TAG whose transmit timing is later in the two TAGs included in the TAG pair; an indication of the fifth bit may indicate that an absolute value of a difference between transmit timing values of the two TAGs included in the TAG pair is greater than or equal to the maximum timing difference reference value (for example, when the fifth bit is "1", the absolute value of the difference between the transmit timing values of the two TAGs included in the TAG pair, that is, an absolute timing difference of the TAG pair, is greater than or equal to the maximum timing difference reference value), or may indicate that an absolute value of a difference between transmit timing values of the two TAGs included in the TAG pair is less than the maximum timing difference reference value (for example, when the fifth bit is "0", the absolute value of the difference between the transmit timing values of the two TAGs included in the TAG pair is less than the maximum timing difference reference value); bits starting from the sixth bit represent a difference between the maximum timing difference reference value and the difference between the transmit timing values of the two TAGs included in the TAG pair, where the difference between the transmit timing values of the two TAGs included in the TAG pair may refer to an absolute difference, that is, the absolute timing difference of the TAG pair may be obtained by subtracting a transmit timing value of the TAG whose transmit timing is earlier in the two TAGs included in the TAG pair from a transmit timing value of the TAG whose transmit timing is later in the two TAGs included in the TAG pair. Certainly, the absolute timing difference of the TAG pair may also be obtained by subtracting the transmit timing value of the TAG whose transmit timing is later in the two TAGs included in the TAG pair from the transmit timing value of the TAG whose transmit timing is earlier in the two TAGs included in the TAG pair, and obtaining an absolute value. In addition, the absolute timing difference of the TAG pair represents an absolute value of a difference between transmit timing values of the two TAGs included in the TAG pair that are in a same subframe. A difference between the maximum timing difference reference value and the difference between the transmit timing values of the two TAGs included in the TAG pair, that is, the absolute timing difference of the TAG pair, may also be an absolute difference and may be formed by several bits. For example, when the two TAGs included in the TAG pair are respectively TAG1 and TAG2, an identifier of TAG1 is 01, a transmit timing value of TAG1 in a subframe n is 65 µs, an identifier of TAG2 is 10, a transmit timing value of TAG2 in the subframe n is 36 µs, the maximum timing difference reference value is 30 µs, and the first threshold is 2 µs, it may be learned that an absolute value of a difference between the transmit timing value of TAG1 and the transmit timing value of TAG2 is 29 µs, that is, the absolute timing difference of the TAG pair is 29 µs, and a difference between the absolute timing difference of the TAG pair and the maximum timing difference reference value is 1 µs, which is less than the first threshold 2 µs, that is, the absolute timing difference of the TAG pair meets the predetermined condition. In this case, the terminal may send first signaling to the network device, where the first signaling is used to notify that the absolute timing difference of the TAG pair is close to the maximum timing difference reference value. Specifically, referring to FIG. 8, for example, two bits are used to represent the difference between the absolute timing difference of the TAG pair and the maximum timing difference reference value, and it may be learned that the first signaling may be specifically 01100010110001.

It should be noted that a quantity of bits used to represent the difference between the absolute timing difference of the TAG pair and the maximum timing difference reference value may be determined according to a requirement in an actual application scenario, and is not limited herein in this embodiment of the present invention.

Figure 9:
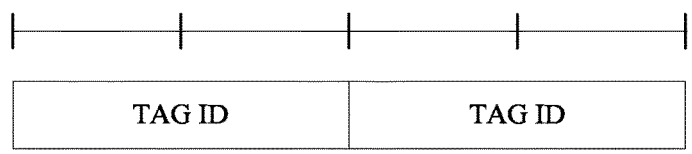
FIG. 9 is a schematic structural diagram of another type of signaling according to Embodiment 5 of the present invention.

For another example, another format of the first signaling is shown in FIG. 9. It may be understood that, for each TAG pair in the at least one TAG pair that meets the predetermined condition, the first signaling may be sent to the network device by using the signaling format shown in FIG. 9, where the first signaling is used to notify the network device that an absolute timing difference of the TAG pair meets the predetermined condition, that is, the absolute timing difference of the TAG pair is already close to, or equal to, or greater than the maximum timing difference reference value. It may be specifically that: a TAG ID field of the first and second bits may represent an identifier of a TAG whose transmit timing is earlier in the two TAGs included in the TAG pair; a TAG ID field of the third and fourth bits may represent an identifier of a TAG whose transmit timing is later in the two TAGs included in the TAG pair.

It should be noted that when the network device receives first signaling of such a format for the first time, it may be considered that an absolute value of a difference between transmit timing values of the two TAGs included in the TAG pair is already close to, or equal to, or greater than the maximum timing difference reference value. When the network device receives first signaling of such a format for the second time, it may be considered that the absolute value of the difference between the transmit timing values of the two TAGs included in the TAG pair is already far from or less than the maximum timing difference reference value. When the network device receives first signaling of such a format for the third time, it may be considered that the absolute value of the difference between the transmit timing values of the two TAGs included in the TAG pair is again in a state of being close to, or equal to, or greater than the maximum timing difference reference value; and the rest can be deduced by analogy. That is, among multiple times for sending first signaling to the network device, an odd number of times indicates that the absolute value of the difference between the transmit timing values of the two TAGs included in the TAG pair is already close to, or equal to, or greater than the maximum timing difference reference value, and an even number of times indicates that the absolute value of the difference between the transmit timing values of the two TAGs included in the TAG pair is already far from or less than the maximum timing difference reference value.

Figure 10:
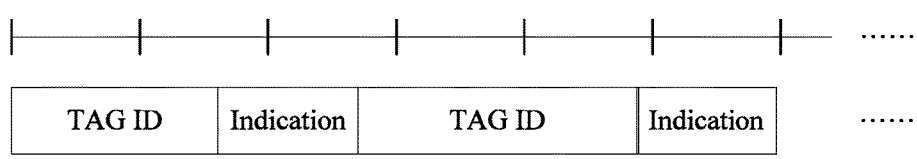
FIG. 10 is a schematic structural diagram of another type of signaling according to Embodiment 5 of the present invention.

For another example, another format of the first signaling is shown in FIG. 10. It may be understood that, when the terminal determines that there is at least one TAG pair that meets the predetermined condition, the network device may be notified, by using a piece of first signaling of the signaling format shown in FIG. 10, of a status in which there is at least one TAG pair that meets the predetermined condition. In this case, the first signaling is used to notify the network device that absolute timing differences of several TAG pairs meet the predetermined condition, that is, the absolute timing differences of the several TAG pairs are already close to, or equal to, or greater than the maximum timing difference reference value. It may be specifically that: this signaling format is formed by a TAG ID of two bits and an indication of one bit, which are used to indicate whether a TAG pair meets the predetermined condition; then, the three bits form one group, and the entire first signaling may be formed by multiple three-bit groups. In this way, the first signaling may be used to indicate that an alarm indicating that a transmit timing difference is close to, or equal to, or greater than the maximum timing difference reference value exists in multiple TAG pairs. The indication may be used to indicate that a transmit timing value of a TAG represented by a TAG ID of two bits preceding the indication is at an earlier or later time point. For example, "1" may be used to represent a later time point, and "0" may be used to represent an earlier time point. A specific example is as follows: The terminal includes three TAG pairs, and if TAG1-TAG2 is greater than or equal to the maximum timing difference reference value, and TAG1-TAG3 is greater than or equal to the maximum timing difference reference value. In this case, the signaling may be 011100110, which is parsed into 01, 1, 10, 0, 11, 0. The first and second bits 01 are an identifier of TAG1 and represent TAG1, and the third bit "1" indicates that TAG1 is sent at a later time point; the fourth and five bits 10 are an identifier of TAG2 and represent TAG2, and the sixth bit "0" indicates that TAG2 is sent at an earlier time point; the seventh and eighth bits 11 are an identifier of TAG3 and represent TAG3, and the ninth bit "0" indicates that TAG3 is sent at an earlier time point. Therefore, the first signaling represented by this bitstream is used to notify the network device that both TAG1-TAG2 and TAG1-TAG3 are close to, or equal to, or greater than the maximum timing difference reference value.

It should be noted that the foregoing formats of the first signaling that are shown in FIG. 6 to FIG. 10 are merely described as examples to facilitate understanding by a person skilled in the art. This embodiment of the present invention imposes no limitation on a specific format of the first signaling, identifiers of the two TAGs of the TAG pair that meets the predetermined condition, an absolute timing difference of the TAG pair, a difference between the absolute timing difference of the TAG pair and the maximum timing difference reference value, a quantity of bits separately occupied by an alarm indication in the first signaling.

It should be noted that, to enable the network device to learn in real time whether an absolute timing difference of each TAG pair in the at least one TAG pair included in the terminal meets the predetermined condition, step 402 to step 404 in this embodiment of the present invention may be periodically performed. That is, when the terminal periodically determines that there is at least one TAG pair whose absolute timing difference meets the predetermined condition in the at least one TAG pair included in the terminal, the first signaling may be periodically sent to the network device to periodically notify the network device that the at least one TAG pair already meets the predetermined condition. A signaling format that may be used to periodically send the first signaling to the network device may be any format shown in FIG. 6, FIG. 7, FIG. 8, and FIG. 10.

405. The terminal re-acquires the absolute timing difference of the TAG pair.

Optionally, when determining that the absolute timing difference of the TAG pair meets the predetermined condition and sending the first signaling to the network device, the terminal may further re-obtain the absolute timing difference of the TAG pair according to the absolute value of the difference between the transmit timing values of the two TAGs in the TAG pair. That is, in a process of periodically obtaining the absolute timing difference of the TAG pair according to the absolute value of the difference between the transmit timing values of the two TAGs in the TAG pair, after the terminal determines for the first time that the absolute timing difference of the TAG pair meets the predetermined condition and sends the first signaling to the network device, the terminal may further re-obtain the absolute timing difference of the TAG pair according to the absolute value of the difference between the transmit timing values of the two TAGs in the TAG pair that meets the predetermined condition, determine whether the re-obtained absolute timing difference of the TAG pair does not meet the predetermined condition, and perform the following step 406 and step 407 when determining that the absolute timing difference of the TAG pair does not meet the predetermined condition.

It should be noted that when the terminal includes one TAG pair that meets the predetermined condition, the terminal may directly re-acquire an absolute timing difference of the TAG pair that meets the predetermined condition. When the terminal includes two or more TAG pairs that meet the predetermined condition, the terminal may re-acquire an absolute timing difference of each TAG pair in the two or more TAG pairs that meet the predetermined condition.

406. The terminal determines that the absolute timing difference of the TAG pair does not meet the predetermined condition.

After re-acquiring the absolute timing difference of the TAG pair, the terminal may determine whether the absolute timing difference of the TAG pair does not meet the predetermined condition, and perform the following step 407 when determining that the absolute timing difference of the TAG pair does not meet the predetermined condition. That the predetermined condition is not met may include any one of the following: the difference between the maximum timing difference reference value and the absolute timing difference of the TAG pair is greater than the first threshold, the absolute timing difference of the TAG pair is less than the second threshold, and the absolute timing difference of the TAG pair is less than the maximum timing difference reference value.

Specifically, the determining, by the terminal, whether the re-acquired absolute timing difference of the TAG pair does not meet the predetermined condition is mainly used to determine whether the re-acquired absolute timing difference of the TAG pair is far from or less than the maximum timing difference reference value. The determining whether the absolute timing difference of the TAG pair is far from the maximum timing difference reference value may be determining whether the difference between the maximum timing difference reference value and the absolute timing difference of the TAG pair is greater than the first threshold. When it is determined that the difference between the maximum timing difference reference value and the absolute timing difference of the TAG pair is greater than the first threshold, it may be considered that the absolute timing difference of the TAG pair is already far from the maximum timing difference reference value. For example, the maximum timing difference reference value is 30 μs, the first threshold is 0.1 μs, and the absolute timing difference reference value of the TAG pair that is re-obtained in step 405 is 28 μs; then, it may be obtained that the difference between the maximum timing difference reference value and the absolute timing difference of the TAG pair is 2 μs, which is greater than the first threshold 0.1 μs. In other words, in this case, it may indicate that the absolute timing difference of the TAG pair is already far from the maximum timing difference reference value, that is, the re-acquired absolute timing difference of the TAG pair does not meet the predetermined condition. The determining whether the absolute timing difference of the TAG pair is far from the maximum timing difference reference value may also be determining whether the re-acquired absolute timing difference of the TAG pair is less than the second threshold. When it is determined that the absolute timing difference of the TAG pair is less than the second threshold, it may be considered that the absolute timing difference of the TAG pair is already far from the maximum timing difference reference value, where the second threshold may be a value infinitely close to the maximum timing difference reference value. For example, the maximum timing difference reference value is 30 μs, and the second threshold is 29.9 μs; when the absolute timing difference reference value of the TAG pair that is re-obtained in step 405 is 28 μs, it may be obtained that the absolute timing difference of the TAG pair, that is, 28 μs, is less than the second threshold 29.9 μs. In other words, in this case, it may indicate that the absolute timing difference of the TAG pair is already far from the maximum timing difference reference value, that is, the absolute timing difference of the TAG pair does not meet the predetermined condition. The determining whether the absolute timing difference of the TAG pair is less than the maximum timing difference reference value may be directly determining whether the absolute timing difference of the TAG pair is less than the maximum timing difference reference value. For example, the maximum timing difference reference value is 30 μs, the absolute timing difference reference value of the TAG pair that is obtained in step 405 is 28 μs; in this case, it may be determined that the absolute timing difference of the TAG pair is less than the maximum timing difference reference value, that is, the absolute timing difference reference value of the TAG pair does not meet the predetermined condition.

407. The terminal sends second signaling to the network device.

When the terminal determines that the absolute timing difference reference value of the TAG pair does not meet the predetermined condition, the terminal may send the second signaling to the network device, where the second signaling is used to notify the network device that the absolute timing difference of the TAG pair is already far from or less than the maximum timing difference reference value.

Specifically, in an application scenario of this embodiment of the present invention, when the terminal determines in step 403 that there is only one TAG pair that meets the predetermined condition, the terminal may directly perform step 405 to step 406, determine whether a re-obtained absolute timing difference of the TAG pair does not meet the predetermined condition, and perform step 407 when it is determined that the absolute timing difference of the TAG pair does not meet the predetermined condition. In this case, the second signaling sent by the terminal to the network device in step 407 is used to indicate that the absolute timing difference of the TAG pair does not meet the predetermined condition, that is, the absolute timing difference of the TAG pair is already far from or less than the maximum timing difference reference value.

In another application scenario of this embodiment of the present invention, when the terminal determines in step 403 that there are at least two TAG pairs that meet the predetermined condition, the terminal may perform step 405 to step 407 for each TAG pair in the at least two TAG pairs that meet the predetermined condition. That is, for each TAG pair in the at least two TAG pairs that meet the predetermined condition, the terminal may first re-obtain an absolute timing difference of the TAG pair, and send the second signaling to the network device when determining in step 406 that the absolute timing difference of the TAG pair does not meet the predetermined condition. In this case, the second signaling is used to indicate that the absolute timing difference of the TAG pair does not meet the predetermined condition, that is, the absolute timing difference of the TAG pair is already far from or less than the maximum timing difference reference value. The terminal may also first repeatedly perform step 405 for the at least two TAG pairs that meet the predetermined condition and are determined in step 403, to obtain an absolute timing difference of each TAG pair in the at least two TAG pairs that meet the predetermined condition, and then repeatedly perform step 406 to determine whether the absolute timing difference of each TAG pair in the at least two TAG pairs that meet the predetermined condition does not meet the predetermined condition. In this case, if at least one TAG pair that does not meet the predetermined condition is obtained, the terminal may send the second signaling to the network device. In this case, the second signaling may be used to notify the network device that an absolute timing difference of a TAG pair in the at least one TAG pair that does not meet the predetermined condition does not meet the predetermined condition, that is, an absolute timing difference of a TAG pair in the at least one TAG pair that does not meet the predetermined condition is already far from or less than the maximum timing difference reference value. Then, for each TAG pair in other TAG pairs in the at least one TAG pair that does not meet the predetermined condition, the terminal may send the second signaling to the network device, so that the network device is notified of this status in which all TAG pairs in the at least one TAG pair that does not meet the predetermined condition does not meet the predetermined condition. Certainly, for one or several TAG pairs in the at least one TAG pair that does not meet the predetermined condition, the terminal may also send a piece of second signaling to the network device. In this case, the second signaling is used to indicate that an absolute timing difference of the one TAG pair or absolute timing differences of the several TAG pairs in the at least one TAG pair that does not meet the predetermined condition are already far from or less than the maximum timing difference reference value.

The second signaling described in this embodiment of the present invention may include the identifiers of the two TAGs in the TAG pair. Optionally, the second signaling may further include at least one of the following parameters: the absolute timing difference of the TAG pair, the difference between the absolute timing difference of the TAG pair and the maximum timing difference reference value, and an alarm clearance indication, where the alarm clearance indication is used to indicate that the absolute timing difference of the TAG pair does not meet the predetermined condition. It may be understood that the identifiers of the two TAGs in the TAG pair that are included in the second signaling refer to identifiers of the two TAGs in a TAG pair that does not meet the predetermined condition. The absolute timing difference of the TAG pair that is included in the second signaling refers to an absolute value of a difference between transmit timing values of the two TAGs in the TAG pair that does not meet the predetermined condition. The difference between the absolute timing difference of the TAG pair and the maximum timing difference reference value that is included in the second signaling refers to a difference between an absolute timing difference of the TAG pair that does not meet the predetermined condition and the maximum timing difference reference value. The alarm clearance indication included in the second signaling refers to an alarm clearance indication for the TAG that does not meet the predetermined condition.

Further, optionally, the second signaling may be carried in MAC layer signaling and sent to the network device, or the second signaling may be carried in an RRC message and sent to the network device.

It should be noted that, for specific descriptions of signaling formats of the second signaling, refer to specific descriptions of the signaling formats of the first signaling in step 404 of this embodiment of the present invention, and details are not described herein again in this embodiment of the present invention.

Figure 11:
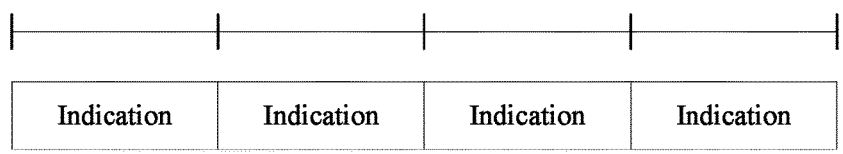
FIG. 11 is a schematic structural diagram of another type of signaling according to Embodiment 5 of the present invention.

For the signaling formats of the second signaling in this embodiment of the present invention, refer to the signaling formats shown in FIG. 6 to FIG. 10. In addition, a signaling format of the second signaling is further provided. As shown in FIG. 11, that it is determined in step 403 that a quantity of TAG pairs that meet the predetermined condition is 3 is used as an example. Three bits may be used to indicate whether absolute timing differences of the three TAG pairs that meet the predetermined condition in step 406 do not meet the predetermined condition. It may be understood that when an absolute timing difference of a TAG pair does not meet the predetermined condition, the absolute timing difference of the TAG pair is already far from or less than the maximum timing difference reference value. Specifically, in the signaling format shown in FIG. 9, an indication of one bit is used to indicate whether a corresponding TAG is far from or less than the maximum timing difference reference value, where the first bit represents a status of TAG1, the second bit represents a status of TAG2, and the rest can be deduced by analogy; and "1" may be used to indicate that an alarm is cleared. With reference to the example shown in FIG. 10, it may be obtained that TAG1-TAG2 is greater than or equal to the maximum timing difference reference value, and TAG1-TAG3 is greater than or equal to the maximum timing difference reference value. When TAG1-TAG2 is far from or less than the maximum transmit timing reference value, this signaling bitstream may be 0100, which is used to indicate that a transmit timing alarm for TAG2 is already cleared. After the network device receives second signaling sent by using the bitstream of 0100, it may be learned by means of signaling parsing that the transmit timing alarm for TAG2 is already cleared.

It should be noted that when determining, for the first time, that an absolute timing difference of a TAG pair is already close to, or equal to, or greater than the maximum timing difference reference value, the terminal may send, by using step 404, the first signaling to notify the network device. In this case, the terminal may further periodically determine whether the absolute timing difference of the TAG pair is still in a state of being close to, or equal to, or greater than the maximum timing difference reference value. If it is obtained, in a periodically determining process, that the absolute timing difference of the TAG pair always maintains the state of being close to, or equal to, or greater than the maximum timing difference reference value, the terminal does not need to repeatedly perform step 404 of notifying, by sending the first signaling, the network device of the state of the TAG pair, but only needs to send, by performing step 407, the second signaling to the network device when it is determined that the absolute timing difference of the TAG pair is far from or less than the maximum timing difference reference value, to clear an alarm for the TAG pair. Alternatively, when determining, for the first time, that an absolute timing difference of a TAG pair is already close to, or equal to, or greater than the maximum timing difference reference value, the terminal sends, by using step 404, the first signaling to notify the network device. In this case, the terminal may determine whether the terminal itself receives a timing value adjustment command for any TAG in the TAG pair that is sent by the network device and whether the terminal itself enables an autonomous transmit timing value adjustment mechanism for any TAG in the TAG pair. If the timing value adjustment command for any TAG in the TAG pair that is sent by the network device is not received, and the autonomous transmit timing value adjustment mechanism for any TAG in the TAG pair is not enabled, the absolute timing difference of the TAG pair is still in a state of being close to, or equal to, or greater than the maximum timing difference reference value. In this case, the terminal may not repeatedly perform step 404 of notifying, by sending the first signaling, the network device of the state of the TAG pair, not determine whether the absolute timing difference of the TAG pair is far from or less than the maximum timing difference reference value until an adjustment command for at least one TAG in the TAG pair that is sent by the network device is received or an autonomous transmit timing value adjustment mechanism for at least one TAG in the TAG pair is enabled, and when determining that the absolute timing difference of the TAG pair is far from or less than the maximum timing difference reference value, send the second signaling to the network device by performing step 407, to clear an alarm for the TAG pair.

Alternatively, when determining, for the first time, that an absolute timing difference of a TAG pair is already close to, or equal to, or greater than the maximum timing difference reference value, the terminal sends, by using step 404, the first signaling to notify the network device. Further, each time when periodically determining that the absolute timing difference of the TAG pair always maintains the state of being close to, or equal to, or greater than the maximum timing difference reference value, the terminal sends, by using step 404, the first signaling to notify the network device. Then, when it is determined that the absolute timing difference of the TAG pair is far from or less than the maximum timing difference reference value, the terminal sends the second signaling to the network device by performing step 407, to clear an alarm for the TAG pair.

It should be noted that the network device in this embodiment may be a network side device, such as a base station, that can provide a service for the terminal in this embodiment, which is not specifically limited herein in this embodiment of the present invention.

According to the timing value adjustment method provided in this embodiment of the present invention, a terminal obtains an absolute timing difference of a TAG pair according to an absolute value of a difference between transmit timing values or receive timing values of the two TAGs in the TAG pair, determines whether the absolute timing difference of the TAG pair meets a predetermined condition, and sends first signaling to a network device when the absolute timing difference of the TAG pair meets the predetermined condition. The terminal sends, to the network device when it is determined that the absolute timing difference of the TAG pair meets the predetermined condition, that is, the absolute timing difference of the TAG pair is close to, or equal to, or greater than a maximum timing difference reference value, first signaling of an alarm indication used to notify that the absolute timing difference of the TAG pair is already close to, or equal to, or greater than the maximum timing difference reference value, so that according to the first signaling, the network device may no longer send timing value adjustment signaling that enables the absolute timing difference of the TAG pair to be closer to or further greater than the maximum timing difference reference value, thereby reducing a probability that power of the terminal exceeds a limit.

In addition, when the absolute timing difference of the TAG pair does not meet the predetermined condition, that is, the absolute timing difference of the TAG pair is far from or less than the maximum timing difference reference value, the terminal may send second signaling to the network device, to clear an alarm for the TAG pair.

Embodiment 6

Figure 12:
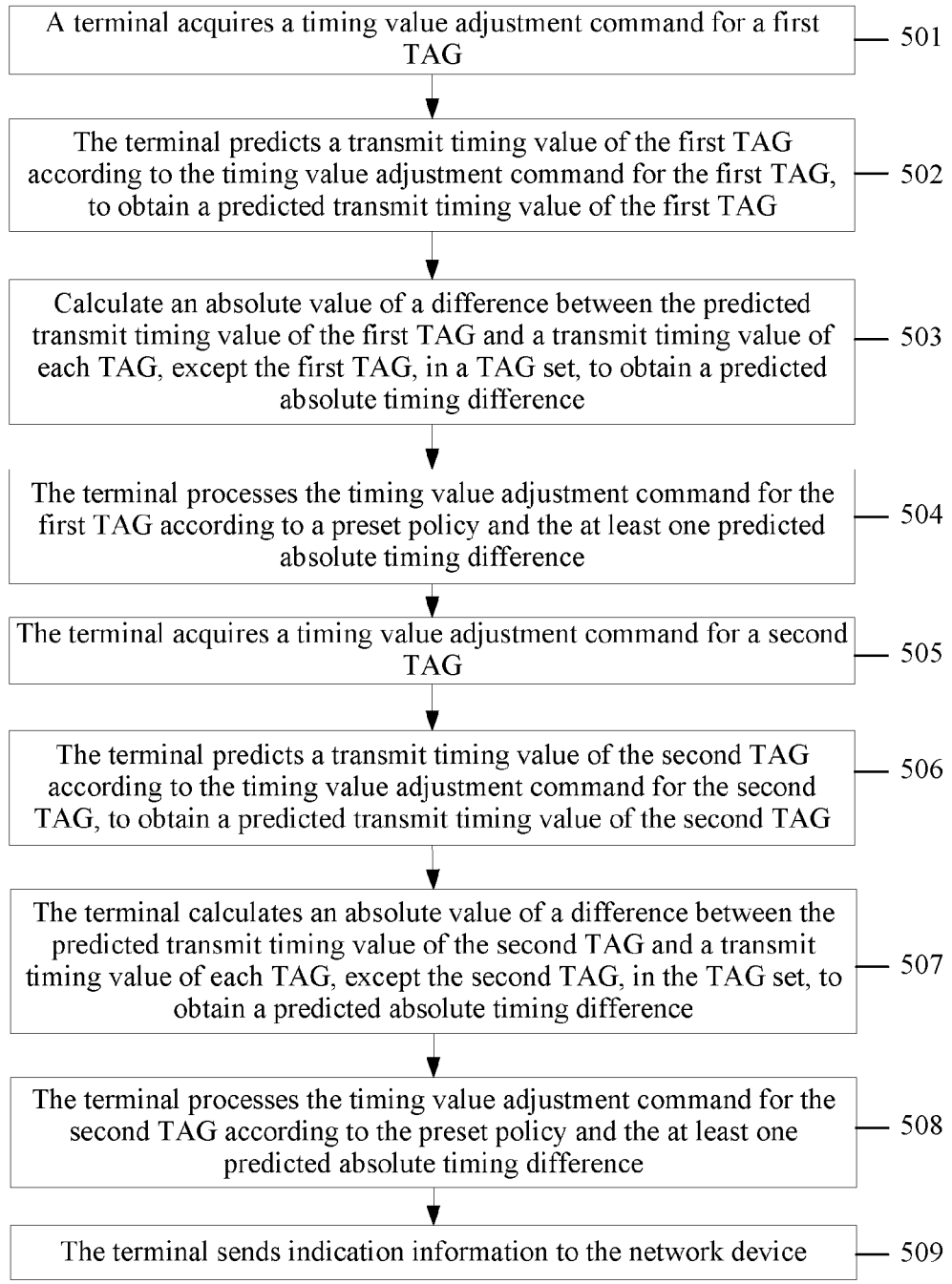
FIG. 12 is a flowchart of a timing value adjustment method according to Embodiment 6 of the present invention.

Embodiment 6 of the present invention provides a timing value adjustment method. As shown in FIG. 12, the method may be applied to a terminal. The terminal sends uplink data in a same subframe by using at least two carriers, and the terminal includes at least two TAGs in the subframe, where the at least two TAGs form a TAG set in this embodiment of the present invention, and carriers that have a same transmit timing and are in at least two carriers included in the terminal belong to a same TAG. The method may include the following steps:

501. The terminal acquires a timing value adjustment command for a first TAG.

Optionally, that the terminal acquires a timing value adjustment command for a first TAG may be specifically that: the terminal receives the timing value adjustment command for the first TAG that is sent by a network device.

Further, optionally, the network device may send a timing value adjustment command for at least one TAG to the terminal, where the timing value adjustment command for the at least one TAG includes the timing value adjustment command for the first TAG.

When determining that moments at which data sent by the terminal in a same subframe by using one or more TAGs arrives at the network device are not synchronous, the network device may send the timing value adjustment command for the at least one TAG to the terminal. In this case, the terminal may receive the timing value adjustment command for at least one TAG that is sent by the network device. The timing value adjustment command for the at least one TAG includes the timing value adjustment command for the first TAG, where the timing value adjustment command for the first TAG includes an identifier of the first TAG and adjustment information corresponding to the identifier of the first TAG.

Optionally, in an application scenario, when needing to send a timing value adjustment command for multiple TAGs to the terminal, the network device may also use one timing value adjustment command for indication. In this case, the timing value adjustment command is used to indicate an adjustment to transmit timing values of the multiple TAGs. Alternatively, in another application scenario, when needing to send a timing value adjustment command for multiple TAGs to the terminal, the network device may send one timing value adjustment command for each TAG in the multiple TAGs, which is not limited herein in this embodiment of the present invention.

502. The terminal predicts a transmit timing value of the first TAG according to the timing value adjustment command for the first TAG, to obtain a predicted transmit timing value of the first TAG.

503. Calculate an absolute value of a difference between the predicted transmit timing value of the first TAG and a transmit timing value of each TAG, except the first TAG, in the TAG set, to obtain a predicted absolute timing difference.

The TAG set includes at least one TAG in addition to the first TAG.

In step 502 and step 503, specifically, after receiving the timing value adjustment command for the first TAG that is sent by the network device, the terminal may obtain, according to the timing value adjustment command for the first TAG that includes the identifier of the first TAG, the adjustment information of the first TAG that is corresponding to the identifier of the first TAG. In this case, the terminal may predict the transmit timing value of the first TAG according to the adjustment information corresponding to the identifier of the first TAG that is included in the timing value adjustment command for the first TAG, to obtain the predicted transmit timing value of the first TAG. In this way, the absolute value of the difference between the predicted transmit timing value of the first TAG and the transmit timing value of each TAG, except the first TAG, in the TAG set may be calculated, to obtain the predicted absolute timing difference. For example, the terminal includes two TAGs, which are respectively TAG1 and TAG2, and before a timing value adjustment is performed, TAG1−TAG2=(X−1)µs, where X is a maximum timing difference reference value. If the network device considers that a transmit timing value of TAG2 needs to be adjusted (for example, a step for the timing value adjustment is 16 Ts), specifically, for example, the transmit timing value of TAG2 needs to be advanced by 2*16 Ts, which is approximately equal to 1.04

μs, the terminal receives timing value adjustment signaling for TAG2 that is sent by the network device, and adjustment information corresponding to an identifier of TAG2 is 2*16 Ts. In this case, the terminal may predict the transmit timing value of TAG2 according to the adjustment information corresponding to TAG2, to obtain a predicted transmit timing value of TAG2. In this way, the terminal may acquire, according to the predicted transmit timing value of TAG2, a predicted absolute timing difference of a TAG pair that is formed by TAG1 and TAG2. In this case, an obtained absolute timing difference is TAG1−TAG2=(X+0.04)μs.

It should be noted that when the terminal acquires the timing value adjustment command for the at least one TAG, if the timing value adjustment command for the at least one TAG includes a timing value adjustment command for a primary TAG, the first TAG is the primary TAG; if the timing value adjustment command for the at least one TAG does not include the timing value adjustment command for the primary TAG, the first TAG is any one of the at least one TAG.

504. The terminal processes the timing value adjustment command for the first TAG according to a preset policy and the at least one predicted absolute timing difference.

The TAG set includes at least one TAG in addition to the first TAG.

After obtaining, by means of calculation, the absolute value of the difference between the predicted transmit timing value of the first TAG and the transmit timing value of each TAG, except the first TAG, in the TAG set, to obtain the predicted absolute timing difference, the terminal may process the timing value adjustment command for the first TAG according to the preset policy and the at least one predicted absolute timing difference.

Specifically, one of the following steps may be included: 504a, 504b, and 504c.

504a. When it is determined that the at least one predicted absolute timing difference is greater than a maximum timing difference reference value, not execute the timing value adjustment command for the first TAG; or in a case in which after a transmit timing value of the first TAG is adjusted, an absolute value of a difference between a transmit timing value of the first TAG after the adjustment and the transmit timing value of each TAG, except the first TAG, in the TAG set is less than or equal to the maximum timing difference reference value, adjust the transmit timing value of the first TAG.

Specifically, after obtaining, by means of calculation, the absolute value of the difference between the predicted transmit timing value of the first TAG and the transmit timing value of each TAG, except the first TAG, in the TAG set, to obtain the predicted absolute timing difference, the terminal determines whether each predicted absolute timing difference in the obtained at least one predicted absolute timing difference is greater than the maximum timing difference reference value, and the timing value adjustment command for the first TAG may not be performed when it is determined that the at least one predicted absolute timing difference is greater than the maximum timing difference reference value. Alternatively, in the case in which after the transmit timing value of the first TAG is adjusted, the absolute value of the difference between the transmit timing value of the first TAG after the adjustment and the transmit timing value of each TAG, except the first TAG, in the TAG set is less than or equal to the maximum timing difference reference value, the terminal may adjust the transmit timing value of the first TAG as much as possible.

For example, the terminal includes two TAGs, which are respectively TAG1 and TAG2, and before a timing value adjustment is performed, TAG1−TAG2=(X−1)μs, where X is the maximum timing difference reference value. If the network device obtains that arriving times of TAG1 and TAG2 are not synchronous, the network device considers that a transmit timing value of TAG2 needs to be adjusted. Specifically, if the transmit timing value of TAG2 needs to be advanced by 2*16 Ts (2*16 Ts is two steps, which are approximately equal to 1.04 us). In this case, timing value adjustment signaling for TAG2 that is sent by the network device and received by the terminal includes an identifier of TAG2 and adjustment information corresponding to the identifier of TAG2, where the adjustment information is 2*16 Ts in advance. In this case, the terminal may obtain a predicted transmit timing value of TAG2 according to the adjustment information corresponding to TAG2, and then acquire an absolute value of a difference between the predicted transmit timing value of TAG2 and a transmit timing value of TAG1, that is, acquire a predicted absolute timing difference between TAG1 and TAG2. In this case, it is obtained that TAG1−TAG2=(X+0.04)μs. In this case, it may be determined that if TAG2 is adjusted according to the timing value adjustment command, TAG1−TAG2 is greater than the maximum timing difference reference value. In this case, the terminal may ignore the timing value adjustment command for TAG2, or may adjust the transmit timing value of TAG2 as much as possible according to the adjustment information corresponding to TAG2. For example, a maximum adjustment herein is one step, that is, the transmit timing value of TAG2 is further advanced by 1*16 Ts, which is approximately equal to 0.52 μs. In this way, the timing command sent by the network device is responded to, and it is also ensured, after TAG2 is adjusted, that an absolute timing difference of a TAG pair that is formed by TAG1 and TAG2 is less than the maximum timing difference reference value. Alternatively, when the terminal may determine that if TAG2 is adjusted according to the timing value adjustment command, TAG1−TAG2 is greater than the maximum timing difference reference value, the terminal may also directly ignore the timing value adjustment command.

For example, it is assumed that the terminal includes three TAGs, which are respectively TAG1, TAG2, and TAG3, and before a timing value adjustment is performed, TAG1−TAG2=(X−1)μs, and TAG1−TAG3=(X−2)μs, where X is the maximum timing difference reference value. If the network device considers that a transmit timing value of TAG1 needs to be adjusted, specifically, that is, if the transmit timing value of TAG2 needs to be delayed for 2*16 Ts (which is approximately equal to 1.04 us), timing value adjustment signaling for TAG1 that is sent by the network device and received by the terminal includes an identifier of TAG1 and adjustment information corresponding to the identifier of TAG1, where the adjustment information is a delay of 2*16 Ts. In this case, the terminal may obtain a predicted transmit timing value of TAG1 according to the adjustment information corresponding to TAG1, calculate an absolute value of a difference between the predicted transmit timing value of TAG1 and a transmit timing value of TAG2, and calculate an absolute value of a difference between the predicted transmit timing value of TAG1 and a transmit timing value of TAG3, that is, acquire a predicted absolute timing difference between TAG1 and TAG2 and a predicted absolute timing difference between TAG1 and TAG3. In this case, it is obtained that TAG1−TAG2=(X+0.04)μs, and TAG1−TAG3=(X−0.96)μs. In this case, it may be determined that in a case in which TAG1 is adjusted according to the timing value adjustment command, TAG1-TAG2 is greater than the maximum timing difference reference value, and TAG1-TAG3 is not greater than the maximum timing difference reference value. In this case, the terminal may directly ignore the timing value adjustment signaling for TAG1, or may adjust the transmit timing value of TAG1 as much as possible according to the adjustment information corresponding to TAG1. For example, a maximum adjustment herein is one step, that is, the transmit timing value of TAG1 is further delayed for 1*16 Ts, which is approximately equal to 0.52 μs. In this way, the timing command sent by the network device is responded to, and it is also ensured, after TAG1 is adjusted, that both an absolute timing difference of a TAG pair that is formed by TAG1 and TAG2 and an absolute timing difference of a TAG pair that is formed by TAG1 and TAG3 are less than the maximum timing difference reference value. Alternatively, when the terminal may determine that if TAG1 is adjusted according to the timing value adjustment command, TAG1-TAG2 is enabled to be greater than the maximum timing difference reference value. In this case, although an absolute timing difference of the TAG pair that is formed by TAG1 and TAG3 does not exceed the maximum timing difference reference value after TAG1 is adjusted, the terminal may still directly ignore the timing value adjustment command.

Optionally, when it is determined that the at least one predicted absolute timing difference is greater than the maximum timing difference reference value, the terminal may also directly ignore the timing value adjustment command and not perform any operation, and specifically, may ignore the timing value adjustment command for the first TAG.

504b. When it is determined that the at least one absolute timing difference is greater than the maximum timing difference reference value, and it is determined that a predicted absolute timing difference corresponding to the absolute timing difference is greater than the absolute timing difference, not execute the timing value adjustment command for the first TAG.

The absolute timing difference is an absolute value of a difference between a current transmit timing value of the first TAG and the transmit timing value of each TAG, except the first TAG, in the TAG set.

The absolute value of the difference between the current transmit timing value of the first TAG and the transmit timing value of each TAG, except the first TAG, in the TAG set is obtained before the timing value adjustment command for the first TAG is processed according to the preset policy and the at least one predicted absolute timing difference.

504c. When it is determined that the at least one predicted absolute timing difference is less than or equal to the maximum timing difference reference value, adjust the transmit timing value of the first TAG according to the timing value adjustment command for the first TAG.

After obtaining the absolute value of the difference between the predicted transmit timing value of the first TAG and the transmit timing value of each TAG, except the first TAG, in the TAG set, to obtain the predicted absolute timing difference, the terminal determines whether the obtained at least one predicted absolute timing difference is less than or equal to the maximum timing difference reference value, and may directly adjust, when it is determined that the at least one predicted absolute timing difference is less than or equal to the maximum timing difference reference value, the transmit timing value of the first TAG according to the timing value adjustment command for the first TAG.

505. The terminal acquires a timing value adjustment command for a second TAG.

The timing value adjustment command for the second TAG includes an identifier of the second TAG and adjustment information corresponding to the identifier of the second TAG.

506. The terminal predicts a transmit timing value of the second TAG according to the timing value adjustment command for the second TAG, to obtain a predicted transmit timing value of the second TAG.

507. The terminal calculates an absolute value of a difference between the predicted transmit timing value of the second TAG and a transmit timing value of each TAG, except the second TAG, in the TAG set, to obtain a predicted absolute timing difference.

The TAG set includes at least one TAG in addition to the second TAG.

508. The terminal processes the timing value adjustment command for the second TAG according to the preset policy and the at least one predicted absolute timing difference.

Specifically, for a specific execution process of executing the timing value adjustment command for the second TAG according to the preset policy and the at least one predicted absolute timing difference, refer to specific descriptions of corresponding content in step 504 in this embodiment of the present invention, and details are not described herein again in this embodiment of the present invention.

For example, the terminal includes two TAGs, which are respectively TAG1 and TAG2. If the network device considers that both transmit timing values of TAG1 and TAG2 need to be adjusted, specifically, that is, if the transmit timing value of TAG1 needs to be further delayed, and the transmit timing value of TAG2 needs to be further advanced, a piece of timing value adjustment signaling received by the terminal includes an identifier of TAG1 and adjustment information corresponding to the identifier of TAG1, where the adjustment information is delaying transmission, the terminal further receives a piece of timing value adjustment signaling that includes an identifier of TAG2, and adjustment information corresponding to the identifier of TAG2, where the adjustment information is advancing transmission. If TAG1 is a primary TAG, the terminal may first obtain a predicted transmit timing value of TAG1 in a case in which it is assumed that TAG1 is adjusted according to the adjustment information corresponding to TAG1, and then acquire, according to the predicted transmit timing value of TAG1, a predicted absolute timing difference of a TAG pair that is formed by TAG1 and TAG2 (in this case, TAG2 is in an unadjusted state). In this case, it is determined whether TAG1-TAG2 is greater than the maximum timing difference reference value if TAG1 is adjusted according to a timing value adjustment command. If in this case, TAG1-TAG2 is greater than the maximum timing difference reference value, the terminal may directly ignore the timing value adjustment command for TAG1, or may adjust the transmit timing value of TAG1 as much as possible according to the adjustment information corresponding to TAG1. If TAG1-TAG2 is less than the maximum timing difference reference value, the terminal directly adjusts the transmit timing value of TAG1 according to the adjustment information corresponding to TAG1. Then, the terminal may obtain a predicted transmit timing value of TAG2 in a case in which it is assumed that TAG2 is adjusted according to the adjustment information corresponding to TAG2 (in this case, TAG1 is already adjusted according to the adjustment information corresponding to TAG1 or not adjusted), and then acquire, according to the predicted transmit timing value of TAG2, a predicted absolute timing difference of a TAG pair that is formed by TAG1 and TAG2. In this case, it is determined whether TAG1-TAG2 is greater than the maximum timing difference reference value if TAG2 is adjusted according to a timing value adjustment command. If in this case, TAG1-TAG2 is greater than the maximum timing difference reference value, the terminal may ignore the timing value adjustment command for TAG2, or may adjust the transmit timing value of TAG2 as much as possible according to the adjustment information corresponding to TAG2. If TAG1-TAG2 is less than the maximum timing difference reference value, the terminal directly adjusts the transmit timing value of TAG2 according to the adjustment information corresponding to TAG2, or may ignore, when it is determined that TAG1-TAG2 is greater than the maximum timing difference reference value, adjustment information corresponding to TAG2 that is included in a timing value adjustment policy.

In conclusion, when the received timing value adjustment command includes an identifier of at least one TAG and adjustment information corresponding to the TAG identifier, for each TAG in a TAG corresponding to the identifier of the at least one TAG, in a case in which a difference between transmit timing values of the two TAGs included in each TAG pair that includes the TAG is less than or equal to the maximum timing difference reference value, the terminal may adjust, according to the included identifier of the at least one TAG and the adjustment information corresponding to the TAG identifier, a transmit timing value of a TAG corresponding to the identifier of the at least one TAG. A specific adjustment in an adjustment process may be determined according to a requirement in an actual application scenario. However, it should be noted that the terminal should adjust a transmit timing value of a primary TAG according to the timing value adjustment command as much as possible, and then adjust a transmit timing value of a secondary TAG according to the timing value adjustment command as much as possible, where a difference between adjusted transmit timing values of the TAGs is not allowed to exceed the maximum timing difference reference value.

It should be noted that step 505 and step 508 may be repeatedly performed, to ensure that when a timing value adjustment command for at least one TAG is acquired, timing value adjustment commands of all TAGs in the timing value adjustment command for the at least one TAG are processed.

509. The terminal sends indication information to the network device.

After the terminal performs a corresponding adjustment on the received timing value adjustment command, the terminal may send the indication information to the network device, where the indication information is mainly used to respond to the timing value adjustment command. The indication information may include an indication field indicating whether the terminal has adjusted a transmit timing value of a corresponding TAG according to the timing value adjustment command. If the terminal has not adjusted the transmit timing value of the corresponding TAG according to the adjustment command, a field may be further added to the indication information, where the field is used to indicate a reason why the transmit timing value of the corresponding TAG has not been adjusted according to the adjustment command. For example, the field may be identifiers of the two TAGs in a TAG pair, and/or an absolute timing difference between the two TAGs in the TAG pair, and/or a difference between the absolute timing difference between the two TAGs in the TAG pair, and the maximum timing difference reference value. If the field includes related information of the TAG pair, if the transmit timing value of the corresponding TAG has been adjusted according to the adjustment command, the absolute timing difference between the two TAGs in the TAG pair is greater than or equal to the maximum timing difference reference value. In this way, after receiving the indication information, the network device may learn, by parsing the indication information, that the terminal has not adjusted the transmit timing value of the corresponding TAG according to the adjustment command, and may further learn a reason why the terminal has not adjusted the transmit timing value of the corresponding TAG according to the adjustment command.

It should be noted that, for a specific format of the indication information in this embodiment of the present invention, refer to the signaling format of the first signaling in step 404 and the signaling format of the second signaling in step 407 that are in another embodiment of the present invention. This embodiment of the present invention imposes no limitation herein on the specific format of the indication information.

It should be noted that step 509 is an optional step in this embodiment of the present invention.

It should be noted that the network device in this embodiment may be a network side device, such as a base station, that can provide a service for the terminal in this embodiment, which is not specifically limited herein in this embodiment of the present invention.

According to the timing value adjustment method provided in this embodiment of the present invention, a timing value adjustment command for a first TAG is acquired, a transmit timing value of the first TAG is predicted according to the timing value adjustment command for the first TAG, to obtain a predicted transmit timing value of the first TAG, an absolute value of a difference between the predicted transmit timing value of the first TAG and a transmit timing value of each TAG, except the first TAG, in a TAG set is calculated, to obtain a predicted absolute timing difference, and then the timing value adjustment command for the first TAG is processed according to a preset policy and the at least one predicted absolute timing difference. The timing value adjustment command for the first TAG is processed by using the preset policy and the at least one predicted absolute timing difference, which resolves a problem that power of a terminal exceeds a limit, where the problem is caused by directly adjusting the transmit timing value of the first TAG according to the timing value adjustment command for the first TAG when at least one predicted absolute timing difference is greater than a maximum timing difference reference value.

In addition, when the timing value adjustment command includes an identifier of at least one TAG and adjustment information corresponding to the TAG identifier, the terminal may preferentially adjust a transmit timing value of a primary TAG according to a timing value adjustment command for the primary TAG as much as possible, and then adjust a transmit timing value of a secondary TAG according to a timing value adjustment command for the secondary TAG as much as possible, which ensures reliability of data transmission.

Embodiment 7

Figure 13:
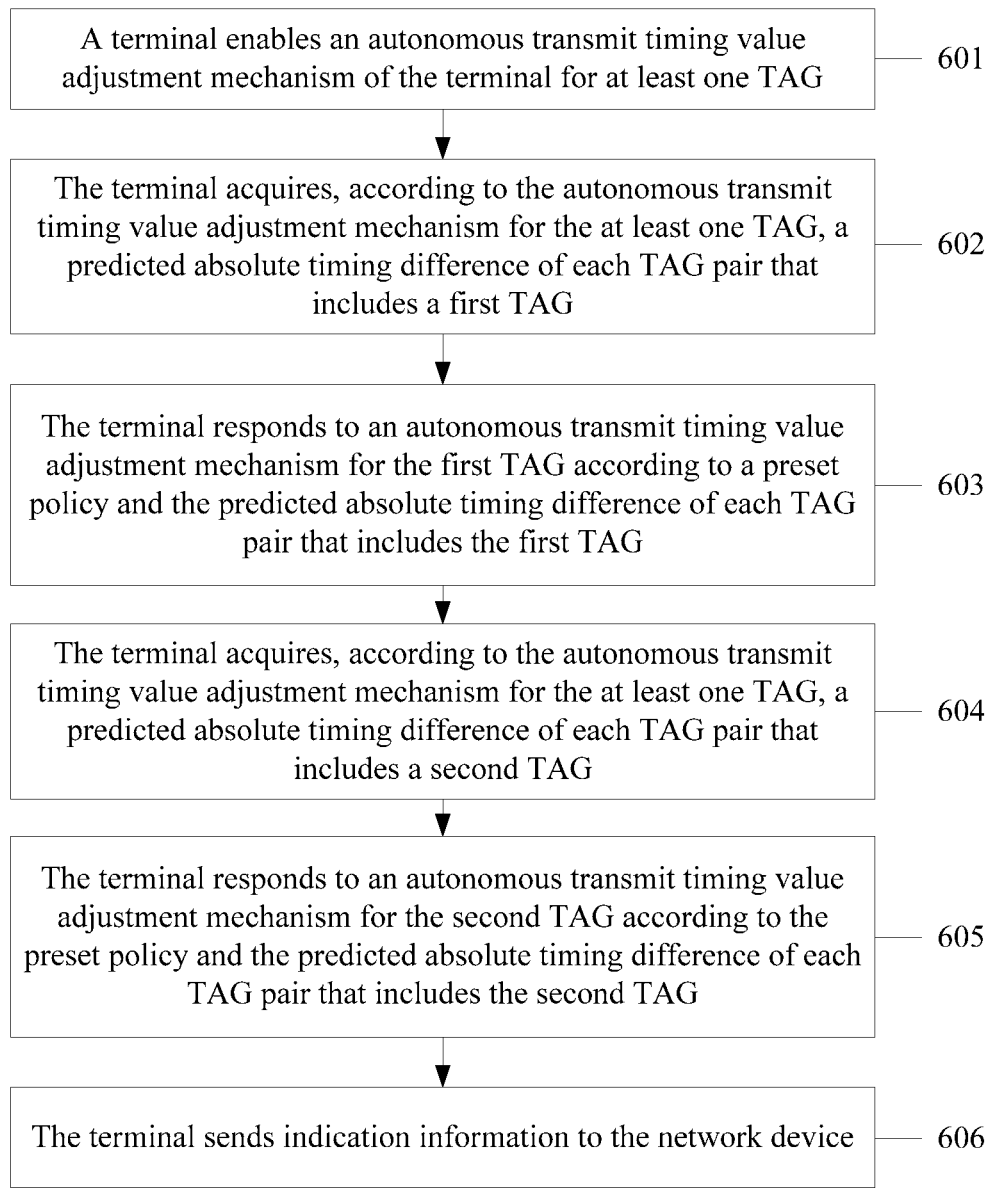
FIG. 13 is a flowchart of a timing value adjustment method according to Embodiment 7 of the present invention.

Embodiment 7 of the present invention provides a timing value adjustment method. As shown in FIG. 13, the method may be applied to a terminal. The terminal sends uplink data in a same subframe by using at least two carriers, and the terminal includes at least two TAGs in the subframe, where carriers that have a same transmit timing and are in at least two carriers included in the terminal belong to a same TAG. The method may include the following steps:

601. The terminal enables an autonomous transmit timing value adjustment mechanism of the terminal for at least one TAG.

The terminal may enable the autonomous transmit timing value adjustment mechanism of the terminal for the at least one TAG by using an autonomous timing value adjustment mechanism.

602. The terminal acquires, according to the autonomous transmit timing value adjustment mechanism for the at least one TAG, a predicted absolute timing difference of each TAG pair that includes a first TAG.

The predicted absolute timing difference of the TAG pair is, in a case in which it is assumed that an autonomous adjustment operation is performed on a transmit timing value of the first TAG according to an autonomous transmit timing value adjustment mechanism for the first TAG, a difference between transmit timing values of the two TAGs included in the TAG pair.

It should be noted that when the autonomous transmit timing value adjustment mechanism for the at least one TAG includes an autonomous transmit timing value adjustment mechanism for a primary TAG, the first TAG is the primary TAG; or when the autonomous transmit timing value adjustment mechanism for the at least one TAG does not include an autonomous transmit timing value adjustment mechanism for a primary TAG, the first TAG is any one of the at least one TAG.

603. The terminal responds to the autonomous transmit timing value adjustment mechanism for the first TAG according to a preset policy and the predicted absolute timing difference of each TAG pair that includes the first TAG.

Specifically, any one of the following steps may be included: 603*a*, 603*b*, and 603*c*.

603*a*. When it is determined that a predicted absolute timing difference of at least one TAG pair that includes the first TAG is greater than a maximum timing difference reference value, not perform an autonomous adjustment operation on the transmit timing value of the first TAG; or in a case in which after the autonomous adjustment operation is performed on the transmit timing value of the first TAG, a difference between transmit timing values of the two TAGs included in each TAG pair that includes the first TAG is less than or equal to the maximum timing difference reference value, perform the autonomous adjustment operation on the transmit timing value of the first TAG.

When it is determined that the predicted absolute timing difference of the at least one TAG pair that includes the first TAG is greater than the maximum timing difference reference value, the terminal may directly ignore a timing value adjustment command, and does not perform any operation. Specifically, adjustment information corresponding to a TAG identifier of the first TAG that is in the timing value adjustment command may be ignored, or a part or all of adjustment information corresponding to multiple TAG identifiers that is included in the timing value adjustment command may be ignored.

603*b*. When it is determined that an absolute timing difference of at least one TAG pair that includes the first TAG is greater than a maximum timing difference reference value, and it is determined that the predicted absolute timing difference of the TAG pair is greater than the absolute timing difference of the TAG pair, not perform an autonomous adjustment operation on the transmit timing value of the first TAG.

When it is determined that the absolute timing difference of the at least one TAG pair that includes the first TAG is greater than the maximum timing difference reference value, and it is determined that the predicted absolute timing difference of the TAG pair is greater than the corresponding absolute timing difference of the TAG pair, the autonomous adjustment operation on the transmit timing value of the first TAG may be ignored, that is, the autonomous adjustment operation is not performed on the transmit timing value of the first TAG. It should be noted that an absolute timing difference of each TAG pair of the at least one TAG pair that includes the first TAG refers to, in a case in which the transmit timing value of the first TAG is not adjusted according to adjustment information corresponding to the first TAG, a difference between transmit timing values of the two TAGs included in the TAG pair, and the absolute timing difference of each TAG pair that includes the first TAG is obtained before the autonomous transmit timing value adjustment mechanism for the first TAG is responded to according to the preset policy and the predicted absolute timing difference of each TAG pair that includes the first TAG is performed.

603*c*. When it is determined that the predicted absolute timing difference of each TAG pair that includes the first TAG is less than or equal to the maximum timing difference reference value, perform an autonomous adjustment operation on the transmit timing value of the first TAG according to the autonomous transmit timing value adjustment mechanism for the first TAG.

604. The terminal acquires, according to the autonomous transmit timing value adjustment mechanism for the at least one TAG, a predicted absolute timing difference of each TAG pair that includes a second TAG.

The predicted absolute timing difference of the TAG pair is, in a case in which it is assumed that an autonomous adjustment operation is performed on a transmit timing value of the second TAG according to an autonomous transmit timing value adjustment mechanism for the second TAG, a difference between transmit timing values of the two TAGs included in the TAG pair.

605. The terminal responds to the autonomous transmit timing value adjustment mechanism for the second TAG according to the preset policy and the predicted absolute timing difference of each TAG pair that includes the second TAG.

It should be noted that when the terminal enables the autonomous transmit timing value adjustment mechanism for the at least one TAG, for each TAG in the at least one TAG, in a case in which a difference between transmit timing values of the two TAGs included in each TAG pair that includes the TAG is less than or equal to the maximum timing difference reference value, the terminal may adjust a transmit timing value of the at least one TAG according to the autonomous transmit timing value adjustment mechanism for the at least one TAG, and a specific adjustment in an adjustment process may be determined according to a requirement in an actual application scenario. However, it should be noted that the terminal should adjust a transmit timing value of a primary TAG according to an autonomous transmit timing value adjustment mechanism for the primary TAG as much as possible, and then adjust a transmit timing value of a secondary TAG according to the autonomous transmit timing value adjustment mechanism for the secondary TAG as much as possible, where a difference between adjusted transmit timing values of the TAGs is not allowed to exceed the maximum timing difference reference value.

606. The terminal sends indication information to the network device, where the indication information is in response to the timing value adjustment command.

It should be noted that step 606 is an optional step in this embodiment of the present invention.

It should be noted that the network device in this embodiment may be a network side device, such as a base station, that can provide a service for the terminal in this embodiment, which is not specifically limited herein in this embodiment of the present invention.

It should be noted that, for specific descriptions of step 601 to step 606 in this embodiment of the present invention, refer to specific descriptions of corresponding content in Embodiment 6 of the present invention, and details are not described herein again in this embodiment of the present invention.

According to the timing value adjustment method provided in this embodiment of the present invention, a timing value adjustment mechanism for at least one TAG is enabled, a predicted absolute timing difference of each TAG pair that includes a first TAG is acquired according to the autonomous transmit timing value adjustment mechanism for the at least one TAG, and then an autonomous transmit timing value adjustment mechanism for the first TAG is responded to according to a preset policy and the predicted absolute timing difference of each TAG pair that includes the first TAG. The autonomous transmit timing value adjustment mechanism for the first TAG is responded to by using the preset policy and the predicted absolute timing difference of each TAG pair that includes the first TAG, which resolves a problem that power of a terminal exceeds a limit, where the problem is caused if an adjustment is directly performed according to a timing value adjustment command when a predicted absolute timing difference of at least one TAG pair that includes the first TAG is greater than or equal to a maximum timing difference reference value.

In addition, when the timing value adjustment command includes an identifier of at least one TAG and adjustment information corresponding to the TAG identifier, the terminal may preferentially adjust a transmit timing value of a primary TAG according to an autonomous transmit timing value adjustment mechanism for the primary TAG as much as possible, and then adjust a transmit timing value of a secondary TAG according to an autonomous transmit timing value adjustment mechanism for the secondary TAG as much as possible, which ensures reliability of data transmission.

Embodiment 8

Figure 14:
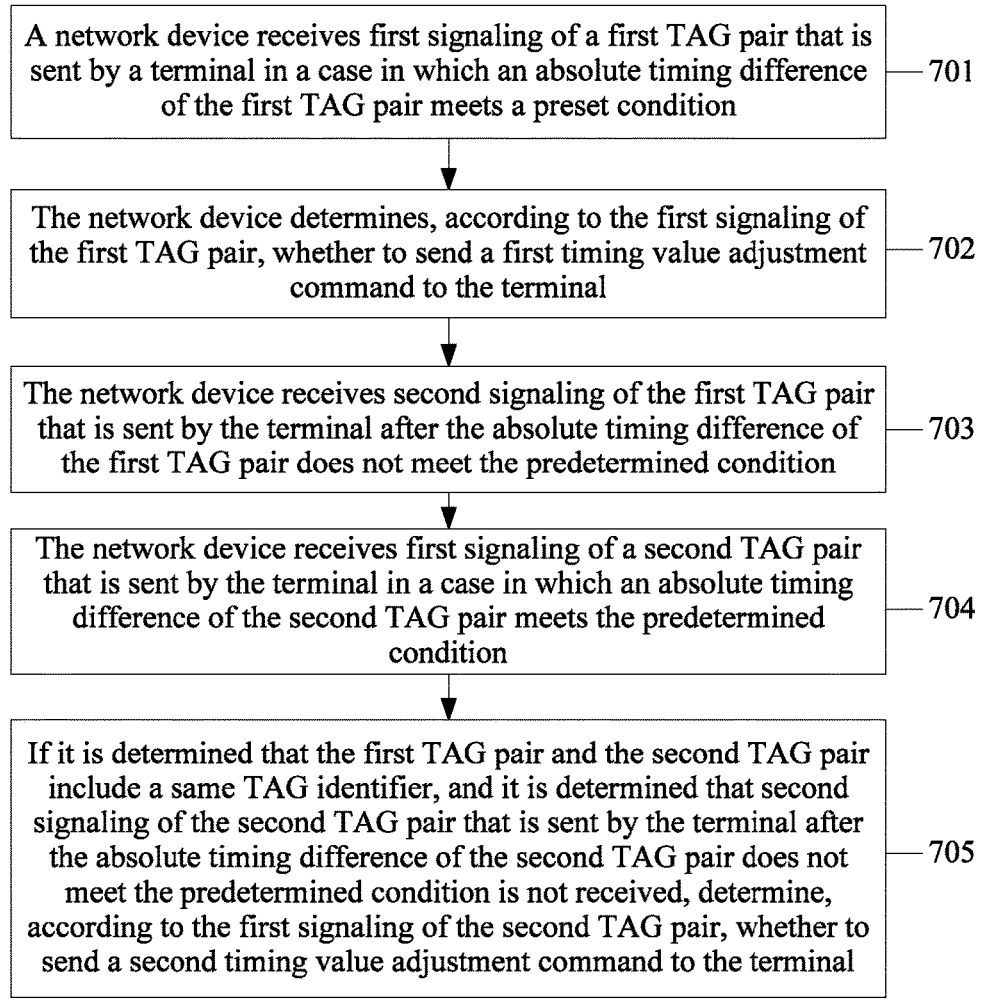
FIG. 14 is a flowchart of a timing value adjustment method according to Embodiment 8 of the present invention.

Embodiment 8 of the present invention provides a timing value adjustment method. As shown in FIG. 14, the method may include the following steps:

701. A network device receives first signaling of a first TAG pair that is sent by a terminal in a case in which an absolute timing difference of the first TAG pair meets a predetermined condition.

The first signaling of the first TAG pair includes identifiers of the two TAGs in the first TAG pair.

Specifically, when determining that the absolute timing difference of the first TAG pair meets the predetermined condition, the terminal sends the first signaling to the network device. In this case, the network device may receive the first signaling sent by the terminal.

The predetermined condition that is met may include any one of the following: a difference between a maximum timing difference reference value and an absolute timing difference of a TAG pair is less than or equal to a first threshold, the absolute timing difference of the TAG pair is greater than or equal to a second threshold, and the absolute timing difference of the TAG pair is greater than or equal to the maximum timing difference reference value.

702. The network device determines, according to the first signaling of the first TAG pair, whether to send a first timing value adjustment command to the terminal.

The first timing value adjustment command is a timing value adjustment command for either TAG included in the first TAG pair.

Specifically, when determining that moments at which the two TAGs included in the first TAG pair arrive at the network device are not synchronous, the network device may determine, according to the first signaling of the first TAG pair, whether to send the first timing value adjustment command to the terminal.

Specifically, the determining, according to the first signaling of the first TAG pair, whether to send a first timing value adjustment command to the terminal mainly includes: according to the first signaling of the first TAG pair, if it is determined that the first timing value adjustment command enables, after the terminal performs an adjustment according to the first timing value adjustment command, an absolute timing difference of the first TAG pair after the adjustment to be greater than the absolute timing difference before the adjustment, not sending the first timing value adjustment command to the terminal.

Optionally, when the first timing value adjustment command sent by the network device to the terminal may enable, after the terminal performs the adjustment according to the first timing value adjustment command, an absolute timing difference of the first TAG pair to be less than the absolute timing difference before the adjustment, the first timing value adjustment command used to enable the two TAGs included in the first TAG pair to arrive at the network device at the same time may be sent to the terminal according to the prior art.

703. The network device receives second signaling of the first TAG pair that is sent by the terminal after the absolute timing difference of the first TAG pair does not meet the predetermined condition.

The second signaling of the first TAG pair includes the identifiers of the two TAGs in the first TAG pair.

Specifically, when determining that the absolute timing difference of the first TAG pair does not meet the predetermined condition, the terminal may send the second signaling to the network device. In this case, the network device may receive the second signaling of the first TAG pair that is sent by the terminal.

That the predetermined condition is not met may include any one of the following: the difference between the maximum timing difference reference value and the absolute timing difference of the TAG pair is greater than the first threshold, the absolute timing difference of the TAG pair is less than the second threshold, and the absolute timing difference of the TAG pair is less than the maximum timing difference reference value.

704. The network device receives first signaling of a second TAG pair that is sent by the terminal in a case in which an absolute timing difference of the second TAG pair meets the predetermined condition.

The first signaling of the second TAG pair includes identifiers of the two TAGs in the second TAG pair.

705. If it is determined that the first TAG pair and the second TAG pair include a same TAG identifier, and it is determined that second signaling of the second TAG pair that is sent by the terminal after the absolute timing difference of the second TAG pair does not meet the predetermined condition is not received, determine, according to the first signaling of the second TAG pair, whether to send a second timing value adjustment command to the terminal.

The second timing value adjustment command is a timing value adjustment command for the same TAG included in the first TAG pair and the second TAG pair.

Specifically, the determining, according to the first signaling of the second TAG pair, whether to send a second timing value adjustment command to the terminal includes: according to the first signaling of the second TAG pair, if it is determined that the second timing value adjustment command enables, after the terminal performs an adjustment according to the second timing value adjustment command, an absolute timing difference of the second TAG pair after the adjustment to be greater than the absolute timing difference before the adjustment, not sending the second timing value adjustment command to the terminal.

To facilitate understanding by a person skilled in the art, the following is described with an example. For example, the network device receives the first signaling of the first TAG pair and also receives the first signaling of the second TAG pair, where the first TAG pair is TAG1 and TAG2, and the second TAG pair is TAG1 and TAG3, and the network device further receives the second signaling of the first TAG pair. In this case, the network device determines whether the second signaling of the second TAG pair is received (because the second TAG pair also includes TAG1), and when the network device determines that the second signaling of the second TAG pair is not received, according to the first signaling of the second TAG pair, if it is determined that the second timing value adjustment command enables, after the terminal performs the adjustment according to the second timing value adjustment command, the absolute timing difference of the second TAG pair after the adjustment to be greater than the absolute timing difference before the adjustment, the network device does not send the second timing value adjustment command to the terminal.

It should be noted that, for descriptions of specific parameters in step 701 to step 705 in this embodiment of the present invention, refer to specific descriptions of corresponding content in Embodiment 5, Embodiment 6, and Embodiment 7 of the present invention, and details are not described herein again in this embodiment of the present invention.

It should be noted that the network device in this embodiment may be a network side device, such as a base station, that can provide a service for the terminal in this embodiment, which is not specifically limited herein in this embodiment of the present invention.

According to the timing value adjustment method provided in this embodiment of the present invention, a network device receives first signaling of a first TAG pair that is sent by a terminal in a case in which an absolute timing difference of the first TAG pair meets a predetermined condition, and determines, according to the first signaling of the first TAG pair, whether to send a first timing value adjustment command to the terminal. In this way, the network device may be prevented from sending, to the terminal, timing value adjustment signaling that enables, after the terminal performs an adjustment according to the first timing value adjustment command, the absolute timing difference of the TAG pair to be closer to or further greater than a maximum timing difference reference value, thereby reducing a probability that power of the terminal exceeds a limit.

Embodiment 9

Figure 15:
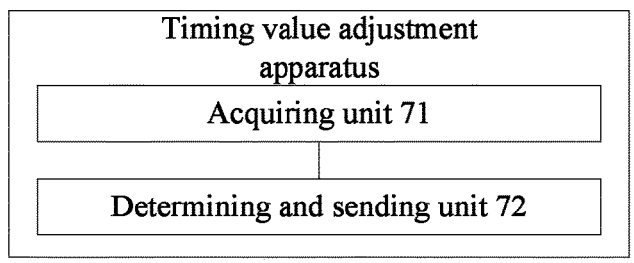
FIG. 15 is a schematic composition diagram of a timing value adjustment apparatus according to Embodiment 9 of the present invention.

Embodiment 9 of the present invention provides a timing value adjustment apparatus. As shown in FIG. 15, the apparatus includes: an acquiring unit 71 and a determining and sending unit 72.

The acquiring unit 71 is configured to obtain an absolute timing difference of a timing advance group TAG pair according to an absolute value of a difference between transmit timing values or receive timing values of the two TAGs in the TAG pair, where the TAG pair is formed by any two TAGs in a TAG set.

The determining and sending unit 72 is configured to: determine that the absolute timing difference of the TAG pair that is obtained by the acquiring unit 71 meets a predetermined condition, and send first signaling to a network device.

The first signaling includes identifiers of the two TAGs in the TAG pair.

Further, the first signaling further includes at least one of the following parameters:

the absolute timing difference of the TAG pair, a difference between the absolute timing difference of the TAG pair and the maximum timing difference reference value, and an alarm indication, where the alarm indication is used to indicate that the absolute timing difference of the TAG pair meets the predetermined condition.

Further, that the predetermined condition is met includes any one of the following: the difference between the maximum timing difference reference value and the absolute timing difference of the TAG pair is less than or equal to a first threshold, the absolute timing difference of the TAG pair is greater than or equal to a second threshold, and the absolute timing difference of the TAG pair is greater than or equal to the maximum timing difference reference value.

Further, the acquiring unit 71 is specifically configured to periodically obtain the absolute timing difference of the TAG pair according to the absolute value of the difference between the transmit timing values or the receive timing values of the two TAGs in the TAG pair.

Figure 16:
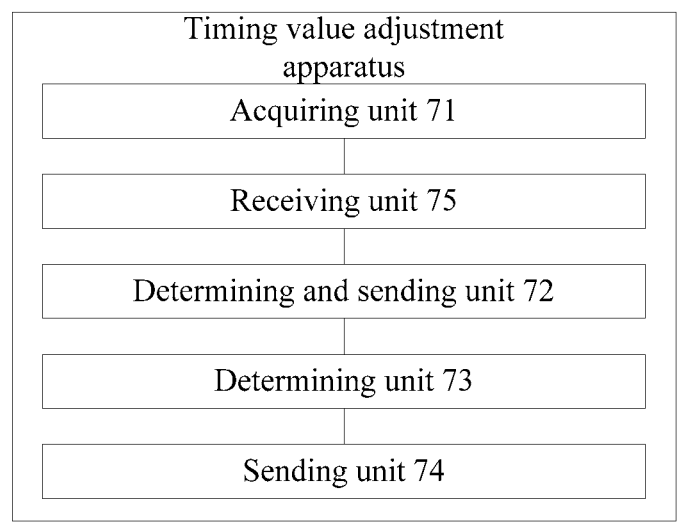
FIG. 16 is a schematic composition diagram of another timing value adjustment apparatus according to Embodiment 9 of the present invention.

Further, as shown in FIG. 16, the timing value adjustment apparatus may further includes: a determining unit 73 and a sending unit 74.

The determining unit 73 is configured to: after the determining and sending unit 72 sends the first signaling to the network device, determine that the absolute timing difference of the TAG pair does not meet the predetermined condition.

A second sending unit 74 is configured to send second signaling to the network device, where the second signaling includes the identifiers of the two TAGs in the TAG pair.

Further, the second signaling further includes at least one of the following parameters:

the absolute timing difference of the TAG pair, the difference between the absolute timing difference of the TAG pair and the maximum timing difference reference value, and an alarm clearance indication, where the alarm clearance indication is used to indicate that the absolute timing difference of the TAG pair does not meet the predetermined condition.

Further, that the predetermined condition is not met includes any one of the following: the difference between the maximum timing difference reference value and the absolute timing difference of the TAG pair is greater than the first threshold, the absolute timing difference of the TAG pair is less than the second threshold, and the absolute timing difference of the TAG pair is less than the maximum timing difference reference value.

Further, the timing value adjustment apparatus may further includes a receiving unit 75.

The receiving unit 75 is configured to: before the determining and sending unit 72 determines that the absolute timing difference of the TAG pair meets the predetermined condition and sends the first signaling to the network device, receive the maximum timing difference reference value sent by the network device; and/or receive the maximum timing difference reference value and the first threshold that are sent by the network device; and/or receive the second threshold sent by the network device.

Further, the first threshold is a threshold of the difference between the maximum timing difference reference value and the absolute timing difference of the TAG pair.

Further, the second threshold is a threshold that is at least one minimum time unit less than the maximum timing difference reference value.

According to the timing value adjustment apparatus provided in this embodiment of the present invention, a terminal obtains an absolute timing difference of a TAG pair according to an absolute value of a difference between transmit timing values or receive timing values of the two TAGs in the TAG pair, determines whether the absolute timing difference of the TAG pair meets a predetermined condition, and sends first signaling to a network device when the absolute timing difference of the TAG pair meets the predetermined condition. The terminal sends, to the network device when it is determined that the absolute timing difference of the TAG pair meets the predetermined condition, that is, the absolute timing difference of the TAG pair is close to, or equal to, or greater than a maximum timing difference reference value, first signaling of an alarm indication used to notify that the absolute timing difference of the TAG pair is already close to, or equal to, or greater than the maximum timing difference reference value, so that according to the first signaling, the network device may no longer send timing value adjustment signaling that enables the absolute timing difference of the TAG pair to be closer to or further greater than the maximum timing difference reference value, thereby reducing a probability that power of the terminal exceeds a limit.

In addition, when the absolute timing difference of the TAG pair does not meet the predetermined condition, that is, the absolute timing difference of the TAG pair is far from or less than the maximum timing difference reference value, the terminal may send second signaling to the network device, to clear an alarm for the TAG pair.

Embodiment 10

Figure 17:
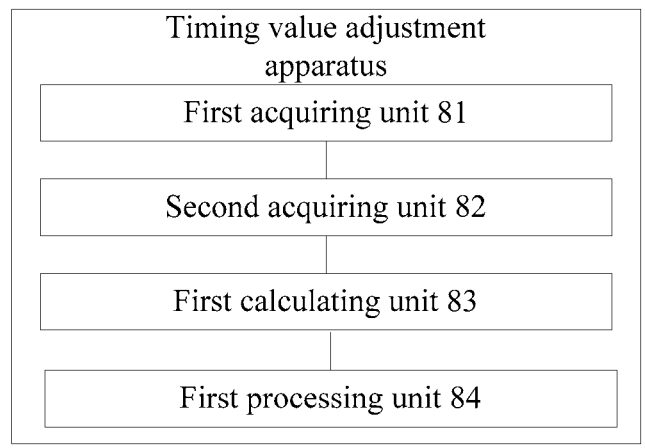
FIG. 17 is a schematic composition diagram of a timing value adjustment apparatus according to Embodiment 10 of the present invention.

Embodiment 10 of the present invention provides a timing value adjustment apparatus. As shown in FIG. 17, the apparatus includes: a first acquiring unit 81, a second acquiring unit 82, a first calculating unit 83, and a first processing unit 84.

The first acquiring unit 81 is configured to acquire a timing value adjustment command for a first timing advance group TAG, where the timing value adjustment command for the first TAG includes an identifier of the first TAG and adjustment information corresponding to the identifier of the first TAG.

The second acquiring unit 82 is configured to predict a transmit timing value of the first TAG according to the timing value adjustment command for the first TAG that is obtained by the first acquiring unit 81, to obtain a predicted transmit timing value of the first TAG.

The first calculating unit 83 is configured to calculate an absolute value of a difference between the predicted transmit timing value of the first TAG that is obtained by the second acquiring unit 82 and a transmit timing value of each TAG, except the first TAG, in a TAG set, to obtain a predicted absolute timing difference, where the TAG set includes at least one TAG in addition to the first TAG.

The first processing unit 84 is configured to process the timing value adjustment command for the first TAG according to a preset policy and the at least one predicted absolute timing difference obtained by the first calculating unit 83.

Further, the first acquiring unit 81 is specifically configured to receive the timing value adjustment command for the first TAG that is sent by a network device.

Further, the first processing unit 84 is specifically configured to: when it is determined that the at least one predicted absolute timing difference is greater than a maximum timing difference reference value, not execute the timing value adjustment command for the first TAG; or in a case in which after a transmit timing value of the first TAG is adjusted, an absolute value of a difference between a transmit timing value of the first TAG after the adjustment and the transmit timing value of each TAG, except the first TAG, in the TAG set is less than or equal to the maximum timing difference reference value, adjust the transmit timing value of the first TAG; or when it is determined that the at least one predicted absolute timing difference is less than or equal to the maximum timing difference reference value, adjust the transmit timing value of the first TAG according to the timing value adjustment command for the first TAG.

Figure 18:
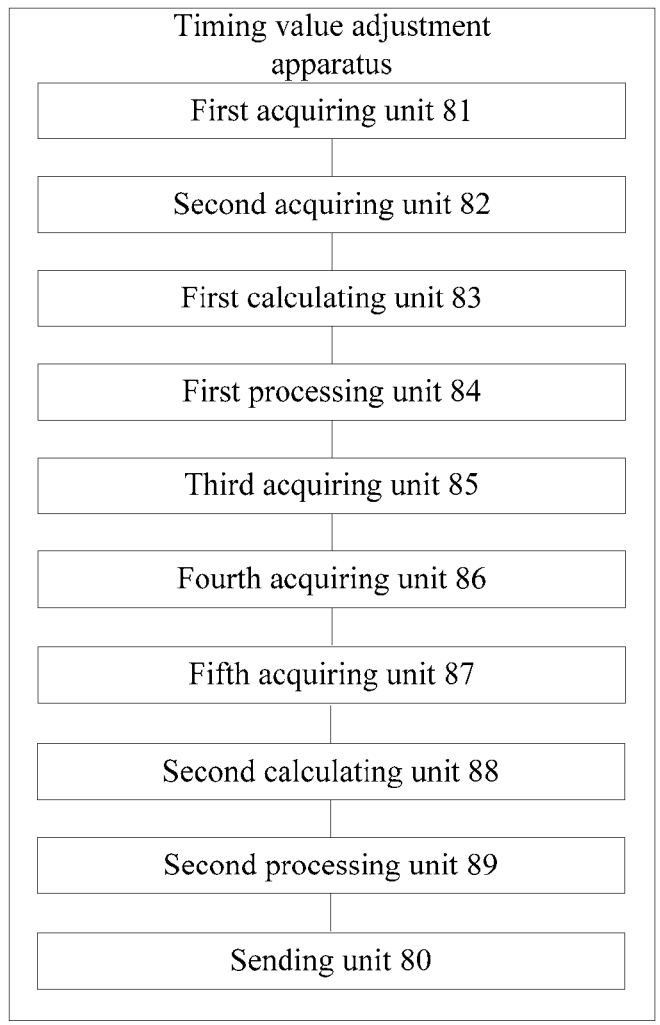
FIG. 18 is a schematic composition diagram of another timing value adjustment apparatus according to Embodiment 10 of the present invention.

Further, as shown in FIG. 18, the timing value adjustment apparatus may further include: a third acquiring unit 85.

The third acquiring unit 85 is configured to: before the first processing unit 84 processes the timing value adjustment command for the first TAG according to the preset policy and the at least one predicted absolute timing difference, calculate an absolute value of a difference between a current transmit timing value of the first TAG and the transmit timing value of each TAG, except the first TAG, in the TAG set, to obtain an absolute timing difference.

The first processing unit 84 is specifically configured to: when it is determined that the at least one absolute timing difference is greater than the maximum timing difference reference value, and it is determined that the predicted absolute timing difference corresponding to the absolute timing difference is greater than the absolute timing difference, not execute the timing value adjustment command for the first TAG.

Further, the timing value adjustment apparatus further includes: a fourth acquiring unit 86, a fifth acquiring unit 87, a second calculating unit 88, and a second processing unit 89.

The fourth acquiring unit 86 is configured to acquire a timing value adjustment command for a second TAG, where the timing value adjustment command for the second TAG includes an identifier of the second TAG and adjustment information corresponding to the identifier of the second TAG.

The fifth acquiring unit 87 is configured to predict a transmit timing value of the second TAG according to the timing value adjustment command for the second TAG that is obtained by the fourth acquiring unit 86, to obtain a predicted transmit timing value of the second TAG.

The second calculating unit 88 is configured to calculate an absolute value of a difference between the predicted transmit timing value of the second TAG that is obtained by the fifth acquiring unit 87 and a transmit timing value of each TAG, except the second TAG, in the TAG set, to obtain a predicted absolute timing difference, where the TAG set includes at least one TAG in addition to the second TAG.

The second processing unit 89 is configured to process the timing value adjustment command for the second TAG according to the preset policy and the at least one predicted absolute timing difference obtained by the second calculating unit 88.

Further, the first TAG is a primary TAG.

Further, the timing value adjustment apparatus may further includes a sending unit 80.

The sending unit 80 is configured to send indication information to the network device, where the indication information is used to respond to the timing value adjustment command.

According to the timing value adjustment apparatus provided in this embodiment of the present invention, a timing value adjustment command for a first TAG is acquired, a transmit timing value of the first TAG is predicted according to the timing value adjustment command for the first TAG, to obtain a predicted transmit timing value of the first TAG, an absolute value of a difference between the predicted transmit timing value of the first TAG and a transmit timing value of each TAG, except the first TAG, in a TAG set is calculated, to obtain a predicted absolute timing difference, and then the timing value adjustment command for the first TAG is processed according to a preset policy and the at least one predicted absolute timing difference. The timing value adjustment command for the first TAG is processed by using the preset policy and the at least one predicted absolute timing difference, which resolves a problem that power of a terminal exceeds a limit, where the problem is caused by directly adjusting the transmit timing value of the first TAG according to the timing value adjustment command for the first TAG when at least one predicted absolute timing difference is greater than a maximum timing difference reference value.

In addition, when the timing value adjustment command includes an identifier of at least one TAG and adjustment information corresponding to the TAG identifier, the terminal may preferentially adjust a transmit timing value of a primary TAG according to a timing value adjustment command for the primary TAG as much as possible, and then adjust a transmit timing value of a secondary TAG according to a timing value adjustment command for the secondary TAG as much as possible, which ensures reliability of data transmission.

Embodiment 11

Figure 19:
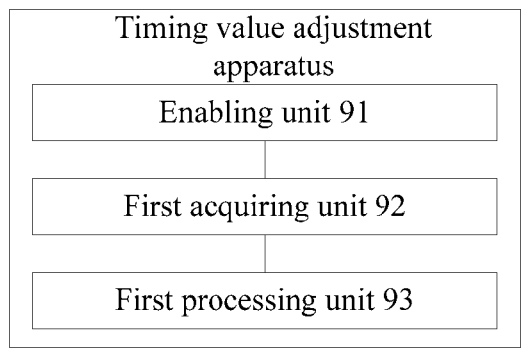
FIG. 19 is a schematic composition diagram of a timing value adjustment apparatus according to Embodiment 11 of the present invention.

Embodiment 11 of the present invention provides a timing value adjustment apparatus. As shown in FIG. 19, the apparatus includes: an enabling unit 91, a first acquiring unit 92, and a first processing unit 93.

The enabling unit 91 is configured to enable an autonomous transmit timing value adjustment mechanism of a terminal for at least one timing advance group TAG.

The first acquiring unit 92 is configured to acquire, according to the autonomous transmit timing value adjustment mechanism for the at least one TAG that is enabled by the enabling unit 91, a predicted absolute timing difference of each TAG pair that includes a first TAG; where the predicted absolute timing difference of the TAG pair is, in a case in which it is assumed that an autonomous adjustment operation is performed on a transmit timing value of the first TAG according to an autonomous transmit timing value adjustment mechanism for the first TAG, a difference between transmit timing values of the two TAGs included in the TAG pair.

The first processing unit 93 is configured to respond to the autonomous transmit timing value adjustment mechanism for the first TAG according to a preset policy, and the predicted absolute timing difference of each TAG pair that includes the first TAG that is obtained by the first acquiring unit 92.

Further, the first processing unit 93 is specifically configured to: when it is determined that a predicted absolute timing difference of at least one TAG pair that includes the first TAG is greater than a maximum timing difference reference value, not perform the autonomous adjustment operation on the transmit timing value of the first TAG; or in a case in which after the autonomous adjustment operation is performed on the transmit timing value of the first TAG, a difference between transmit timing values of the two TAGs included in each TAG pair that includes the first TAG is less than or equal to the maximum timing difference reference value, perform the autonomous adjustment operation on the transmit timing value of the first TAG; or when it is determined that the predicted absolute timing difference of each TAG pair that includes the first TAG is less than or equal to the maximum timing difference reference value, perform the autonomous adjustment operation on the transmit timing value of the first TAG according to the autonomous transmit timing value adjustment mechanism for the first TAG.

Figure 20:
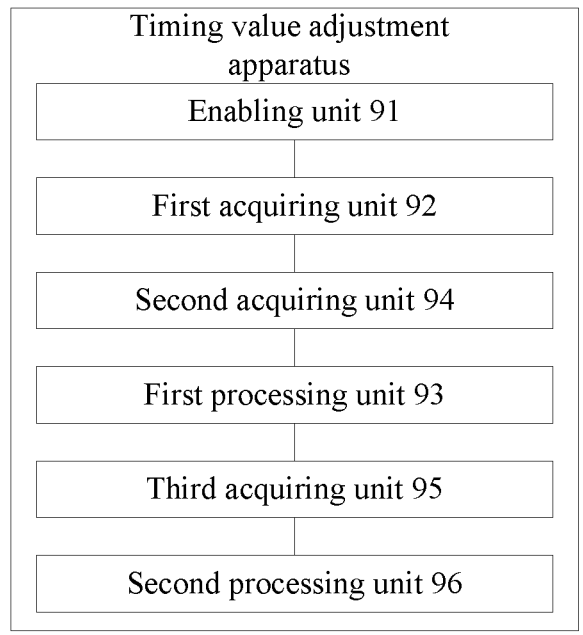
FIG. 20 is a schematic composition diagram of another timing value adjustment apparatus according to Embodiment 11 of the present invention.

Further, as shown in FIG. 20, the timing value adjustment apparatus may further includes: a second acquiring unit 94.

The second acquiring unit 94 is configured to: before the first processing unit 93 responds to the autonomous transmit timing value adjustment mechanism for the first TAG according to the preset policy and the predicted absolute timing difference of each TAG pair that includes the first TAG, acquire an absolute timing difference of each TAG pair that includes the first TAG, where the absolute timing difference of the TAG pair is, in a case in which the autonomous adjustment operation is not performed on the transmit timing value of the first TAG according to the autonomous transmit timing value adjustment mechanism for the first TAG, a difference between transmit timing values of the two TAGs included in the TAG pair.

The first processing unit 93 is specifically configured to: when it is determined that an absolute timing difference of the at least one TAG pair that includes the first TAG is greater than the maximum timing difference reference value, and it is determined that the predicted absolute timing difference of the TAG pair is greater than the absolute timing difference of the TAG pair, not perform the autonomous adjustment operation on the transmit timing value of the first TAG.

Further, the timing value adjustment apparatus may further includes: a third acquiring unit 95 and a second processing unit 96.

The third acquiring unit 95 is configured to acquire, according to the autonomous transmit timing value adjustment mechanism for the at least one TAG that is enabled by the enabling unit 91, a predicted absolute timing difference of each TAG pair that includes a second TAG; where the predicted absolute timing difference of the TAG pair is, in a case in which it is assumed that the autonomous adjustment operation is performed on a transmit timing value of the second TAG according to an autonomous transmit timing value adjustment mechanism for the second TAG, a difference between transmit timing values of the two TAGs included in the TAG pair.

The second processing unit 96 is configured to respond to the autonomous transmit timing value adjustment mechanism for the second TAG according to the preset policy, and the predicted absolute timing difference of each TAG pair that includes the second TAG that is obtained by the third acquiring unit 95.

Further, when the autonomous transmit timing value adjustment mechanism for the at least one TAG includes an autonomous transmit timing value adjustment mechanism for a primary TAG, the first TAG is the primary TAG; or when the autonomous transmit timing value adjustment mechanism for the at least one TAG does not include an autonomous transmit timing value adjustment mechanism for a primary TAG, the first TAG is any one of the at least one TAG.

According to the timing value adjustment apparatus provided in this embodiment of the present invention, a timing value adjustment mechanism for at least one TAG is enabled, a predicted absolute timing difference of each TAG pair that includes a first TAG is acquired according to the autonomous transmit timing value adjustment mechanism for the at least one TAG, and then an autonomous transmit timing value adjustment mechanism for the first TAG is responded to according to a preset policy and the predicted absolute timing difference of each TAG pair that includes the first TAG. The autonomous transmit timing value adjustment mechanism for the first TAG is responded to by using the preset policy and the predicted absolute timing difference of each TAG pair that includes the first TAG, which resolves a problem that power of a terminal exceeds a limit, where the problem is caused if an adjustment is directly performed according to a timing value adjustment command when a predicted absolute timing difference of at least one TAG pair that includes the first TAG is greater than or equal to a maximum timing difference reference value.

In addition, when the timing value adjustment command includes an identifier of at least one TAG and adjustment information corresponding to the TAG identifier, the terminal may preferentially adjust a transmit timing value of a primary TAG according to an autonomous transmit timing value adjustment mechanism for the primary TAG as much as possible, and then adjust a transmit timing value of a secondary TAG according to an autonomous transmit timing value adjustment mechanism for the secondary TAG as much as possible, which ensures reliability of data transmission.

Embodiment 12

Figure 21:
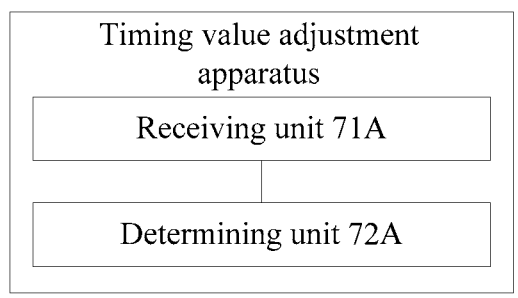
FIG. 21 is a schematic composition diagram of a timing value adjustment apparatus according to Embodiment 12 of the present invention.

Embodiment 12 of the present invention provides a timing value adjustment apparatus. As shown in FIG. 21, the apparatus includes: a receiving unit 71A and a determining unit 72A.

The receiving unit 71A is configured to receive first signaling of a first TAG pair that is sent by a terminal in a case in which an absolute timing difference of the first TAG pair meets a predetermined condition, where the first signaling of the first TAG pair includes identifiers of the two TAGs in the first TAG pair.

The determining unit 72A is configured to determine, according to the first signaling of the first TAG pair, whether to send a first timing value adjustment command to the terminal, where the first timing value adjustment command is a timing value adjustment command for either TAG included in the first TAG pair.

Further, the first signaling further includes at least one of the following parameters:

the absolute timing difference of the TAG pair, a difference between the absolute timing difference of the TAG pair and a maximum timing difference reference value, and an alarm indication, where the alarm indication is used to indicate that the absolute timing difference of the TAG pair meets the predetermined condition.

Further, the determining unit 72A is specifically configured to: according to the first signaling of the first TAG pair, if it is determined that the first timing value adjustment command enables, after the terminal performs an adjustment according to the first timing value adjustment command, an absolute timing difference of the first TAG pair after the adjustment to be greater than the absolute timing difference before the adjustment, determining not to send the first timing value adjustment command to the terminal.

Further, that the predetermined condition is met includes any one of the following: the difference between the maximum timing difference reference value and the absolute timing difference of the TAG pair is less than or equal to a first threshold, the absolute timing difference of the TAG pair is greater than or equal to a second threshold, and the absolute timing difference of the TAG pair is greater than or equal to the maximum timing difference reference value.

Further, the receiving unit 71A is further configured to:

receive second signaling of the first TAG pair that is sent by the terminal after the absolute timing difference of the first TAG pair does not meet the predetermined condition, where the second signaling of the first TAG pair includes the identifiers of the two TAGs in the first TAG pair;

receive first signaling of a second TAG pair that is sent by the terminal in a case in which an absolute timing difference of the second TAG pair meets the predetermined condition, where the first signaling of the second TAG pair includes identifiers of the two TAGs in the second TAG pair; and if it is determined that the first TAG pair and the second TAG pair include a same TAG identifier, and it is determined that second signaling of the second TAG pair that is sent by the terminal after the absolute timing difference of the second TAG pair does not meet the predetermined condition is not received, determine, according to the first signaling of the second TAG pair, whether to send a second timing value adjustment command to the terminal, where the second timing value adjustment command is a timing value adjustment command for the same TAG included in the first TAG pair and the second TAG pair.

Further, the determining unit 72A is further configured to:

according to the first signaling of the second TAG pair, if it is determined that the second timing value adjustment command enables, after the terminal performs an adjustment according to the second timing value adjustment command, an absolute timing difference of the second TAG pair after the adjustment to be greater than the absolute timing difference before the adjustment, determine not to send the second timing value adjustment command to the terminal.

Further, the second signaling further includes at least one of the following parameters:

the absolute timing difference of the TAG pair, the difference between the absolute timing difference of the TAG pair and the maximum timing difference reference value, and an alarm clearance indication, where the alarm clearance indication is used to indicate that the absolute timing difference of the TAG pair does not meet the predetermined condition.

Further, that the predetermined condition is not met includes any one of the following: the difference between the maximum timing difference reference value and the absolute timing difference of the TAG pair is greater than the first threshold, the absolute timing difference of the TAG pair is less than the second threshold, and the absolute timing difference of the TAG pair is less than the maximum timing difference reference value.

According to the timing value adjustment apparatus provided in this embodiment of the present invention, a network device receives first signaling of a first TAG pair that is sent by a terminal in a case in which an absolute timing difference of the first TAG pair meets a predetermined condition, and determines, according to the first signaling of the first TAG pair, whether to send a first timing value adjustment command to the terminal. In this way, the network device may be prevented from sending, to the terminal, timing value adjustment signaling that enables, after the terminal performs an adjustment according to the first timing value adjustment command, the absolute timing difference of the TAG pair to be closer to or further greater than a maximum timing difference reference value, thereby reducing a probability that power of the terminal exceeds a limit.

Embodiment 13

Figure 22:
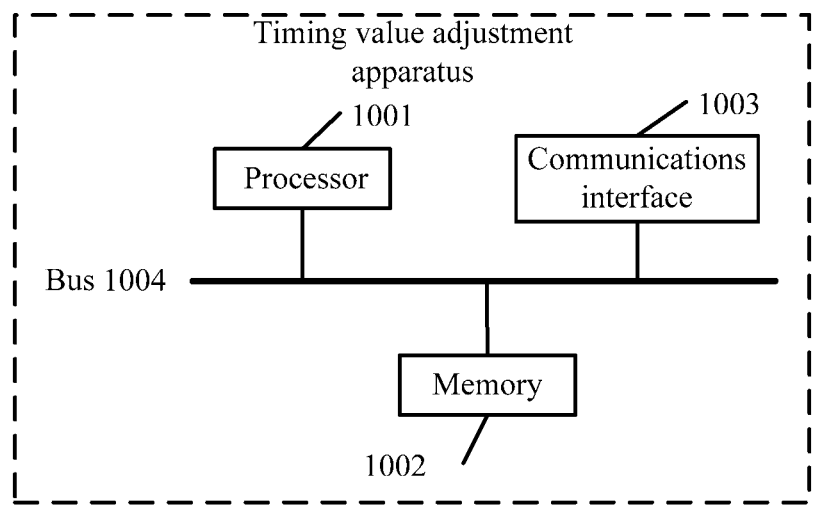
FIG. 22 is a schematic composition diagram of a timing value adjustment apparatus according to Embodiment 13 of the present invention.

Embodiment 13 of the present invention provides a timing value adjustment apparatus. As shown in FIG. 22, the apparatus includes: at least one processor 1001, a memory 1002, a communications interface 1003, and a bus 1004. The at least one processor 1001, the memory 1002, and the communications interface 1003 are connected by using the bus 1004 and implement mutual communication by using the bus 1004.

The bus 1004 may be an Industry Standard Architecture (ISA) bus, a Peripheral Component Interconnect (PCI) bus, an Extended Industry Standard Architecture (EISA) bus, or the like. The bus 1004 may be categorized into an address bus, a data bus, a control bus, and the like. For convenience of denotation, the bus 1004 is represented by using only one thick line in FIG. 22; however, it does not indicate that there is only one bus or only one type of buses.

The memory 1002 is configured to store executable program code, where the program code includes a computer operation instruction. The memory 1002 may include a high speed RAM memory, or may further include a non-volatile memory, for example, at least one magnetic disk memory.

The processor 1001 may be a central processing unit (CPU), or an application-specific integrated circuit (ASIC), or be configured as one or more integrated circuits that implement the embodiments of the present invention.

The communications interface 1003 is mainly configured to implement communication between devices in this embodiment.

The processor 1001 is configured to execute the executable program code stored in the memory 1002, and is specifically configured to execute the following operations:

the processor 1001 is configured to: obtain an absolute timing difference of a timing advance group TAG pair according to an absolute value of a difference between transmit timing values or receive timing values of the two TAGs in the TAG pair, where the TAG pair is formed by any two TAGs in a TAG set; and determine that the absolute timing difference of the TAG pair meets a predetermined condition, and send first signaling to a network device, where the first signaling includes identifiers of the two TAGs in the TAG pair.

Further, optionally, the first signaling further includes at least one of the following parameters:

the absolute timing difference of the TAG pair, a difference between the absolute timing difference of the TAG pair and a maximum timing difference reference value, and an alarm indication, where the alarm indication is used to indicate that the absolute timing difference of the TAG pair meets the predetermined condition.

Further, optionally, that the predetermined condition is met includes any one of the following: the difference between the maximum timing difference reference value and the absolute timing difference of the TAG pair is less than or equal to a first threshold, the absolute timing difference of the TAG pair is greater than or equal to a second threshold, and the absolute timing difference of the TAG pair is greater than or equal to the maximum timing difference reference value.

Further, optionally, the processor 1001 is further configured to periodically obtain the absolute timing difference of the TAG pair according to the absolute value of the difference between the transmit timing values or the receive timing values of the two TAGs in the TAG pair.

Further, optionally, the processor 1001 is further configured to:

after the sending first signaling to a network device, determine that the absolute timing difference of the TAG pair does not meet the predetermined condition; and send second signaling to the network device; where the second signaling includes the identifiers of the two TAGs in the TAG pair.

Further, optionally, the second signaling further includes at least one of the following parameters:

the absolute timing difference of the TAG pair, the difference between the absolute timing difference of the TAG pair and the maximum timing difference reference value, and an alarm clearance indication, where the alarm clearance indication is used to indicate that the absolute timing difference of the TAG pair does not meet the predetermined condition.

Further, optionally, that the predetermined condition is not met includes any one of the following: the difference between the maximum timing difference reference value and the absolute timing difference of the TAG pair is greater than the first threshold, the absolute timing difference of the TAG pair is less than the second threshold, and the absolute timing difference of the TAG pair is less than the maximum timing difference reference value.

Further, optionally, the processor 1001 is further configured to:

before the determining that the absolute timing difference of the TAG pair meets a predetermined condition, and sending first signaling to a network device, receive the maximum timing difference reference value sent by the network device; and/or receive the maximum timing difference reference value and the first threshold that are sent by the network device; and/or receive the second threshold sent by the network device.

Further, optionally, the first threshold is a threshold of the difference between the maximum timing difference reference value and the absolute timing difference of the TAG pair.

Further, optionally, the second threshold is a threshold that is at least one minimum time unit less than the maximum timing difference reference value.

According to the timing value adjustment apparatus provided in this embodiment of the present invention, a terminal obtains an absolute timing difference of a TAG pair according to an absolute value of a difference between transmit timing values or receive timing values of the two TAGs in the TAG pair, determines whether the absolute timing difference of the TAG pair meets a predetermined condition, and sends first signaling to a network device when the absolute timing difference of the TAG pair meets the predetermined condition. The terminal sends, to the network device when it is determined that the absolute timing difference of the TAG pair meets the predetermined condition, that is, the absolute timing difference of the TAG pair is close to, or equal to, or greater than a maximum timing difference reference value, first signaling of an alarm indication used to notify that the absolute timing difference of the TAG pair is already close to, or equal to, or greater than the maximum timing difference reference value, so that according to the first signaling, the network device may no longer send timing value adjustment signaling that enables the absolute timing difference of the TAG pair to be closer to or further greater than the maximum timing difference reference value, thereby reducing a probability that power of the terminal exceeds a limit.

In addition, when the absolute timing difference of the TAG pair does not meet the predetermined condition, that is, the absolute timing difference of the TAG pair is far from or less than the maximum timing difference reference value, the terminal may send second signaling to the network device, to clear an alarm for the TAG pair.

Embodiment 14

Figure 23:
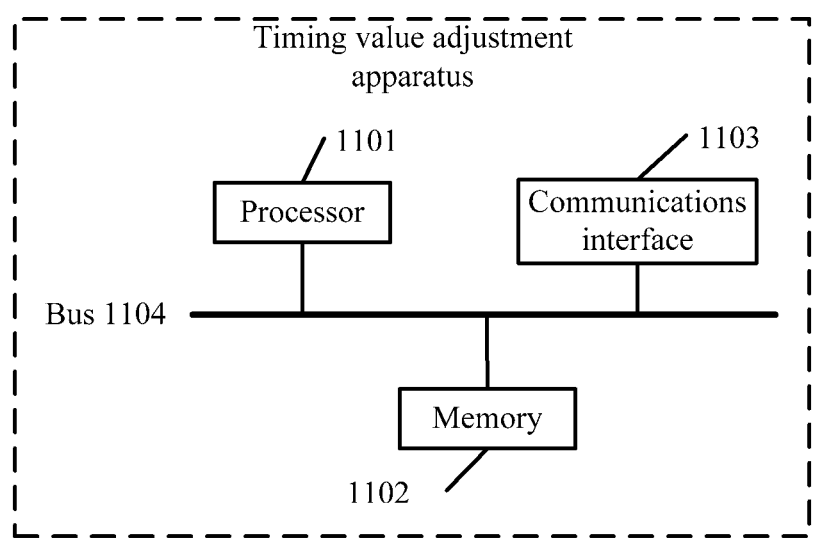
FIG. 23 is a schematic composition diagram of another timing value adjustment apparatus according to Embodiment 14 of the present invention.

Embodiment 14 of the present invention provides a timing value adjustment apparatus. As shown in FIG. 23, the apparatus includes: at least one processor 1101, a memory 1102, a communications interface 1103, and a bus 1104. The at least one processor 1101, the memory 1102, and the communications interface 1103 are connected by using the bus 1104 and implement mutual communication by using the bus 1104.

The bus 1104 may be an Industry Standard Architecture (ISA) bus, a Peripheral Component Interconnect (PCI) bus, an Extended Industry Standard Architecture (EISA) bus, or the like. The bus 1104 may be categorized into an address bus, a data bus, a control bus, and the like. For convenience of denotation, the bus 1104 is represented by using only one thick line in FIG. 23; however, it does not indicate that there is only one bus or only one type of buses.

The memory 1102 is configured to store executable program code, where the program code includes a computer operation instruction. The memory 1102 may include a high speed RAM memory, or may further include a non-volatile memory, for example, at least one magnetic disk memory.

The processor 1101 may be a central processing unit (CPU), or an application-specific integrated circuit (ASIC), or be configured as one or more integrated circuits that implement the embodiments of the present invention.

The communications interface 1103 is mainly configured to implement communication between devices in this embodiment.

The processor 1101 is configured to execute the executable program code stored in the memory 1102, and is specifically configured to execute the following operations:

the processor 1101 is configured to: acquire a timing value adjustment command for a first timing advance group TAG, where the timing value adjustment command for the first TAG includes an identifier of the first TAG and adjustment information corresponding to the identifier of the first TAG;

predict a transmit timing value of the first TAG according to the timing value adjustment command for the first TAG, to obtain a predicted transmit timing value of the first TAG; calculate an absolute value of a difference between the predicted transmit timing value of the first TAG and a transmit timing value of each TAG, except the first TAG, in a TAG set, to obtain a predicted absolute timing difference, where the TAG set includes at least one TAG in addition to the first TAG; and process the timing value adjustment command for the first TAG according to a preset policy and the at least one predicted absolute timing difference.

Further, optionally, the processor 1101 is further configured to receive the timing value adjustment command for the first TAG that is sent by a network device.

Further, optionally, the processor 1101 is further configured to:

when it is determined that the at least one predicted absolute timing difference is greater than a maximum timing difference reference value, not execute the timing value adjustment command for the first TAG; or in a case in which after a transmit timing value of the first TAG is adjusted, an absolute value of a difference between a transmit timing value of the first TAG after the adjustment and the transmit timing value of each TAG, except the first TAG, in the TAG set is less than or equal to the maximum timing difference reference value, adjust the transmit timing value of the first TAG; or when it is determined that the at least one predicted absolute timing difference is less than or equal to the maximum timing difference reference value, adjust the transmit timing value of the first TAG according to the timing value adjustment command for the first TAG.

Further, optionally, the processor 1101 is further configured to:

before the processing the timing value adjustment command for the first TAG according to a preset policy and the at least one predicted absolute timing difference, calculate an absolute value of a difference between a current transmit timing value of the first TAG and the transmit timing value of each TAG, except the first TAG, in the TAG set, to obtain an absolute timing difference; and when it is determined that the at least one absolute timing difference is greater than the maximum timing difference reference value, and it is determined that a predicted absolute timing difference corresponding to the absolute timing difference is greater than the absolute timing difference, not execute the timing value adjustment command for the first TAG.

Further, optionally, the processor 1101 is further configured to:

acquire a timing value adjustment command for a second TAG, where the timing value adjustment command for the second TAG includes an identifier of the second TAG and adjustment information corresponding to the identifier of the second TAG;

predict a transmit timing value of the second TAG according to the timing value adjustment command for the second TAG, to obtain a predicted transmit timing value of the second TAG;

calculate an absolute value of a difference between the predicted transmit timing value of the second TAG and a transmit timing value of each TAG, except the second TAG, in the TAG set, to obtain a predicted absolute timing difference, where the TAG set includes at least one TAG in addition to the second TAG; and process the timing value adjustment command for the second TAG according to the preset policy and the at least one predicted absolute timing difference.

Further, optionally, the first TAG is a primary TAG.

Further, optionally, the processor 1101 is further configured to send indication information to the network device, where the indication information is used to respond to the timing value adjustment command.

According to the timing value adjustment apparatus provided in this embodiment of the present invention, a timing value adjustment command for a first TAG is acquired, a transmit timing value of the first TAG is predicted according to the timing value adjustment command for the first TAG, to obtain a predicted transmit timing value of the first TAG, an absolute value of a difference between the predicted transmit timing value of the first TAG and a transmit timing value of each TAG, except the first TAG, in a TAG set is calculated, to obtain a predicted absolute timing difference, and then the timing value adjustment command for the first TAG is processed according to a preset policy and the at least one predicted absolute timing difference. The timing value adjustment command for the first TAG is processed by using the preset policy and the at least one predicted absolute timing difference, which resolves a problem that power of a terminal exceeds a limit, where the problem is caused by directly adjusting the transmit timing value of the first TAG according to the timing value adjustment command for the first TAG when at least one predicted absolute timing difference is greater than a maximum timing difference reference value.

In addition, when the timing value adjustment command includes an identifier of at least one TAG and adjustment information corresponding to the TAG identifier, the terminal may preferentially adjust a transmit timing value of a primary TAG according to a timing value adjustment command for the primary TAG as much as possible, and then adjust a transmit timing value of a secondary TAG according to a timing value adjustment command for the secondary TAG as much as possible, which ensures reliability of data transmission.

Embodiment 15

Figure 24:
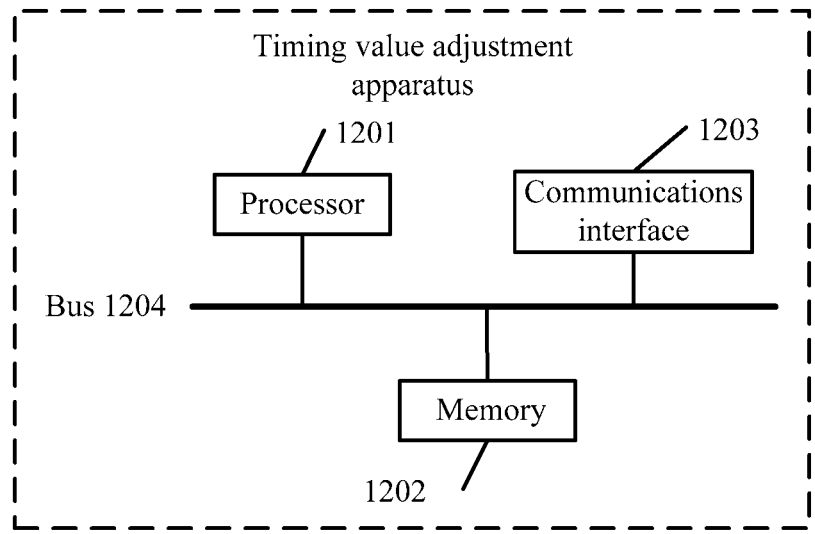
FIG. 24 is a schematic composition diagram of a timing value adjustment apparatus according to Embodiment 15 of the present invention.

Embodiment 15 of the present invention provides a timing value adjustment apparatus. As shown in FIG. 24, the apparatus includes: at least one processor 1201, a memory 1202, a communications interface 1203, and a bus 1204. The at least one processor 1201, the memory 1202, and the communications interface 1203 are connected by using the bus 1204 and implement mutual communication by using the bus 1204.

The bus 1204 may be an Industry Standard Architecture (ISA) bus, a Peripheral Component Interconnect (PCI) bus, an Extended Industry Standard Architecture (EISA) bus, or the like. The bus 1204 may be categorized into an address bus, a data bus, a control bus, and the like. For convenience of denotation, the bus 1204 is represented by using only one thick line in FIG. 24; however, it does not indicate that there is only one bus or only one type of buses.

The memory 1202 is configured to store executable program code, where the program code includes a computer operation instruction. The memory 1202 may include a high speed RAM memory, or may further include a non-volatile memory, for example, at least one magnetic disk memory.

The processor 1201 may be a central processing unit (CPU), or an application-specific integrated circuit (ASIC), or be configured as one or more integrated circuits that implement the embodiments of the present invention.

The communications interface 1203 is mainly configured to implement communication between devices in this embodiment.

The processor 1201 is configured to execute the executable program code stored in the memory 1202, and is specifically configured to execute the following operations:

the processor 1201 is configured to: enable an autonomous transmit timing value adjustment mechanism of a terminal for at least one timing advance group TAG; acquire, according to the autonomous transmit timing value adjustment mechanism for the at least one TAG, a predicted absolute timing difference of each TAG pair that includes a first TAG, where the predicted absolute timing difference of the TAG pair is, in a case in which it is assumed that an autonomous adjustment operation is performed on a transmit timing value of the first TAG according to an autonomous transmit timing value adjustment mechanism for the first TAG, a difference between transmit timing values of the two TAGs included in the TAG pair; and respond to the autonomous transmit timing value adjustment mechanism for the first TAG according to a preset policy and the predicted absolute timing difference of each TAG pair that includes the first TAG.

Further, optionally, the processor 1201 is further configured to: when it is determined that a predicted absolute timing difference of at least one TAG pair that includes the first TAG is greater than a maximum timing difference reference value, not perform the autonomous adjustment operation on the transmit timing value of the first TAG; or in a case in which after the autonomous adjustment operation is performed on the transmit timing value of the first TAG, a difference between transmit timing values of the two TAGs included in each TAG pair that includes the first TAG is less than or equal to the maximum timing difference reference value, perform the autonomous adjustment operation on the transmit timing value of the first TAG; or when it is determined that the predicted absolute timing difference of each TAG pair that includes the first TAG is less than or equal to the maximum timing difference reference value, perform the autonomous adjustment operation on the transmit timing value of the first TAG according to the autonomous transmit timing value adjustment mechanism for the first TAG.

Further, optionally, the processor 1201 is further configured to: before the responding to the autonomous transmit timing value adjustment mechanism for the first TAG according to a preset policy and the predicted absolute timing difference of each TAG pair that includes the first TAG, acquire an absolute timing difference of each TAG pair that includes the first TAG, where the absolute timing difference of the TAG pair is, in a case in which the autonomous adjustment operation is not performed on the transmit timing value of the first TAG according to the autonomous transmit timing value adjustment mechanism for the first TAG, a difference between transmit timing values of the two TAGs included in the TAG pair; and when it is determined that an absolute timing difference of the at least one TAG pair that includes the first TAG is greater than the maximum timing difference reference value, and it is determined that the predicted absolute timing difference of the TAG pair is greater than the absolute timing difference of the TAG pair, not perform the autonomous adjustment operation on the transmit timing value of the first TAG.

Further, optionally, the processor 1201 is further configured to: acquire, according to the autonomous transmit timing value adjustment mechanism for the at least one TAG, a predicted absolute timing difference of each TAG pair that includes a second TAG; where the predicted absolute timing difference of the TAG pair is, in a case in which it is assumed that the autonomous adjustment operation is performed on a transmit timing value of the second TAG according to an autonomous transmit timing value adjustment mechanism for the second TAG, a difference between transmit timing values of the two TAGs included in the TAG pair; and respond to the autonomous transmit timing value adjustment mechanism for the second TAG according to the preset policy and the predicted absolute timing difference of each TAG pair that includes the second TAG.

Further, optionally, when the autonomous transmit timing value adjustment mechanism for the at least one TAG includes an autonomous transmit timing value adjustment mechanism for a primary TAG, the first TAG is the primary TAG; or when the autonomous transmit timing value adjustment mechanism for the at least one TAG does not include an autonomous transmit timing value adjustment mechanism for a primary TAG, the first TAG is any one of the at least one TAG.

According to the timing value adjustment apparatus provided in this embodiment of the present invention, a timing value adjustment mechanism for at least one TAG is enabled, a predicted absolute timing difference of each TAG pair that includes a first TAG is acquired according to the autonomous transmit timing value adjustment mechanism for the at least one TAG, and then an autonomous transmit timing value adjustment mechanism for the first TAG is responded to according to a preset policy and the predicted absolute timing difference of each TAG pair that includes the first TAG. The autonomous transmit timing value adjustment mechanism for the first TAG is responded to by using the preset policy and the predicted absolute timing difference of each TAG pair that includes the first TAG, which resolves a problem that power of a terminal exceeds a limit, where the problem is caused if an adjustment is directly performed according to a timing value adjustment command when a predicted absolute timing difference of at least one TAG pair that includes the first TAG is greater than or equal to a maximum timing difference reference value.

In addition, when the timing value adjustment command includes an identifier of at least one TAG and adjustment information corresponding to the TAG identifier, the terminal may preferentially adjust a transmit timing value of a primary TAG according to an autonomous transmit timing value adjustment mechanism for the primary TAG as much as possible, and then adjust a transmit timing value of a secondary TAG according to an autonomous transmit timing value adjustment mechanism for the secondary TAG as much as possible, which ensures reliability of data transmission.

Embodiment 16

Figure 25:
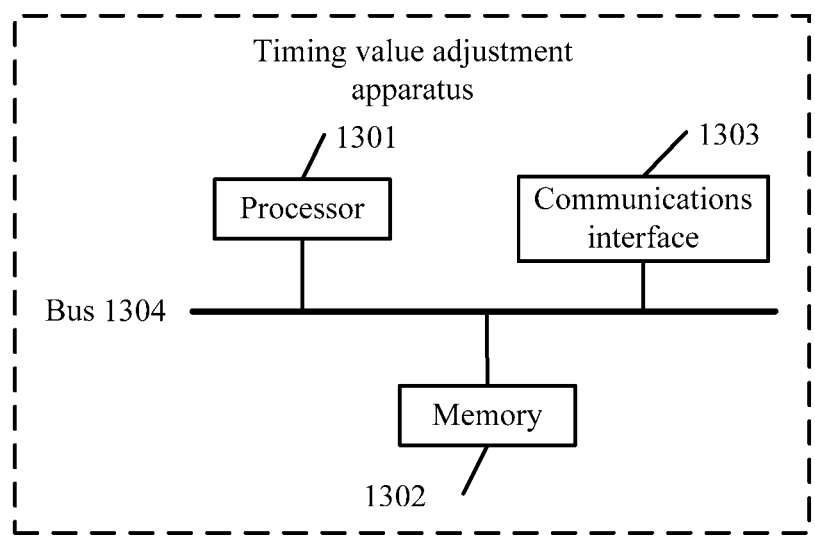
FIG. 25 is a schematic composition diagram of a timing value adjustment apparatus according to Embodiment 16 of the present invention.

Embodiment 16 of the present invention provides a timing value adjustment apparatus. As shown in FIG. 25, the apparatus includes: at least one processor 1301, a memory 1302, a communications interface 1303, and a bus 1304. The at least one processor 1301, the memory 1302, and the communications interface 1303 are connected by using the bus 1304 and implement mutual communication by using the bus 1304.

The bus 1304 may be an Industry Standard Architecture (ISA) bus, a Peripheral Component Interconnect (PCI) bus, an Extended Industry Standard Architecture (EISA) bus, or the like. The bus 1304 may be categorized into an address bus, a data bus, a control bus, and the like. For convenience of denotation, the bus 1304 is represented by using only one thick line in FIG. 25; however, it does not indicate that there is only one bus or only one type of buses.

The memory 1302 is configured to store executable program code, where the program code includes a computer operation instruction. The memory 1302 may include a high speed RAM memory, or may further include a non-volatile memory, for example, at least one magnetic disk memory.

The processor 1301 may be a central processing unit (CPU), or an application-specific integrated circuit (ASIC), or be configured as one or more integrated circuits that implement the embodiments of the present invention.

The communications interface 1303 is mainly configured to implement communication between devices in this embodiment.

The processor 1301 is configured to execute the executable program code stored in the memory 1302, and is specifically configured to execute the following operations:

the processor 1301 is configured to: receive first signaling of a first TAG pair that is sent by a terminal in a case in which an absolute timing difference of the first TAG pair meets a predetermined condition, where the first signaling of the first TAG pair includes identifiers of the two TAGs in the first TAG pair; and determine, according to the first signaling of the first TAG pair, whether to send a first timing value adjustment command to the terminal, where the first timing value adjustment command is a timing value adjustment command for either TAG included in the first TAG pair.

Further, the first signaling further includes at least one of the following parameters:

the absolute timing difference of the TAG pair, a difference between the absolute timing difference of the TAG pair and a maximum timing difference reference value, and an alarm indication, where the alarm indication is used to indicate that the absolute timing difference of the TAG pair meets the predetermined condition.

Further, the processor 1301 is further configured to: according to the first signaling of the first TAG pair, if it is determined that the first timing value adjustment command enables, after the terminal performs an adjustment according to the first timing value adjustment command, an absolute timing difference of the first TAG pair after the adjustment to be greater than the absolute timing difference before the adjustment, not send the first timing value adjustment command to the terminal.

Further, that the predetermined condition is met includes any one of the following: the difference between the maximum timing difference reference value and the absolute timing difference of the TAG pair is less than or equal to a first threshold, the absolute timing difference of the TAG pair is greater than or equal to a second threshold, and the absolute timing difference of the TAG pair is greater than or equal to the maximum timing difference reference value.

Further, the processor 1301 is further configured to:

receive second signaling of the first TAG pair that is sent by the terminal after the absolute timing difference of the first TAG pair does not meet the predetermined condition, where the second signaling of the first TAG pair includes the identifiers of the two TAGs in the first TAG pair;

receive first signaling of a second TAG pair that is sent by the terminal in a case in which an absolute timing difference of the second TAG pair meets the predetermined condition, where the first signaling of the second TAG pair includes identifiers of the two TAGs in the second TAG pair; and if it is determined that the first TAG pair and the second TAG pair include a same TAG identifier, and it is determined that second signaling of the second TAG pair that is sent by the terminal after the absolute timing difference of the second TAG pair does not meet the predetermined condition is not received, determine, according to the first signaling of the second TAG pair, whether to send a second timing value adjustment command to the terminal, where the second timing value adjustment command is a timing value adjustment command for the same TAG included in the first TAG pair and the second TAG pair.

Further the processor 1301 is further configured to: according to the first signaling of the second TAG pair, if it is determined that the second timing value adjustment command enables, after the terminal performs an adjustment according to the second timing value adjustment command, an absolute timing difference of the second TAG pair after the adjustment to be greater than the absolute timing difference before the adjustment, not send the second timing value adjustment command to the terminal.

Further, the second signaling further includes at least one of the following parameters:

the absolute timing difference of the TAG pair, the difference between the absolute timing difference of the TAG pair and the maximum timing difference reference value, and an alarm clearance indication, where the alarm clearance indication is used to indicate that the absolute timing difference of the TAG pair does not meet the predetermined condition.

Further, that the predetermined condition is not met includes any one of the following: the difference between the maximum timing difference reference value and the absolute timing difference of the TAG pair is greater than the first threshold, the absolute timing difference of the TAG pair is less than the second threshold, and the absolute timing difference of the TAG pair is less than the maximum timing difference reference value.

According to the timing value adjustment apparatus provided in this embodiment of the present invention, a network device receives first signaling of a first TAG pair that is sent by a terminal in a case in which an absolute timing difference of the first TAG pair meets a predetermined condition, and determines, according to the first signaling of the first TAG pair, whether to send a first timing value adjustment command to the terminal. In this way, the network device may be prevented from sending, to the terminal, timing value adjustment signaling that enables, after the terminal performs an adjustment according to the first timing value adjustment command, the absolute timing difference of the TAG pair to be closer to or further greater than a maximum timing difference reference value, thereby reducing a probability that power of the terminal exceeds a limit.

Through the description of the foregoing implementation manners, it may be clearly understood by a person skilled in the art that, for the purpose of convenient and brief description, division of the foregoing function modules is taken as an example for illustration. In actual application, the foregoing functions can be allocated to different function modules and implemented as required, that is, an inner structure of an apparatus is divided into different function modules to implement all or some of the functions described above. For a detailed working process of the foregoing apparatus, refer to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one physical unit or multiple physical units, may be located in one position, or may be distributed on multiple different places. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer or a chip) or a processor (processor) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A timing value adjustment method comprising:
   enabling an autonomous transmit timing value adjustment mechanism of a terminal for at least one timing advance group (TAG);
   acquiring, according to the autonomous transmit timing value adjustment mechanism for the at least one TAG, a predicted absolute timing difference of one of more pairs of TAGs, where each TAG in a pair comprises a first TAG, wherein the predicted absolute timing difference of each TAG pair is a difference between transmit timing values of the two TAGs in each TAG pair; and
   responding to the autonomous transmit timing value adjustment mechanism for the first TAG according to a preset policy and the predicted absolute timing difference of each TAG pair, wherein the preset policy includes one of
  a) not performing an autonomous adjustment operation on a transmit timing value of the first TAG according to the autonomous transmit timing value adjustment mechanism for the first TAG when the predicted absolute timing difference of a given TAG pair is greater than a maximum timing difference reference value, and
  b) performing the autonomous adjustment operation on the transmit timing value of the first TAG according to the autonomous transmit timing value adjustment mechanism for the first TAG when the predicted absolute timing difference of the given TAG pair is less than or equal to the maximum timing difference reference value.

2. The method according to claim 1, wherein before the responding to the autonomous transmit timing value adjustment mechanism for the first TAG according to a preset policy and the predicted absolute timing difference of each TAG pair that comprises the first TAG, the method further comprises:
  acquiring an absolute timing difference of each TAG pair that comprises the first TAG, wherein the absolute timing difference of the TAG pair is, in a case in which the autonomous adjustment operation is not performed on the transmit timing value of the first TAG according to the autonomous transmit timing value adjustment mechanism for the first TAG, a difference between transmit timing values of the two TAGs comprised in the TAG pair, wherein
    responding to the autonomous transmit timing value adjustment mechanism for the first TAG according to the preset policy and the predicted absolute timing difference of each TAG pair comprises not performing the autonomous adjustment operation on the transmit timing value of the first TAG when (a) an absolute timing difference of the at least one TAG pair comprising the first TAG is greater than the maximum timing difference reference value, and (b) the predicted absolute timing difference of the TAG pair is greater than the absolute timing difference of the TAG pair.

3. The method according to claim 1, wherein the method further comprises:
  acquiring, according to the autonomous transmit timing value adjustment mechanism for the at least one TAG, a predicted absolute timing difference of each TAG pair that comprises a second TAG,
    wherein the predicted absolute timing difference of the TAG pair is a difference between transmit timing values of the two TAGs comprised in the TAG pair in a case in which it is assumed that the autonomous adjustment operation is performed on a transmit timing value of the second TAG according to an autonomous transmit timing value adjustment mechanism for the second TAG; and
  responding to the autonomous transmit timing value adjustment mechanism for the second TAG according to the preset policy and the predicted absolute timing difference of each TAG pair comprising the second TAG.

4. The method according to claim 1, wherein:
when the autonomous transmit timing value adjustment mechanism for the at least one TAG comprises an autonomous transmit timing value adjustment mechanism for a primary TAG, the first TAG is the primary TAG; or
when the autonomous transmit timing value adjustment mechanism for the at least one TAG does not comprise an autonomous transmit timing value adjustment mechanism for a primary TAG, the first TAG is any one of the at least one TAG.

5. A timing value adjustment apparatus comprising:
  an enabling circuit configured to enable an autonomous transmit timing value adjustment mechanism of a terminal for at least one timing advance group (TAG);
  a first acquiring circuit configured to acquire, according to the autonomous transmit timing value adjustment mechanism for the at least one TAG that is enabled by the enabling unit, a predicted absolute timing difference of one or more pairs of TAGs, where each TAG in a pair comprises a first TAG, wherein the predicted absolute timing difference of the TAG pair is a difference between transmit timing values of the two TAGs in each TAG pair; and
  a first processing circuit configured to respond to the autonomous transmit timing value adjustment mechanism for the first TAG according to a preset policy, and the predicted absolute timing difference of each TAG pair, wherein the preset policy includes one or more of
    a) not performing an autonomous adjustment operation on a transmit timing value of the first TAG according to the autonomous transmit timing value adjustment mechanism for the first TAG when the predicted absolute timing difference of a given TAG pair is greater than a maximum timing difference reference value, and
    b) performing the autonomous adjustment operation on the transmit timing value of the first TAG according to the autonomous transmit timing value adjustment mechanism for the first TAG when the predicted absolute timing difference of the given TAG pair is less than or equal to the maximum timing difference reference value.

6. The apparatus according to claim 5 further comprising:
  a second acquiring circuit configured to, before the first processing unit responds to the autonomous transmit timing value adjustment mechanism for the first TAG according to the preset policy and the predicted absolute timing difference of each TAG pair that comprises the first TAG, acquire an absolute timing difference of each TAG pair that comprises the first TAG,
    wherein the absolute timing difference of the TAG pair is, in a case in which the autonomous adjustment operation is not performed on the transmit timing value of the first TAG according to the autonomous transmit timing value adjustment mechanism for the first TAG, a difference between transmit timing values of the two TAGs comprised in the TAG pair,
    wherein the first processing circuit is configured to not perform the autonomous adjustment operation on the transmit timing value of the first TAG when (a) an absolute timing difference of the at least one TAG pair that comprises the first TAG is greater than the maximum timing difference reference value, and (b) the predicted absolute timing difference of the TAG pair is greater than the absolute timing difference of the TAG pair.

7. The apparatus according to claim 5, wherein the apparatus further comprises:

a third acquiring circuit configured to acquire, according to the autonomous transmit timing value adjustment mechanism for the at least one TAG that is enabled by the enabling circuit, a predicted absolute timing difference of each TAG pair comprising a second TAG,
   wherein the predicted absolute timing difference of the TAG pair is a difference between transmit timing values of the two TAGs comprising the TAG pair in a case in which it is assumed that the autonomous adjustment operation is performed on a transmit timing value of the second TAG according to an autonomous transmit timing value adjustment mechanism for the second TAG; and
a second processing circuit configured to respond to the autonomous transmit timing value adjustment mechanism for the second TAG according to the preset policy, and the predicted absolute timing difference of each TAG pair comprising the second TAG is obtained by the third acquiring circuit.

8. The apparatus according to claim 5, wherein:
when the autonomous transmit timing value adjustment mechanism for the at least one TAG comprises an autonomous transmit timing value adjustment mechanism for a primary TAG, the first TAG is the primary TAG; or
when the autonomous transmit timing value adjustment mechanism for the at least one TAG does not comprise an autonomous transmit timing value adjustment mechanism for a primary TAG, the first TAG is any one of the at least one TAG.

9. A timing value adjustment apparatus comprising:
at least one processor, a memory, a communications interface connected by a bus for implementing communication among the at least one processor, memory and communications interface; and
the processor executes executable program code stored in the memory so as to configure the processor to provide the following operations:
   enable an autonomous transmit timing value adjustment mechanism of a terminal for at least one timing advance group (TAG);
   acquire, according to the autonomous transmit timing value adjustment mechanism for the at least one TAG, a predicted absolute timing difference of one of more pairs of TAGs, where each TAG in a pair comprises a first TAG, wherein the predicted absolute timing difference of each TAG pair is a difference between transmit timing values of the two TAGs in each TAG pair; and
   respond to the autonomous transmit timing value adjustment mechanism for the first TAG according to a preset policy and the predicted absolute timing difference of each TAG pair, wherein the preset policy includes one of
      a) not performing an autonomous adjustment operation on a transmit timing value of the first TAG according to the autonomous transmit timing value adjustment mechanism for the first TAG when the predicted absolute timing difference of a given TAG pair is greater than a maximum timing difference reference value, and
      b) performing the autonomous adjustment operation on the transmit timing value of the first TAG according to the autonomous transmit timing value adjustment mechanism for the first TAG when the predicted absolute timing difference of the given TAG pair is less than or equal to the maximum timing difference reference value.

10. The apparatus according to claim 9, wherein the processor is further configured to, before the responding to the autonomous transmit timing value adjustment mechanism for the first TAG according to a preset policy and the predicted absolute timing difference of each TAG pair that comprises the first TAG,
   acquire an absolute timing difference of each TAG pair that comprises the first TAG, wherein the absolute timing difference of the TAG pair is, in a case in which the autonomous adjustment operation is not performed on the transmit timing value of the first TAG according to the autonomous transmit timing value adjustment mechanism for the first TAG, a difference between transmit timing values of the two TAGs comprised in the TAG pair; and
   not perform the autonomous adjustment operation on the transmit timing value of the first TAG when (a) an absolute timing difference of the at least one TAG pair comprising the first TAG is greater than the maximum timing difference reference value, and (b) the predicted absolute timing difference of the TAG pair is greater than the absolute timing difference of the TAG pair.

11. The apparatus according to claim 9, wherein the processor is further configured to:
   acquire, according to the autonomous transmit timing value adjustment mechanism for the at least one TAG, a predicted absolute timing difference of each TAG pair that comprises a second TAG,
      wherein the predicted absolute timing difference of the TAG pair is a difference between transmit timing values of the two TAGs comprised in the TAG pair in a case in which it is assumed that the autonomous adjustment operation is performed on a transmit timing value of the second TAG according to an autonomous transmit timing value adjustment mechanism for the second TAG; and
   respond to the autonomous transmit timing value adjustment mechanism for the second TAG according to the preset policy and the predicted absolute timing difference of each TAG pair comprises the second TAG.

12. The apparatus according to claim 9, wherein:
when the autonomous transmit timing value adjustment mechanism for the at least one TAG comprises an autonomous transmit timing value adjustment mechanism for a primary TAG, the first TAG is the primary TAG; or
when the autonomous transmit timing value adjustment mechanism for the at least one TAG does not comprise an autonomous transmit timing value adjustment mechanism for a primary TAG, the first TAG is any one of the at least one TAG.

* * * * *